(12) United States Patent
Su et al.

(10) Patent No.: US 11,914,850 B2
(45) Date of Patent: Feb. 27, 2024

(54) USER PROFILE PICTURE GENERATION METHOD AND ELECTRONIC DEVICE

(71) Applicant: Huawei Technologies Co., Ltd., Shenzhen (CN)

(72) Inventors: Da Su, Shenzhen (CN); Yundie Zhang, Shenzhen (CN); Liang Hu, Shenzhen (CN); Siju Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 171 days.

(21) Appl. No.: 17/623,437

(22) PCT Filed: Jun. 29, 2020

(86) PCT No.: PCT/CN2020/099002
§ 371 (c)(1),
(2) Date: Dec. 28, 2021

(87) PCT Pub. No.: WO2021/000841
PCT Pub. Date: Jan. 7, 2021

(65) Prior Publication Data
US 2022/0350470 A1 Nov. 3, 2022

(30) Foreign Application Priority Data
Jun. 30, 2019 (CN) .......................... 201910582266.4

(51) Int. Cl.
*G06F 3/04845* (2022.01)
*H04L 67/306* (2022.01)

(52) U.S. Cl.
CPC ........ *G06F 3/04845* (2013.01); *H04L 67/306* (2013.01)

(58) Field of Classification Search
CPC ............ G06F 3/04845; G06T 2210/22; H04N 23/611
See application file for complete search history.

(56) References Cited

U.S. PATENT DOCUMENTS

| | | | |
|---|---|---|---|
| 9,626,584 B2 | 4/2017 | Lin et al. | |
| 10,062,195 B2* | 8/2018 | Chevet | G11B 27/28 |
| 2007/0236762 A1 | 10/2007 | Tsuji | |
| 2010/0054533 A1* | 3/2010 | Steinberg | H04N 23/67 382/103 |

(Continued)

FOREIGN PATENT DOCUMENTS

| | | |
|---|---|---|
| CN | 102821253 A | 12/2012 |
| CN | 103164119 A | 6/2013 |

(Continued)

OTHER PUBLICATIONS

Liu, L.G., et al., "Optimizing Photo Composition," Comp Graph. Forum, vol. 29, No. 2, 2010, 10 pages.

*Primary Examiner* — Samantha (Yuehan) Wang
(74) *Attorney, Agent, or Firm* — Conley Rose, P.C.

(57) ABSTRACT

A user profile picture generation method and an electronic device includes in a process in which a user searches for a profile picture in a plurality of thumbnails displayed in a user interface, when the user selects a thumbnail, the electronic device displays an original picture corresponding to the thumbnail, and displays a crop box in the original picture, where the selection may be a tap operation on the thumbnail. The electronic device may generate a profile picture of the user based on the crop box. The crop box includes a human face region in the original picture, and a composition manner of the human face region in the crop box is the same as a composition manner of the human face region in the original picture.

12 Claims, 39 Drawing Sheets

(56) References Cited

U.S. PATENT DOCUMENTS

| | | |
|---|---|---|
| 2010/0107126 A1 | 4/2010 | Lin et al. |
| 2010/0128986 A1 | 5/2010 | Xu |
| 2010/0226564 A1 | 9/2010 | Marchesotti et al. |
| 2010/0272323 A1 | 10/2010 | Oya et al. |
| 2013/0154934 A1 | 6/2013 | Peters |
| 2014/0192081 A1* | 7/2014 | Jin .................. G06T 3/0006 345/625 |
| 2014/0267435 A1 | 9/2014 | Choe et al. |
| 2014/0321770 A1 | 10/2014 | Potdar |
| 2018/0032238 A1* | 2/2018 | Jung .................. G06F 16/583 |
| 2021/0201445 A1 | 7/2021 | Kang |

FOREIGN PATENT DOCUMENTS

| | | | |
|---|---|---|---|
| CN | 105488132 A | 4/2016 | |
| CN | 105956999 A * | 9/2016 | ........... G06T 3/0012 |
| CN | 105956999 A | 9/2016 | |
| CN | 103903223 B | 3/2017 | |
| CN | 107146197 A | 9/2017 | |
| CN | 107545576 A | 1/2018 | |
| CN | 108647590 A | 10/2018 | |
| CN | 109146892 A | 1/2019 | |
| CN | 109523503 A | 3/2019 | |
| CN | 109523503 A * | 3/2019 | ............... G06K 9/46 |
| CN | 110377204 A | 10/2019 | |
| JP | 2000261644 A | 9/2000 | |
| JP | 2005269563 A | 9/2005 | |
| JP | 2007274017 A | 10/2007 | |
| JP | 2014016810 A | 1/2014 | |
| WO | 2014181529 A1 | 11/2014 | |
| WO | 2015161794 A1 | 10/2015 | |
| WO | 2019072149 A1 | 4/2019 | |

* cited by examiner

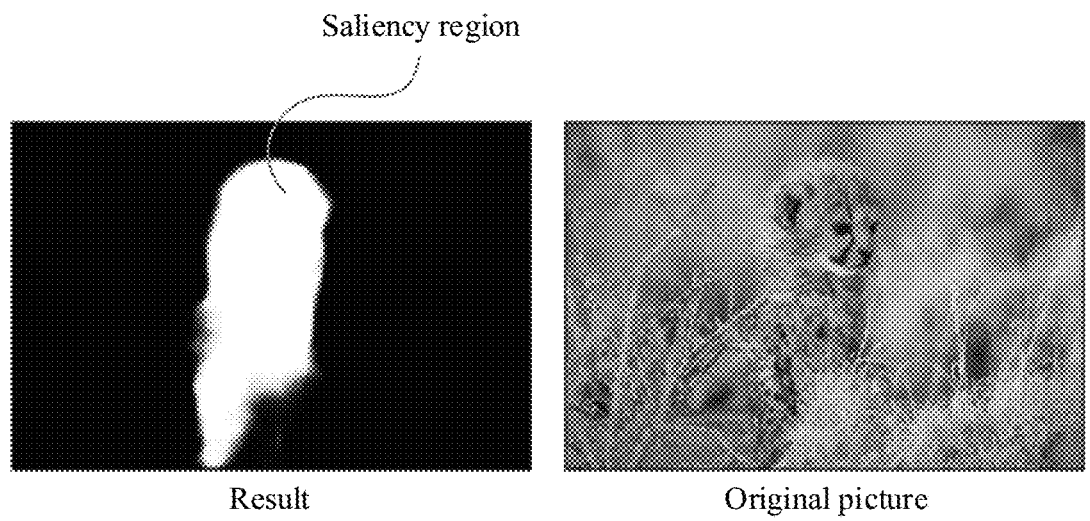
Result           Original picture
FIG. 1A(1)          FIG. 1A(2)
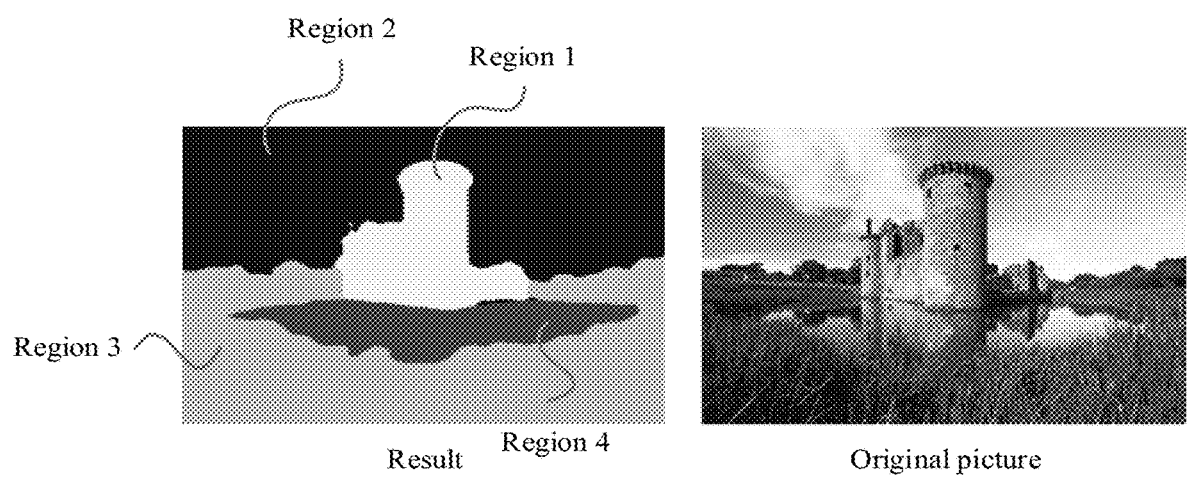
Result           Original picture
FIG. 1B(1)          FIG. 1B(2)

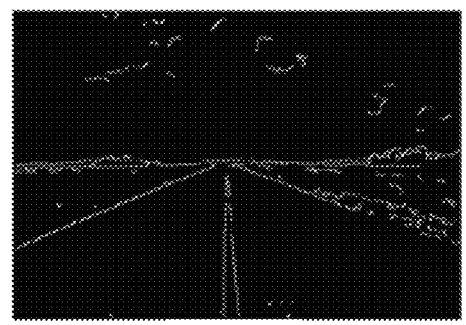 Result
 Original picture
FIG. 1C(1)　　　　　　　　FIG. 1C(2)

USER PROFILE PICTURE GENERATION METHOD AND ELECTRONIC DEVICE

CROSS-REFERENCE TO RELATED APPLICATIONS

This is a U.S. National Stage of International Patent Application No. PCT/CN2020/099002 filed on Jun. 29, 2020, which claims priority to Chinese Patent Application No. 201910582266.4 filed on Jun. 30, 2019. Both of the aforementioned applications are hereby incorporated by reference in their entireties.

TECHNICAL FIELD

This application relates to the human-computer interaction field, and in particular, to a user profile picture generation method and an electronic device.

BACKGROUND

When using a web site or a social platform, a user usually enters profile picture information of the user. A user profile picture is usually a picture including a human face, and may be used as identifier information of the user. Because a fixed aspect ratio is preset for the user profile picture, in a process of generating the user profile picture, a picture selected by the user usually needs to be cropped. In the conventional technology, a 1:1 crop box is displayed in the center of the selected picture, but the crop box probably does not include human face information in the picture, and the user needs to adjust a position of the crop box a plurality of times to determine picture content included in the user profile picture.

Similar to the foregoing case, the user can view photos after opening Gallery (or referred to as Albums). Thumbnails of the photos are displayed in Gallery. One thumbnail corresponds to an original picture of one photo. The thumbnail is a small-size picture obtained after the original picture is compressed. Because a size of the thumbnail is relatively small, a loading speed is very high. This helps the user quickly browse the photos. In existing Gallery, as shown in FIG. 2B, picture content included in a thumbnail is compressed picture content obtained by performing, at a composition ratio in which an aspect ratio is 1:1, center cropping on an original picture corresponding to the thumbnail. However, a center part of the original picture probably does not include content desired by the user. In this case, the user cannot intuitively view, in the thumbnail, the content desired by the user.

SUMMARY

Embodiments of this application provide a user profile picture generation method and an electronic device, to recommend an appropriate crop box position to a user, so as to improve user profile picture generation efficiency. A crop box includes a human face region in an original picture, and a composition manner of the human face region in the crop box is the same as a composition manner of the human face region in the original picture.

According to a first aspect, an embodiment of this application provides a user profile picture generation method, and the method includes:

displaying at least one thumbnail on a display of an electronic device, where the at least one thumbnail includes a first thumbnail, the first thumbnail corresponds to a first picture, and the first picture includes a human face region; detecting a first operation performed on the first thumbnail, and in response to the first operation, displaying, by the electronic device, the first picture, and displaying a crop box in the first picture, where the first picture corresponds to the first thumbnail, the crop box includes the human face region, and a composition manner of the human face region in the crop box is the same as a composition manner of the human face region in the first picture; and generating, based on the crop box, a user profile picture including the human face region, where the composition manner of the human face region in the crop box is determined by a shortest distance in a distance between a center of gravity of the human face region and a center line of the crop box, a distance between the center of gravity and an edge of the crop box, and a distance between the center of gravity and a reference line of the crop box, and the composition manner of the human face region in the first picture is determined by a shortest distance in a distance between the center of gravity of the human face region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line. In this manner, an appropriate crop box position can be recommended to a user, so that user profile picture generation efficiency is improved.

In a possible implementation, the first picture is a picture shot by using a camera of the electronic device, and the method further includes: recording a position of a focus frame of a viewfinder screen of the camera in a process of shooting the first picture, where picture content included in the focus frame is the human face region.

In a possible implementation, the first picture includes one human face, and the displaying a crop box in the first picture includes: determining a length and a width of the crop box based on a length and a width of the first picture and an aspect ratio of the crop box; generating a first subject box based on the human face, where the first subject box is a bounding rectangle of the human face; if a length of the first subject box is not greater than the length of the crop box, and a width of the first subject box is not greater than the width of the crop box, determining that the human face is the human face region; calculating a position of the crop box, so that the composition manner of the human face region in the crop box is the same as the composition manner of the human face region in the first picture; and displaying the crop box in the first picture based on the determined position of the crop box.

In a possible implementation, the method further includes: generating an optimized human face based on the human face if the length of the first subject box is greater than the length of the crop box or the width of the first subject box is greater than the width of the crop box, where the optimized human face is a picture region including pixels whose grayscale values are greater than a preset value in a plurality of pixels of the human face; generating a second subject box based on the optimized human face, where the second subject box is a bounding rectangle of the optimized human face; and if a length of the second subject box is not greater than the length of the crop box, and a width of the second subject box is not greater than the width of the crop box, determining that the optimized human face is the human face region.

In a possible implementation, the first picture includes two human faces, and the displaying a crop box in the first picture includes: determining a length and a width of the crop box based on a length and a width of the first picture and an aspect ratio of the crop box; generating a third subject box and a fourth subject box based on the two human faces, where the third subject box is a bounding rectangle of a human face with a larger area in the two human faces, and the fourth subject box is a bounding rectangle of a human face with a smaller area in the two human faces; if a length of the third subject box is not greater than the length of the crop box, a width of the third subject box is not greater than the width of the crop box, a length of a fifth subject box is not greater than the length of the crop box, and a width of the fifth subject box is not greater than the width of the crop box, determining that a minimum picture region that includes the two human faces is the human face region, where the fifth subject box is a minimum bounding rectangle that includes the fourth subject box and the fifth subject box; or if a length of the third subject box is not greater than the length of the crop box, a width of the third subject box is not greater than the width of the crop box, and a length of a fifth subject box is greater than the length of the crop box, or a width of the fifth subject box is greater than the width of the crop box, determining that the human face with the larger area in the two human faces is the human face region; calculating a position of the crop box, so that the composition manner of the human face region in the crop box is the same as the composition manner of the human face region in the first picture; and displaying the crop box in the first picture based on the determined position of the crop box.

In a possible implementation, the first picture includes three or more human faces, and the displaying a crop box in the first picture includes: determining a length and a width of the crop box based on a length and a width of the first picture and an aspect ratio of the crop box; generating three or more sixth subject boxes based on the three or more human faces, where one sixth subject box is a bounding rectangle of one of the three or more human faces, each sixth subject box corresponds to a different human face, and a subject box with a largest area in the three or more sixth subject boxes is a seventh subject box; if a length of the seventh subject box is not greater than the length of the crop box, and a width of the seventh subject box is not greater than the width of the crop box, expanding the seventh subject box, to sequentially contain other subject boxes in the seventh subject box in descending order of areas, until a length of a seventh subject box obtained after an eighth subject box is contained is greater than the length of the crop box, or a width of the seventh subject box obtained after the eighth subject box is contained is greater than the width of the crop box, and determining that the human face region is a human face included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the crop box, and a width of the seventh subject box is not greater than the width of the crop box, expanding the seventh subject box, to sequentially contain other subject boxes in the seventh subject box in descending order of areas, until the other subject boxes are all traversed, and determining that the human face region is a human face included in a seventh subject box obtained after the other subject boxes are all traversed, where after a ninth subject box is contained, if a length of the seventh subject box is greater than the length of the crop box or a width of the seventh subject box is greater than the width of the crop box, it is determined that the seventh subject box is a seventh subject box existing before the third subject box is contained, or after the ninth subject box is contained, if a length of the seventh subject box is not greater than the length of the crop box or a width of the seventh subject box is not greater than the width of the crop box, it is determined that the seventh subject box is a seventh subject box obtained after the ninth subject box is contained, and it is determined that the human face included in the seventh subject box obtained after the other subject boxes are all traversed is the human face region; calculating a position of the crop box, so that the composition manner of the human face region in the crop box is the same as the composition manner of the human face region in the first picture; and displaying the crop box in the first picture based on the determined position of the crop box.

According to a second aspect, an embodiment of this application provides a thumbnail generation method. The method includes:

displaying, by an electronic device, a user interface of a gallery application, where the user interface displays at least one thumbnail and a first control, and each of the at least one thumbnail corresponds to one picture; and in response to a first operation performed by a user on the first control, performing the following operations for a first thumbnail, where the first thumbnail is any one of the at least one thumbnail: determining a first saliency region of the first picture, and determining a composition manner of the first saliency region in the first picture; generating a second thumbnail based on the first saliency region and the composition manner of the first saliency region in the first picture, where the composition manner of the first saliency region in the first picture is the same as a composition manner of the first saliency region in the second thumbnail, and the second thumbnail corresponds to the first picture; and displaying, by the electronic device, the second thumbnail.

In a possible implementation, the composition manner of the first saliency region in the second thumbnail is determined by a shortest distance in a distance between a center of gravity of the first saliency region and a center line of the second thumbnail, a distance between the center of gravity and an edge of the second thumbnail, and a distance between the center of gravity and a reference line of the second thumbnail, and the composition manner of the first saliency region in the first picture is determined by a shortest distance in a distance between the center of gravity of the first saliency region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line.

In a possible implementation, before the first operation is received, the first control is in a first state, and the first state is used to indicate that the first thumbnail is allowed to be adjusted; and after the second operation is received, the first control is in a second state, and the second state is used to indicate that the second thumbnail is adjusted.

In a possible implementation, the first picture is a picture shot by using a camera of the electronic device, and the method further includes: recording a position of a focus frame of a viewfinder screen of the camera in a process of shooting the first picture, where picture content included in the focus frame is the first saliency region.

In a possible implementation, the first picture includes one saliency region, and the determining a first saliency region of a first picture includes: determining a length and a width of the second thumbnail based on a length and a width of the first picture and an aspect ratio of the thumbnail; generating a first subject box based on the saliency region, where the first subject box is a bounding rectangle of the saliency region; and if a length of the first subject box is not greater than the length of the second thumbnail, and a width of the first subject box is not greater than the width of the second thumbnail, determining that the saliency region is the first saliency region.

In a possible implementation, the method further includes: if the length of the first subject box is greater than the length of the second thumbnail, or the width of the first subject box is greater than the width of the second thumbnail, performing semantic segmentation on a picture region corresponding to the saliency region with a largest area, to obtain N semantic categories, where N≥2, one semantic category corresponds to one or more regions, and the regions are regions that do not overlap each other; determining an area of a region corresponding to each of the N semantic categories; calculating a score of an $i^{th}$ semantic category, where the score of the $i^{th}$ semantic category is a product of an area of a region corresponding to the $i^{th}$ semantic category and a weight corresponding to the $i^{th}$ semantic category, and the electronic device pre-stores the weight corresponding to the semantic category; and determining that a picture region including one or more regions corresponding to a semantic category with a highest score in the N semantic categories is the first saliency region.

In a possible implementation, the method further includes: generating an optimized saliency region based on the saliency region if the length of the first subject box is greater than the length of the second thumbnail or the width of the first subject box is greater than the width of the second thumbnail, where the optimized saliency region is a picture region including pixels whose grayscale values are greater than a preset value in a plurality of pixels of the saliency region; generating a second subject box based on the optimized saliency region, where the second subject box is a bounding rectangle of the optimized saliency region; and if a length of the second subject box is not greater than the length of the second thumbnail, and a width of the second subject box is not greater than the width of the second thumbnail, determining that the optimized saliency region is the first saliency region.

In a possible implementation, the first picture includes two saliency regions, and the determining a first saliency region of a first picture includes: determining a length and a width of the second thumbnail based on a length and a width of the first picture and an aspect ratio of the thumbnail; generating a third subject box and a fourth subject box based on the two saliency regions, where the third subject box is a bounding rectangle of a saliency region with a larger area in the two saliency regions, and the fourth subject box is a bounding rectangle of a saliency region with a smaller area in the two saliency regions; and if a length of the third subject box is not greater than the length of the second thumbnail, a width of the third subject box is not greater than the width of the second thumbnail, a length of a fifth subject box is not greater than the length of the second thumbnail, and a width of the fifth subject box is not greater than the width of the second thumbnail, determining that a minimum picture region that includes the two saliency regions is the first saliency region, where the fifth subject box is a minimum bounding rectangle that includes the fourth subject box and the fifth subject box; or if a length of the third subject box is not greater than the length of the second thumbnail, a width of the third subject box is not greater than the width of the second thumbnail, and a length of a fifth subject box is greater than the length of the second thumbnail, or a width of the fifth subject box is greater than the width of the second thumbnail, determining that the saliency region with the larger area in the two saliency regions is the first saliency region.

In a possible implementation, the first picture includes three or more saliency regions, and the determining a first saliency region of a first picture includes: determining a length and a width of the second thumbnail based on a length and a width of the first picture and an aspect ratio of the thumbnail; generating three or more sixth subject boxes based on the three or more saliency regions, where one sixth subject box is a bounding rectangle of one of the three or more saliency regions, each sixth subject box corresponds to a different saliency region, and a subject box with a largest area in the three or more sixth subject boxes is a seventh subject box; and if a length of the seventh subject box is not greater than the length of the second thumbnail, and a width of the seventh subject box is not greater than the width of the second thumbnail, expanding the seventh subject box, to sequentially contain other subject boxes in the seventh subject box in descending order of areas, until a length of a seventh subject box obtained after an eighth subject box is contained is greater than the length of the second thumbnail, or a width of the seventh subject box obtained after the eighth subject box is contained is greater than the width of the second thumbnail, and determining that the first saliency region is a saliency region included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the second thumbnail, and a width of the seventh subject box is not greater than the width of the second thumbnail, expanding the seventh subject box, to sequentially contain other subject boxes in the seventh subject box in descending order of areas, until the other subject boxes are all traversed, and determining that the first saliency region is a saliency region included in a seventh subject box obtained after the other subject boxes are all traversed, where after a ninth subject box is contained, if a length of the seventh subject box is greater than the length of the second thumbnail or a width of the seventh subject box is greater than the width of the second thumbnail, it is determined that the seventh subject box is a seventh subject box existing before the third subject box is contained, or after the ninth subject box is contained, if a length of the seventh subject box is not greater than the length of the second thumbnail or a width of the seventh subject box is not greater than the width of the second thumbnail, it is determined that the seventh subject box is a seventh subject box obtained after the ninth subject box is contained, and it is determined that the saliency region included in the seventh subject box obtained after the other subject boxes are all traversed is the first saliency region.

In a possible implementation, the method further includes: detecting a second operation performed by the user on a third thumbnail, and in response to the second operation, displaying, by the electronic device, a second picture, and displaying two or more prompts in the second picture, where each of the two or more prompts corresponds to one saliency region in the second picture, different prompts correspond to different saliency regions, the third thumbnail is one of adjusted thumbnails, and the third thumbnail corresponds to the second picture; detecting a third operation performed by the user on at least one prompt, where the third operation is used to select the at least one prompt; and in response to the third operation, generating, by the electronic device, a fourth thumbnail based on a saliency region corresponding to the at least one prompt and a composition manner of the saliency region corresponding to the at least one prompt in the second picture, where the fourth thumbnail includes the saliency region corresponding to the at least one prompt, and a composition manner of the saliency region corresponding to the at least one prompt in the fourth thumbnail is the same as the composition manner of the saliency region corresponding to the at least one prompt in the second picture.

In a possible implementation, the generating, by the electronic device, a fourth thumbnail based on a saliency region corresponding to the at least one prompt and a composition manner of the saliency region corresponding to the at least one prompt in the second picture includes: determining a length and a width of the fourth thumbnail based on a length and a width of the second picture and the aspect ratio of the thumbnail; generating a tenth subject box based on the saliency region corresponding to the at least one prompt, where the tenth subject box is a bounding rectangle of the saliency region corresponding to the at least one prompt; and if the length of the fourth thumbnail is not less than a length of the tenth subject box, and the width of the fourth thumbnail is not less than a width of the tenth subject box, generating, by the electronic device, the fourth thumbnail based on the saliency region corresponding to the at least one prompt and the composition manner of the saliency region corresponding to the at least one prompt in the second picture; or the method further includes: if the length of the fourth thumbnail is less than a length of the tenth subject box, or the width of the fourth thumbnail is less than a width of the tenth subject box, displaying, by the electronic device, prompt information, where the prompt information is used to prompt the user to reselect a saliency region.

In a possible implementation, the method further includes: detecting a second operation performed by the user on a third thumbnail, and in response to the second operation, displaying, by the electronic device, a second picture, where the third thumbnail is one of adjusted thumbnails, and the third thumbnail corresponds to the second picture; detecting a fourth operation performed by the user on the second picture, where the fourth operation is an operation of entering a selection box or a closed figure and confirming the selection box or the closed figure; and in response to the fourth operation, determining, by the electronic device, that a picture region included in the selection box or the closed figure is a second saliency region, and generating a fifth thumbnail based on the second saliency region and a composition manner of the second saliency region in the second picture, where the fifth thumbnail includes the second saliency region, and a composition manner of the second saliency region in the fifth thumbnail is the same as the composition manner of the second saliency region in the second picture.

According to a third aspect, an embodiment of this application provides a thumbnail generation method. The method includes:

displaying, by an electronic device, a viewfinder screen of a camera application, where the viewfinder screen displays a first image of a photographed object, a first display region, and a shooting control; detecting a first operation performed by a user on the shooting control, and generating, by the electronic device, a first picture based on the first image in response to the first operation; determining a first saliency region of the first picture, and determining a composition manner of the first saliency region in the first picture; generating a thumbnail based on the first saliency region and the composition manner of the first saliency region in the first picture, where the composition manner of the first saliency region in the first picture is the same as a composition manner of the first saliency region in the thumbnail; and displaying the thumbnail in the first display region.

In a possible implementation, the composition manner of the first saliency region in the thumbnail is determined by a shortest distance in a distance between a center of gravity of the first saliency region and a center line of the thumbnail, a distance between the center of gravity and an edge of the thumbnail, and a distance between the center of gravity and a reference line of the thumbnail, and the composition manner of the first saliency region in the first picture is determined by a shortest distance in a distance between the center of gravity of the first saliency region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line.

In a possible implementation, the determining a first saliency region of the first picture includes: detecting a second operation performed by the user on the viewfinder screen, and in response to the second operation, displaying, by the electronic device, a focus frame in the first image, and recording a position of the focus frame; determining, based on the position of the focus frame, picture content included in the focus frame; and determining that the first saliency region of the first picture is the picture content included in the focus frame.

In a possible implementation, the first picture includes one saliency region, and the determining a first saliency region of a first picture includes: determining a length and a width of the second thumbnail based on a length and a width of the first picture and an aspect ratio of the thumbnail; generating a first subject box based on the saliency region, where the first subject box is a bounding rectangle of the saliency region; and if a length of the first subject box is not greater than the length of the second thumbnail, and a width of the first subject box is not greater than the width of the second thumbnail, determining that the saliency region is the first saliency region.

In a possible implementation, the method further includes: if the length of the first subject box is greater than the length of the thumbnail, or the width of the first subject box is greater than the width of the thumbnail, performing semantic segmentation on a picture region corresponding to the saliency region with a largest area, to obtain N semantic categories, where N≥2, one semantic category corresponds to one or more regions, and the regions are regions that do not overlap each other; determining an area of a region corresponding to each of the N semantic categories; calculating a score of an $i^{th}$ semantic category, where the score of the $i^{th}$ semantic category is a product of an area of a region corresponding to the $i^{th}$ semantic category and a weight corresponding to the $i^{th}$ semantic category, and the electronic device pre-stores the weight corresponding to the semantic category; and determining that a picture region including one or more regions corresponding to a semantic category with a highest score in the N semantic categories is the first saliency region.

In a possible implementation, the method further includes: generating an optimized saliency region based on the saliency region if the length of the first subject box is greater than the length of the thumbnail or the width of the first subject box is greater than the width of the thumbnail, where the optimized saliency region is a picture region including pixels whose grayscale values are greater than a preset value in a plurality of pixels of the saliency region; generating a second subject box based on the optimized saliency region, where the second subject box is a bounding rectangle of the optimized saliency region; and if a length of the second subject box is not greater than the length of the thumbnail, and a width of the second subject box is not greater than the width of the thumbnail, determining that the optimized saliency region is the first saliency region.

In a possible implementation, the first picture includes two saliency regions, and the determining a first saliency region of the first picture includes: determining a length and a width of the thumbnail based on a length and a width of the first picture and an aspect ratio of the thumbnail; generating a third subject box and a fourth subject box based on the two saliency regions, where the third subject box is a bounding rectangle of a saliency region with a larger area in the two saliency regions, and the fourth subject box is a bounding rectangle of a saliency region with a smaller area in the two saliency regions; and if a length of the third subject box is not greater than the length of the thumbnail, a width of the third subject box is not greater than the width of the thumbnail, a length of a fifth subject box is not greater than the length of the thumbnail, and a width of the fifth subject box is not greater than the width of the thumbnail, determining that a minimum picture region that includes the two saliency regions is the first saliency region, where the fifth subject box is a minimum bounding rectangle that includes the fourth subject box and the fifth subject box; or if a length of the third subject box is not greater than the length of the thumbnail, a width of the third subject box is not greater than the width of the thumbnail, and a length of a fifth subject box is greater than the length of the thumbnail, or a width of the fifth subject box is greater than the width of the thumbnail, determining that the saliency region with the larger area in the two saliency regions is the first saliency region.

In a possible implementation, the first picture includes three or more saliency regions, and the determining a first saliency region of the first picture includes: determining a length and a width of the thumbnail based on a length and a width of the first picture and an aspect ratio of the thumbnail; generating three or more sixth subject boxes based on the three or more saliency regions, where one sixth subject box is a bounding rectangle of one of the three or more saliency regions, each sixth subject box corresponds to a different saliency region, and a subject box with a largest area in the three or more sixth subject boxes is a seventh subject box; and if a length of the seventh subject box is not greater than the length of the thumbnail, and a width of the seventh subject box is not greater than the width of the thumbnail, expanding the seventh subject box, to sequentially contain other subject boxes in the seventh subject box in descending order of areas, until a length of a seventh subject box obtained after an eighth subject box is contained is greater than the length of the thumbnail, or a width of the seventh subject box obtained after the eighth subject box is contained is greater than the width of the thumbnail, and determining that the first saliency region is a saliency region included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the thumbnail, and a width of the seventh subject box is not greater than the width of the thumbnail, expanding the seventh subject box, to sequentially contain other subject boxes in the seventh subject box in descending order of areas, until the other subject boxes are all traversed, and determining that the first saliency region is a saliency region included in a seventh subject box obtained after the other subject boxes are all traversed, where after a ninth subject box is contained, if a length of the seventh subject box is greater than the length of the thumbnail or a width of the seventh subject box is greater than the width of the thumbnail, it is determined that the seventh subject box is a seventh subject box existing before the third subject box is contained, or after the ninth subject box is contained, if a length of the seventh subject box is not greater than the length of the thumbnail or a width of the seventh subject box is not greater than the width of the thumbnail, it is determined that the seventh subject box is a seventh subject box obtained after the ninth subject box is contained, and it is determined that the saliency region included in the seventh subject box obtained after the other subject boxes are all traversed is the first saliency region. It should be noted that for each specific implementation of determining the first saliency region, refer to a manner for determining a first subject box that is described in an embodiment corresponding to FIG. 11. A saliency region included in the first subject box is the first saliency region.

According to a fourth aspect, this application provides an electronic device, including one or more memories, a foldable display, and one or more memories. The one or more memories are coupled to one or more processors, and the foldable display communicates with the one or more processors. The one or more memories are configured to store computer program code, the computer program code includes computer instructions, and when the one or more processors execute the computer instructions, the electronic device is enabled to perform the user profile picture generation method in any one of the first aspect and the possible implementations of the first aspect.

According to a fifth aspect, this application provides an electronic device, including one or more memories, a foldable display, and one or more memories. The one or more memories are coupled to one or more processors, and the foldable display communicates with the one or more processors. The one or more memories are configured to store computer program code, the computer program code includes computer instructions, and when the one or more processors execute the computer instructions, the electronic device is enabled to perform the thumbnail generation method in any one of the second aspect and the possible implementations of the second aspect.

According to a sixth aspect, this application provides an electronic device, including one or more memories, a foldable display, and one or more memories. The one or more memories are coupled to one or more processors, and the foldable display communicates with the one or more processors. The one or more memories are configured to store computer program code, the computer program code includes computer instructions, and when the one or more processors execute the computer instructions, the electronic device is enabled to perform the thumbnail generation method in any one of the third aspect and the possible implementations of the third aspect.

According to a seventh aspect, an embodiment of this application provides a computer storage medium, including computer instructions. When the computer instructions are run on an electronic device, the electronic device is enabled to perform the user profile picture generation method in any one of the first aspect and the possible implementations of the first aspect.

According to an eighth aspect, an embodiment of this application provides a computer storage medium, including computer instructions. When the computer instructions are run on an electronic device, the electronic device is enabled to perform the thumbnail generation method in any one of the second aspect and the possible implementations of the second aspect.

According to a ninth aspect, an embodiment of this application provides a computer storage medium, including computer instructions. When the computer instructions are run on an electronic device, the electronic device is enabled to perform the thumbnail generation method in any one of the third aspect and the possible implementations of the third aspect.

According to a tenth aspect, an embodiment of this application provides a computer program product. When the computer program product runs on a computer, the computer is enabled to perform the user profile picture generation method in any one of the first aspect and the possible implementations of the first aspect.

According to an eleventh aspect, an embodiment of this application provides a computer program product. When the computer program product runs on a computer, the computer is enabled to perform the thumbnail generation method in any one of the second aspect and the possible implementations of the second aspect.

According to a twelfth aspect, an embodiment of this application provides a computer program product. When the computer program product runs on a computer, the computer is enabled to perform the thumbnail generation method in any one of the third aspect and the possible implementations of the third aspect.

In the embodiments of this application, in a process in which a user searches for a profile picture in a plurality of thumbnails displayed in a user interface, if the user selects a thumbnail, an electronic device displays an original picture corresponding to the thumbnail, and displays a crop box in the original picture, where the selection may be a tap on the thumbnail. Then, the electronic device may generate a profile picture of the user based on the crop box. The crop box includes a human face region in the original picture, and a composition manner of the human face region in the crop box is the same as a composition manner of the human face region in the original picture. In this manner, an appropriate crop box position can be recommended to the user, so that user profile picture generation efficiency is improved.

BRIEF DESCRIPTION OF DRAWINGS

To describe the technical solutions in the embodiments of this application or in the conventional technology more clearly, the following briefly describes the accompanying drawings for describing the embodiments or the conventional technology.

FIG. 1A(1) and FIG. 1A(2) are a schematic diagram of a saliency detection result according to an embodiment of this application;

FIG. 1B(1) and FIG. 1B(2) are a schematic diagram of an image segmentation result according to an embodiment of this application;

FIG. 1C(1) and FIG. 1C(2) are a schematic diagram of a line detection result according to an embodiment of this application;

DESCRIPTION OF EMBODIMENTS

Figure 2A:
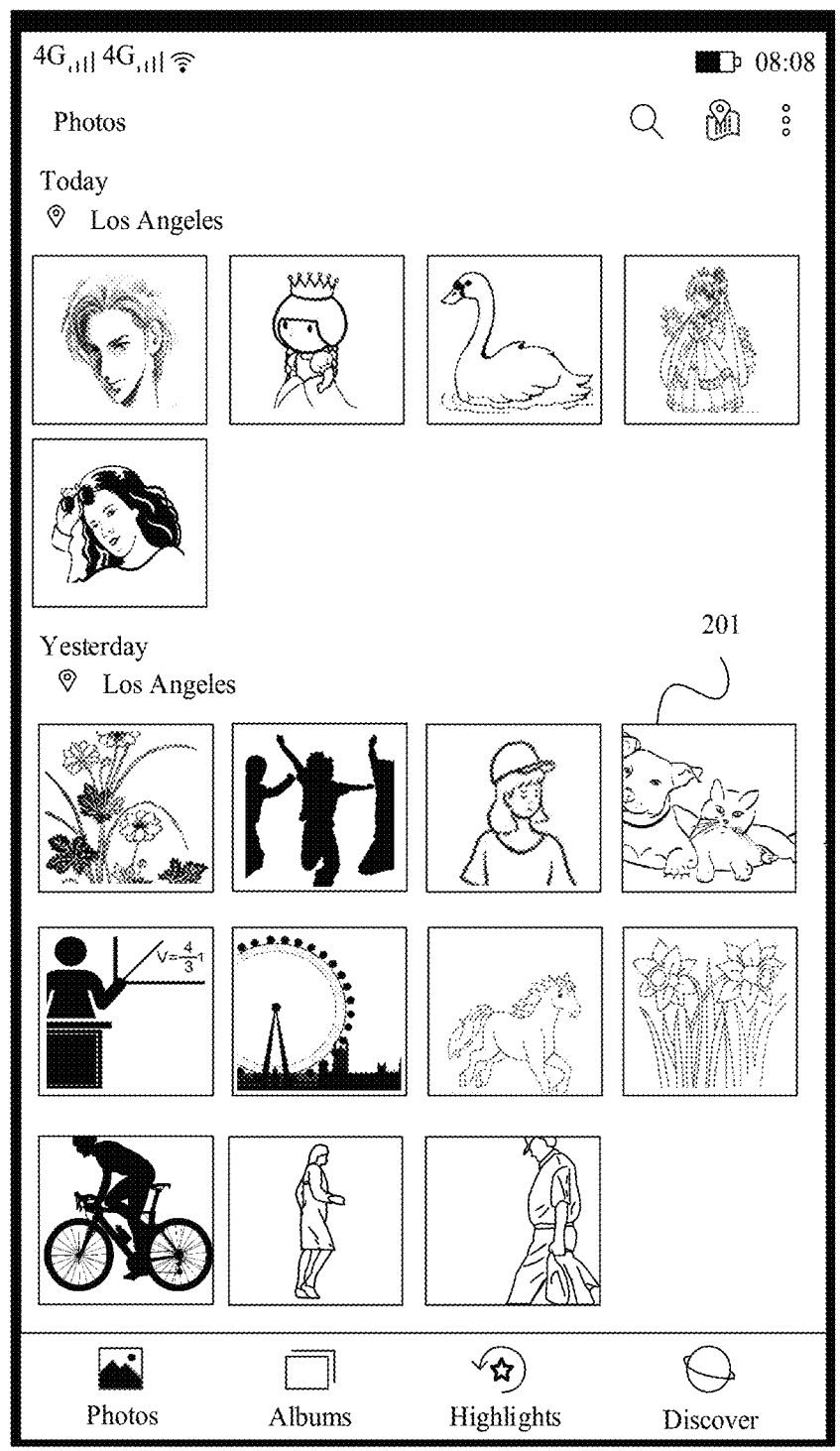
FIG. 2A is a schematic diagram of a user interface used to display Gallery according to an embodiment of this application.

The following describes the technical solutions in the embodiments of this application in more detail. Terms used in the embodiments of this application are only used to explain specific embodiments of this application, but are not intended to limit this application. The terms "one", "a", "the", "the foregoing", "this", and "the one" of singular forms used in the specification and the appended claims of this application are also intended to include plural forms, unless otherwise specified in the context clearly. It should be further understood that the term "and/or" used in this application indicates and includes any or all possible combinations of one or more listed items.

The following describes an electronic device, a user interface used for such an electronic device, and embodiments used to use such an electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop (Laptop) with a touch-sensitive surface or a touch panel. It should be further understood that, in some other embodiments, the electronic device may not be a portable electronic device, but a desktop computer having a touch-sensitive surface or a touch panel.

Some concepts related to this application are first described in detail.

Center of gravity: A center of gravity of an image is an average position of distribution of grayscale values of pixels in the image. A calculation formula for the center of gravity is as follows:

$$X_c = \frac{\sum P_i x_i}{\sum P_i}; \text{ and}$$

$$Y_c = \frac{\sum P_i y_i}{\sum P_i}.$$

Herein, $X_c$ is a horizontal coordinate of the center of gravity, $Y_c$ is a vertical coordinate of the center of gravity, $P_i$ is a grayscale value of an $i^{th}$ pixel in the image, $x_i$ is a horizontal coordinate of the $i^{th}$ pixel in the image, and $y_i$ is a vertical coordinate of the $i^{th}$ pixel in the image.

Saliency region: A saliency region of a picture is a region that attracts people's attention in the picture. In the computer vision field, a saliency region in a picture may be simulated through image processing. This manner is referred to as saliency detection. In the embodiments of this application, saliency detection may be implemented through deep learning. After saliency detection is performed on a picture, an output result is usually a grayscale picture. A larger grayscale value indicates higher saliency. In this manner, a saliency region in the picture can be determined. FIG. 1A(1) and FIG. 1A(2) are a schematic diagram of a saliency detection result according to an embodiment of this application. FIG. 1A(2) is an original picture of a picture, and FIG. 1A(1) is a grayscale picture that is output after saliency detection is performed on the original picture. In the grayscale picture, a region with a larger grayscale value is a saliency region of the picture. The grayscale value is a color depth range of a pixel in a monochrome picture. The grayscale value usually ranges from 0 to 255, where white is 255, and black is 0. A larger grayscale value indicates that a color of the pixel is closer to white.

Semantic segmentation is a technology and process of segmenting an image into several specific and unique regions and proposing semantic categories. Image content understanding is added to semantic segmentation. The regions obtained through segmentation are classified based on content types. Each pixel in the image corresponds to a semantic category. In the embodiments of this application, image segmentation may be implemented through deep learning. FIG. 1B(1) and FIG. 1B(2) are a schematic diagram of an image segmentation result according to an embodiment of this application. FIG. 1B(2) is an original picture of a photo, and FIG. 1B(1) is a region segmentation result obtained after image segmentation is performed on the original picture. In the segmentation result, pixels having a same grayscale value form one region, and the region corresponds to one semantic category. In addition, different regions correspond to different semantic categories. For example, a semantic category corresponding to a region 1 may be "building", a semantic category corresponding to a region 2 may be "sky", a semantic category corresponding to a region 3 may be "plant", and a semantic category corresponding to a region 4 may be "lake".

Line detection is a method used to identify an apparent straight line in an image. Before line detection, edge detection (Edge Detection) needs to be performed on the image. Classical line detection algorithms include Hough line detection (Hough Line) and LSD (Line Segment Detector) line detection. A principle of Hough line detection is to transform a point in an image from a Cartesian coordinate system to parameter space, and calculate a quantity of points on a straight line by using a statistical method, to search for a straight line that may exist. LSD line detection is to determine a straight line by calculating a value and a direction of a gradient of a point and determining a connected region. FIG. 1C(1) and FIG. 1C(2) are a schematic diagram of a line detection result according to an embodiment of this application. FIG. 1C(2) is an original picture of a photo, and FIG. 1C(1) is a result obtained after line detection is performed on the original picture. A straight line that may exist in the picture can be determined.

A user interface (user interface, UI) is a medium interface for interaction and information exchange between an application or an operating system and a user, and implements conversion between an internal form of information and a form acceptable to the user. A user interface of an application is source code written in a specific computer language such as Java or an extensible markup language (extensible markup language, XML). The interface source code is parsed and rendered on an electronic device, and is finally presented as content that can be identified by the user, for example, a control such as a picture, a text, or a button. A control (control) is a basic element of a user interface. Typical controls include a button (button), a widget (widget), a toolbar (toolbar), a menu bar (menu bar), a text box (text box), a scrollbar (scrollbar), a picture, and a text. An attribute and content of a control in an interface are defined by using a tag or a node. For example, the XML, defines, by using a node such as <Textview>, <ImgView>, or <VideoView>, the control included in the interface. One node corresponds to one control or attribute in the interface. After being parsed and rendered, the node is presented as content visible to a user. In addition, interfaces of a plurality of applications such as a hybrid application (hybrid application) usually further include a web page. The web page, also referred to as a page, may be understood as a special control embedded in an application interface. The web page is source code written in a specific computer language, for example, a hypertext markup language (hyper text markup language, HTML), cascading style sheets (cascading style sheets, CSS), or JavaScript (JavaScript, JS). A browser or a web page display component whose function is similar to that of a browser may load and display the web page source code as content that can be identified by the user. Specific content included in the web page is also defined by using a tag or a node in the web page source code. For example, the HTML defines an element and an attribute of the web page by using <p>, <img>, <video>, or <canvas>.

The user interface is usually in a representation form of a graphical user interface (graphic user interface, GUI), which is a user interface that is related to a computer operation and that is displayed in a graphical manner. The graphical user interface may be an interface element such as an icon, a window, or a control displayed on a display of an electronic device.

Figure 2B:
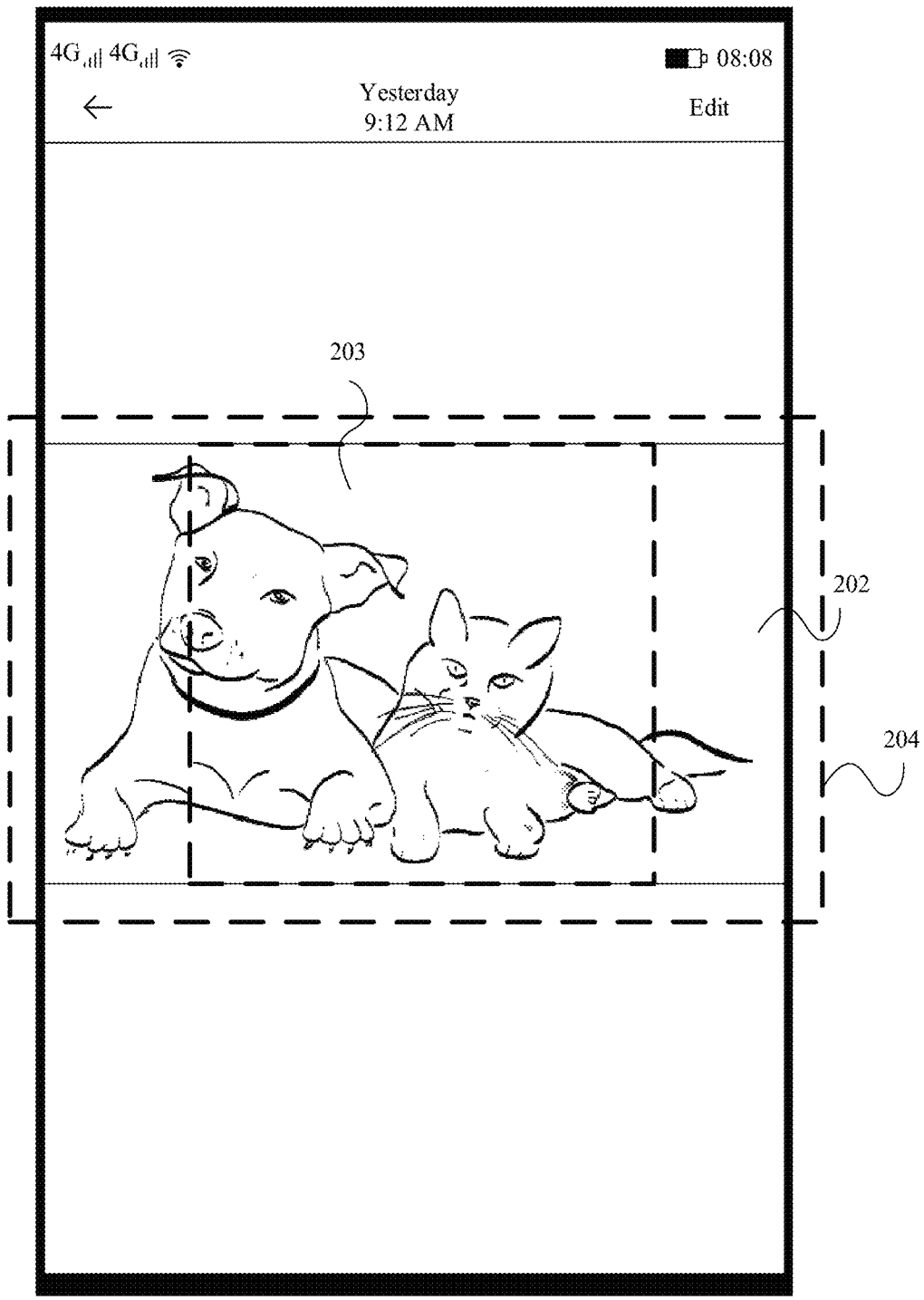
FIG. 2B is a schematic diagram of a user interface used to display an original picture corresponding to a thumbnail according to an embodiment of this application.

A thumbnail is a small-size picture obtained after a picture is compressed. Because a size of the thumbnail is relatively small, a loading speed is very high. This helps a user quickly browse pictures. One thumbnail usually corresponds to one original picture. Usually, an electronic device may detect a user operation performed on the thumbnail, and in response to the user operation, the electronic device displays the original picture corresponding to the thumbnail. In a special case, one thumbnail may alternatively correspond to a plurality of original pictures. In addition, a thumbnail in Gallery of the electronic device usually uses a composition ratio in which an aspect ratio is 1:1. For example, FIG. 2A shows a user interface 21 used to display Gallery in the conventional technology. As shown in FIG. 2A, the user interface 21 includes a plurality of thumbnails, for example, a thumbnail 201. For example, FIG. 2B shows a user interface 22 used to display an original picture. As shown in FIG. 2B, a display region 204 displays an original picture 202 corresponding to the thumbnail 201. A dashed-line box 203 is a central part of the original picture 202 (a geometric center of the dashed-line box coincides with a geometric center of the original picture), and an aspect ratio of the dashed-line box is 1:1. In other words, picture content included in the dashed-line box 203 is picture content included in the thumbnail 201. Certainly, the picture content included in the thumbnail 201 and the picture content included in the dashed-line box 203 are not completely consistent. Usually, the thumbnail is a picture formed after the picture content included in the dashed-line box 203 is compressed. By comparing the picture content included in the dashed-line box 203 with content of the original picture 202, it can be learned that a large amount of information about a pet dog is lost in the thumbnail.

The following embodiments of this application provide a thumbnail generation method and an electronic device, so that a displayed thumbnail can include a saliency region of an original picture, and a composition manner of the saliency region in the thumbnail complies with a composition manner of the saliency region in the original picture. The thumbnail displayed in the embodiments of this application is generated in a cropping manner provided in the embodiments of this application. Different from that in a manner in which a thumbnail is formed through center cropping in the conventional technology, in the cropping manner provided in the embodiments of this application, the thumbnail can include the saliency region in the original picture, and the composition manner of the saliency region in the thumbnail complies with the composition manner of the saliency region in the original picture, so that information about the saliency region in the original picture can be retained to a relatively great extent.

A main procedure of the cropping manner provided in the embodiments of this application is as follows: A saliency region included in an original picture is first determined, and then a composition manner of the saliency region in a thumbnail is determined. The composition manner of the saliency region in the thumbnail is the same as a composition manner of the saliency region in the original picture. The composition manner may include near-center line composition, near-reference line composition, near-edge composition, or the like. Then, an electronic device determines a crop box of the thumbnail from the original picture based on the composition manner of the saliency region in the thumbnail and a position of the saliency region. In a specific implementation, the electronic device may determine, from the original picture based on the crop box, picture content included in the thumbnail, and then compress the picture to form the thumbnail. The cropping manner provided in the embodiments of this application is described in detail in subsequent content. Details are not described herein.

Subsequently, an example electronic device 300 provided in the following embodiments of this application is first described.

Figure 3A:
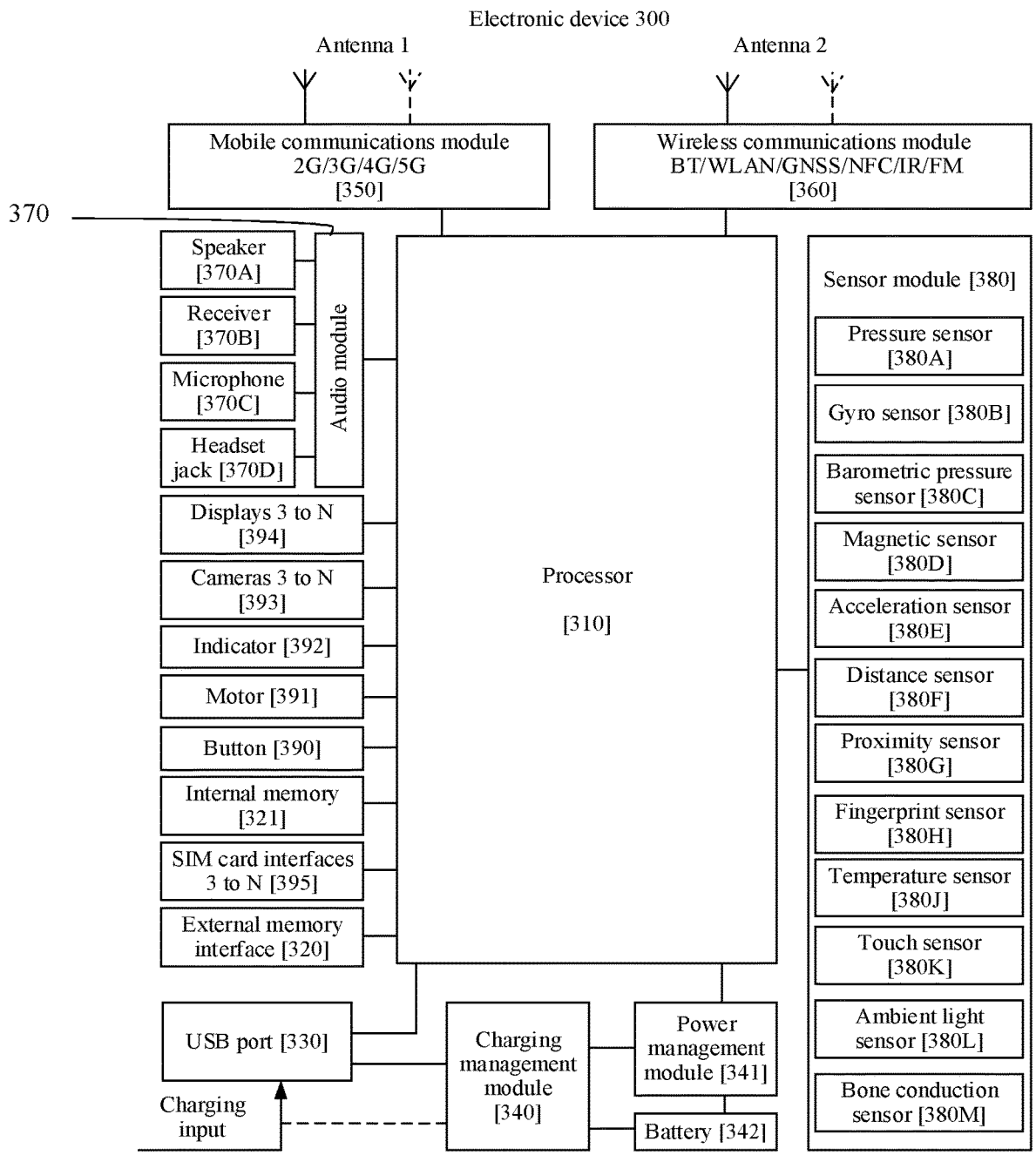
FIG. 3A is a schematic structural diagram of an electronic device according to an embodiment of this application.

FIG. 3A is a schematic structural diagram of the electronic device 300.

The electronic device 300 may include a processor 310, an external memory interface 320, an internal memory 321, a universal serial bus (universal serial bus, USB) port 330, a charging management module 340, a power management module 341, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 391, an indicator 392, a camera module 393, a display 394, a subscriber identification module (subscriber identification module, SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, a proximity sensor 380G, a fingerprint sensor 380G, a temperature sensor 380J, a touch sensor 380K, an ambient light sensor 380L, a bone conduction sensor 380M, and the like. The camera module 393 may be a 3D camera module.

It may be understood that the structure shown in this embodiment of the present invention does not constitute a specific limitation on the electronic device 300. In some other embodiments of this application, the electronic device 300 may include more or fewer components than those shown in the figure, or some components may be combined, or some components may be split, or different component arrangements may be used. The components shown in the figure may be implemented by hardware, software, or a combination of software and hardware.

The processor 310 may include one or more processing units. For example, the processor 310 may include an application processor (application processor, AP), a central processing unit (central processing unit, CPU), a graphics processing unit (graphics processing unit, GPU), a neural-network processing unit (neural-network processing unit, NPU), a modem processor, an image signal processor (image signal processor, ISP), a controller, a memory, a video codec, a digital signal processor (digital signal processor, DSP), or a baseband processor. Different processing units may be independent components, or may be integrated into one or more processors. In some embodiments, the electronic device 300 may alternatively include one or more processors 310.

The controller may be a nerve center and a command center of the electronic device 300. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data that is just used or cyclically used by the processor 310. If the processor 310 needs to use the instructions or the data again, the processor 310 may directly invoke the instructions or the data from the memory. This avoids repeated access and reduces a waiting time of the processor 310, so that efficiency of the electronic device 300 is improved.

In some embodiments, the processor 310 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (derail clock line, SCL). In some embodiments, the processor 310 may include a plurality of groups of I2C buses. The processor 310 may be coupled to the touch sensor 380K, a charger, a flash, the camera module 393, and the like through different I2C bus interfaces. For example, the processor 310 may be coupled to the touch sensor 380K through the I2C interface, so that the processor 310 communicates with the touch sensor 380K through the I2C bus interface to implement a touch function of the electronic device 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communications module 360 through the I2S interface, to implement a function of answering a call through a Bluetooth headset.

The PCM interface may also be configured to: perform audio communication, and sample, quantize, and code an analog signal. In some embodiments, the audio module 370 may be coupled to the wireless communications module 360 through the PCM bus interface. In some embodiments, the audio module 370 may also transmit an audio signal to the wireless communications module 360 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 310 to the wireless communications module 360. For example, the processor 310 communicates with a Bluetooth module in the wireless communications module 360 through the UART interface, to implement a Bluetooth function. In some embodiments, the audio module 370 may transmit an audio signal to the wireless communications module 360 through the UART interface, to implement a function of playing music through a Bluetooth headset.

The MIPI interface may be configured to connect the processor 310 to a peripheral component such as the display 394 or the camera module 393. The MIPI interface includes a camera serial interface (camera serial interface, CSI), a display serial interface (display serial interface, DSI), or the like. In some embodiments, the processor 310 communicates with the camera module 393 through the CSI interface, to implement a photographing function of the electronic device 300. The processor 310 communicates with the display 394 through the DSI interface, to implement a display function of the electronic device 300.

The GPIO interface may be configured through software. The GPIO interface may be configured as a control signal, or may be configured as a data signal. In some embodiments, the GPIO interface may be configured to connect the processor 310 to the camera module 393, the display 394, the wireless communications module 360, the audio module 370, the sensor module 380, and the like. The GPIO interface may be alternatively configured as the I2C interface, the I2S interface, the UART interface, the MIPI interface, or the like.

The USB port 330 is a port that conforms to a USB standard specification, and may be specifically a mini USB port, a micro USB port, a USB Type-C port, or the like. The USB port 330 may be configured to connect to the charger to charge the electronic device 300, or may be configured to perform data transmission between the electronic device 300 and a peripheral device, or may be configured to connect to a headset to play audio through the headset. Alternatively, the port may be configured to connect to another electronic device, for example, an AR device.

It may be understood that an interface connection relationship between the modules that is shown in this embodiment of the present invention is merely an example for description, and does not constitute a limitation on the structure of the electronic device 300. In some other embodiments, the electronic device 300 may alternatively use an interface connection manner different from that in the foregoing embodiment, or a combination of a plurality of interface connection manners.

The charging management module 340 is configured to receive a charging input from the charger. The charger may be a wireless charger or a wired charger. In some embodiments of wired charging, the charging management module 340 may receive a charging input from the wired charger through the USB port 330. In some embodiments of wireless charging, the charging management module 340 may receive a wireless charging input through a wireless charging coil of the electronic device 300. The charging management module 340 may further supply power to the electronic device through the power management module 341 while charging the battery 342.

The power management module 341 is configured to connect the battery 342, the charging management module 340, and the processor 310. The power management module 341 receives an input from the battery 342 and/or the charging management module 340, and supplies power to the processor 310, the internal memory 321, an external memory, the display 394, the camera module 393, the wireless communications module 360, and the like. The power management module 341 may be further configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same device.

A wireless communication function of the electronic device 300 may be implemented through the antenna 1, the antenna 2, the mobile communications module 350, the wireless communications module 360, a modem processor, a baseband processor, and the like.

The antenna 1 and the antenna 2 are configured to transmit and receive electromagnetic wave signals. Each antenna in the electronic device 300 may be configured to cover one or more communication bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 350 may provide a wireless communication solution that includes 2G/3G/4G/5G or the like and that is applied to the electronic device 300. The mobile communications module 350 may include at least one filter, a switch, a power amplifier, a low noise amplifier (low noise amplifier, LNA), and the like. The mobile communications module 350 may receive an electromagnetic wave through the antenna 1, perform processing such as filtering or amplification on the received electromagnetic wave, and transmit the electromagnetic wave to the modem processor for demodulation. The mobile communications module 350 may further amplify a signal modulated by the modem processor, and convert the signal into an electromagnetic wave for radiation through the antenna 1. In some embodiments, at least some functional modules in the mobile communications module 350 may be disposed in the processor 310. In some embodiments, at least some functional modules in the mobile communications module 350 and at least some modules in the processor 310 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to an application processor. The application processor outputs a sound signal through an audio device (which is not limited to the speaker 370A, the receiver 370B, or the like), or displays an image or a video through the display 394. In some embodiments, the modem processor may be an independent device. In some other embodiments, the modem processor may be independent of the processor 310, and is disposed in a same device as the mobile communications module 350 or another functional module.

The wireless communications module 360 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 300. The wireless communications module 360 may be one or more devices integrating at least one communications processing module. The wireless communications module 360 receives an electromagnetic wave through the antenna 2, performs frequency modulation and filtering processing on an electromagnetic wave signal, and sends a processed signal to the processor 310. The wireless communications module 360 may further receive a to-be-sent signal from the processor 310, perform frequency modulation and amplification on the signal, and convert the signal into an electromagnetic wave for radiation through the antenna 2. For example, the wireless communications module 360 may include a Bluetooth module, a Wi-Fi module, and the like.

In some embodiments, the antenna 1 and the mobile communications module 350 in the electronic device 300 are coupled, and the antenna 2 and the wireless communications module 360 are coupled, so that the electronic device 300 can communicate with a network and another device through a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 300 may implement the display function through a GPU, the display 394, the application processor, and the like. The GPU is a microprocessor for image processing, and is connected to the display 394 and the application processor. The GPU is configured to perform mathematical and geometric calculation, and is configured to render an image. The processor 310 may include one or more GPUs that execute instructions to generate or change display information.

The display 394 is configured to display an image, a video, and the like. The display 394 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini LED, a micro LED, a micro-OLED, a quantum dot light-emitting diode (quantum dot light-emitting diodes, QLED), or the like. In some embodiments, the electronic device 300 may include one or more displays 394.

The electronic device 300 may implement a photographing function by using the camera module 393, the ISP, the video codec, the GPU, the display 394, the application processor AP, the neural-network processing unit NPU, and the like.

The camera module 393 may be configured to collect color image data of a photographed object. The ISP may be configured to process the color image data collected by the camera module 393. For example, during photographing, a shutter is opened, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera module 393.

The digital signal processor is configured to process a digital signal, and may further process another digital signal in addition to the digital image signal. For example, when the electronic device 300 selects a frequency, the digital signal processor is configured to perform Fourier transform or the like on frequency energy.

The video codec is configured to compress or decompress a digital video. The electronic device 300 may support one or more video codecs. In this way, the electronic device 300 can play or record videos in a plurality of coding formats, for example, moving picture experts group (moving picture experts group, MPEG)-3, MPEG-2, MPEG-3, and MPEG-4.

The NPU is a neural network (neural network, NN) computing processor, quickly processes input information by referring to a structure of a biological neural network, for example, by referring to a transfer mode between human brain neurons, and may further continuously perform self-learning. Applications such as intelligent cognition of the electronic device 300 may be implemented through the NPU, for example, image recognition, facial recognition, speech recognition, and text understanding.

The external memory interface 320 may be configured to connect to an external memory card, for example, a micro SD card, to extend a storage capability of the electronic device 300. The external memory card communicates with the processor 310 through the external memory interface 320, to implement a data storage function. For example, data such as music, a photo, and a video is stored in the external memory card.

The internal memory 321 may be configured to store one or more computer programs, and the one or more computer programs include instructions. The processor 310 may run the instructions stored in the internal memory 321, so that the electronic device 300 performs the thumbnail display method of the electronic device that is provided in some embodiments of this application, various function applications, data processing, and the like. The internal memory 321 may include a program storage region and a data storage region. The program storage region may store an operating system. The program storage region may further store one or more applications (for example, Gallery and Contacts) and the like. The data storage region may store data (for example, a photo or a contact) created in a process of using the electronic device 300. In addition, the internal memory 321 may include a high-speed random access memory, and may further include a nonvolatile memory, for example, at least one magnetic disk storage device, a flash memory device, or a universal flash storage (universal flash storage, UFS).

The electronic device 300 may implement an audio function, for example, music playing and recording, through the audio module 370, the speaker 370A, the receiver 370B, the microphone 370C, the headset jack 370D, the application processor, and the like.

The audio module 370 is configured to convert digital audio information into an analog audio signal for output, and is also configured to convert an analog audio input into a digital audio signal. The audio module 370 may be further configured to: code and decode audio signals. In some embodiments, the audio module 370 may be disposed in the processor 310, or some functional modules in the audio module 370 are disposed in the processor 310.

The speaker 370A, also referred to as a "horn", is configured to convert an audio electrical signal into a sound signal. The electronic device 300 may listen to music or answer a hands-free call through the speaker 370A.

The receiver 370B, also referred to as an "earpiece", is configured to convert an audio electrical signal into a sound signal. When the electronic device 300 answers a call or receives a voice message, the receiver 370B may be placed close to a human ear to listen to a voice.

The microphone 370C, also referred to as a "mike", is configured to convert a sound signal into an electrical signal. When making a call or sending a voice message, a user may place the mouth of the user near the microphone 370C to make a sound, to input a sound signal to the microphone 370C. At least one microphone 370C may be disposed in the electronic device 300. In some other embodiments, two microphones 370C may be disposed in the electronic device 300, to collect a sound signal and implement a noise reduction function. In some other embodiments, three, four, or more microphones 370C may alternatively be disposed in the electronic device 300, to collect a sound signal, reduce noise, identify a sound source, implement a directional recording function, and the like.

The headset jack 370D is configured to connect to a wired headset. The headset jack 370D may be the USB port 330, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 380A is configured to sense a pressure signal, and can convert the pressure signal into an electrical signal. In some embodiments, the pressure sensor 380A may be disposed in the display 394. There are many types of pressure sensors 380A, for example, a resistive pressure sensor, an inductive pressure sensor, and a capacitive pressure sensor. The capacitive pressure sensor may include at least two parallel plates made of conductive materials. When a force is applied to the pressure sensor 380A, capacitance between electrodes changes. The electronic device 300 determines pressure intensity based on the capacitance change. When a touch operation is performed on the display 394, the electronic device 300 detects intensity of the touch operation through the pressure sensor 380A. The electronic device 300 may also calculate a touch location based on a detection signal of the pressure sensor 380A. In some embodiments, touch operations that are performed at a same touch location but have different touch operation intensity may correspond to different operation instructions. For example, when a touch operation whose touch operation intensity is less than a first pressure threshold is performed on a messaging application icon, an instruction for viewing an SMS message is executed. When a touch operation whose touch operation intensity is greater than or equal to the first pressure threshold is performed on the messaging application icon, an instruction for creating a new SMS message is executed.

The gyro sensor 380B may be configured to determine a motion posture of the electronic device 300. In some embodiments, an angular velocity of the electronic device 300 around three axes (namely, x, y, and z axes) may be determined through the gyro sensor 380B. The gyro sensor 380B may be configured to implement image stabilization during photographing. For example, when the shutter is opened, the gyro sensor 380B detects an angle at which the electronic device 300 jitters, obtains, through calculation based on the angle, a distance for which a lens module needs to compensate, and allows the lens to cancel the jitter of the electronic device 300 through reverse motion, to implement the image stabilization. The gyro sensor 380B may also be used in a navigation scenario and a somatic game scenario.

The barometric pressure sensor 380C is configured to measure barometric pressure. In some embodiments, the electronic device 300 calculates an altitude based on a value of the barometric pressure measured by the barometric pressure sensor 380C, to assist positioning and navigation.

The magnetic sensor 380D includes a Hall sensor. The electronic device 300 may detect opening/closing of a flip leather case through the magnetic sensor 380D. In some embodiments, when the electronic device 300 is a clamshell phone, the electronic device 300 may detect opening/closing of a flip cover through the magnetic sensor 380D. Further, a feature such as automatic unlocking upon opening of the flip cover is set based on a detected opening or closing state of the leather case or a detected opening or closing state of the flip cover.

The acceleration sensor 380E may detect magnitude of accelerations of the electronic device 300 in various directions (usually on three axes), and may detect magnitude and a direction of the gravity when the electronic device 300 is still. The acceleration sensor 380E may further be configured to identify a posture of the electronic device, and is applied to an application such as switching between landscape mode and portrait mode or a pedometer.

The distance sensor 380F is configured to measure a distance. The electronic device 300 may measure the distance through infrared or a laser. In some embodiments, in a photographing scenario, the electronic device 300 may measure a distance through the distance sensor 380F to implement quick focusing.

For example, the proximity sensor 380G may include a light-emitting diode (LED) and an optical detector, for example, a photodiode. The light-emitting diode may be an infrared light-emitting diode. The electronic device 300 emits infrared light through the light-emitting diode. The electronic device 300 detects infrared reflected light from a nearby object through the photodiode. When detecting sufficient reflected light, the electronic device 300 may determine that there is an object near the electronic device 300. When detecting insufficient reflected light, the electronic device 300 may determine that there is no object near the electronic device 300. The electronic device 300 can detect, through the proximity sensor 380G, that the user holds the electronic device 300 close to an ear to make a call, and then can automatically turn off a screen for power saving. The proximity sensor 380G may also be used in a smart cover mode or a pocket mode to automatically perform screen unlocking or locking.

The ambient light sensor 380L is configured to sense ambient light brightness. The electronic device 300 may adaptively adjust brightness of the display 394 based on the sensed ambient light brightness. The ambient light sensor 380L may also be configured to automatically adjust white balance during photographing. The ambient light sensor 380L may also cooperate with the proximity sensor 380G to detect whether the electronic device 300 is in a pocket, to avoid an accidental touch.

The fingerprint sensor 380G is configured to collect a fingerprint. The electronic device 300 may use a feature of the collected fingerprint to implement fingerprint-based unlocking, application lock access, fingerprint-based photographing, fingerprint-based call answering, and the like.

The temperature sensor 380J is configured to detect a temperature. In some embodiments, the electronic device 300 executes a temperature processing policy based on the temperature detected by the temperature sensor 380J. For example, when the temperature reported by the temperature sensor 380J exceeds a threshold, the electronic device 300 lowers performance of a processor located near the temperature sensor 380J, to reduce power consumption to implement thermal protection. In some other embodiments, when the temperature is less than another threshold, the electronic device 300 heats the battery 342 to prevent the electronic device 300 from being shut down abnormally because of a low temperature. In some other embodiments, when the temperature is less than still another threshold, the electronic device 300 boosts an output voltage of the battery 342 to avoid abnormal shutdown caused by a low temperature.

The touch sensor 380K may also be referred to as a touch panel or a touch-sensitive surface. The touch sensor 380K may be disposed in the display 394. The touch sensor 380K and the display 394 form a touchscreen, which is also referred to as a "touchscreen". The touch sensor 380K is configured to detect a touch operation on or near the touch sensor 380K. The touch sensor may transfer the detected touch operation to the application processor, to determine a type of a touch event. A visual output related to the touch operation may be provided by using the display 394. In some other embodiments, the touch sensor 380K may alternatively be disposed on a surface of the electronic device 300 at a location different from that of the display 394.

The bone conduction sensor 380M may obtain a vibration signal. In some embodiments, the bone conduction sensor 380M may obtain a vibration signal of a vibration bone of a human vocal-cord part. The bone conduction sensor 380M may also contact a body pulse to receive a blood pressure beating signal. In some embodiments, the bone conduction sensor 380M may also be disposed in the headset, to form a bone conduction headset. The audio module 370 may obtain a speech signal through parsing based on the vibration signal that is of the vibration bone at the vocal-cord part and that is obtained by the bone conduction sensor 380M, to implement a speech function. The application processor may parse heart rate information based on the blood pressure beating signal obtained by the bone conduction sensor 380M, to implement a heart rate detection function.

The button 390 includes a power button, a volume button, and the like. The button 390 may be a mechanical button, or may be a touch button. The electronic device 300 may receive a button input, and generate a button signal input related to user settings and function control of the electronic device 300.

The motor 391 may generate a vibration prompt. The motor 391 may be configured to provide an incoming call vibration prompt and a touch vibration feedback. For example, touch operations performed on different applications (for example, photographing and audio playing) may correspond to different vibration feedback effects. The motor 391 may also correspond to different vibration feedback effects for touch operations performed on different regions of the display 394. Different application scenarios (for example, a time reminder, information receiving, an alarm clock, and a game) may also correspond to different vibration feedback effects. A touch vibration feedback effect may be further customized.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or detached from the SIM card interface 395, to implement contact with or separation from the electronic device 300. The electronic device 300 may support three or N SIM card interfaces. N is a positive integer greater than 3. The SIM card interface 395 may support a nano SIM card, a micro SIM card, a SIM card, and the like. A plurality of cards may be inserted into a same SIM card interface 395 at the same time. The plurality of cards may be of a same type or of different types. The SIM card interface 395 may be compatible with different types of SIM cards. The SIM card interface 395 may also be compatible with an external memory card. The electronic device 300 interacts with a network through the SIM card, to implement functions such as conversation and data communication. In some embodiments, the electronic device 300 uses an eSIM, namely, an embedded SIM card. The eSIM card may be embedded into the electronic device 300, and cannot be separated from the electronic device 300.

For example, the electronic device 300 shown in FIG. 3A may display, by using the display 394, user interfaces described in the following embodiments. The electronic device 300 may detect a touch operation in each user interface by using the touch sensor 380K, for example, a tap operation (for example, a touch operation or a double-tap operation on an icon) in each user interface, or an upward or downward swipe operation or a gesture operation of drawing a circle in each user interface. In some embodiments, the electronic device 300 may detect, by using the gyro sensor 380B, the acceleration sensor 380E, or the like, a motion gesture made by the user by holding the electronic device 300, for example, shaking of the electronic device. In some embodiments, the electronic device 300 may detect a non-touch gesture operation by using the camera module 393 (for example, a 3D camera or a depth camera).

A software system of the electronic device 300 may use a layered architecture, an event-driven architecture, a micro kernel architecture, a micro service architecture, or a cloud architecture. In the embodiments of the present invention, an Android system with the layered architecture is used as an example to illustrate the software structure of the electronic device 300.

Figure 3B:
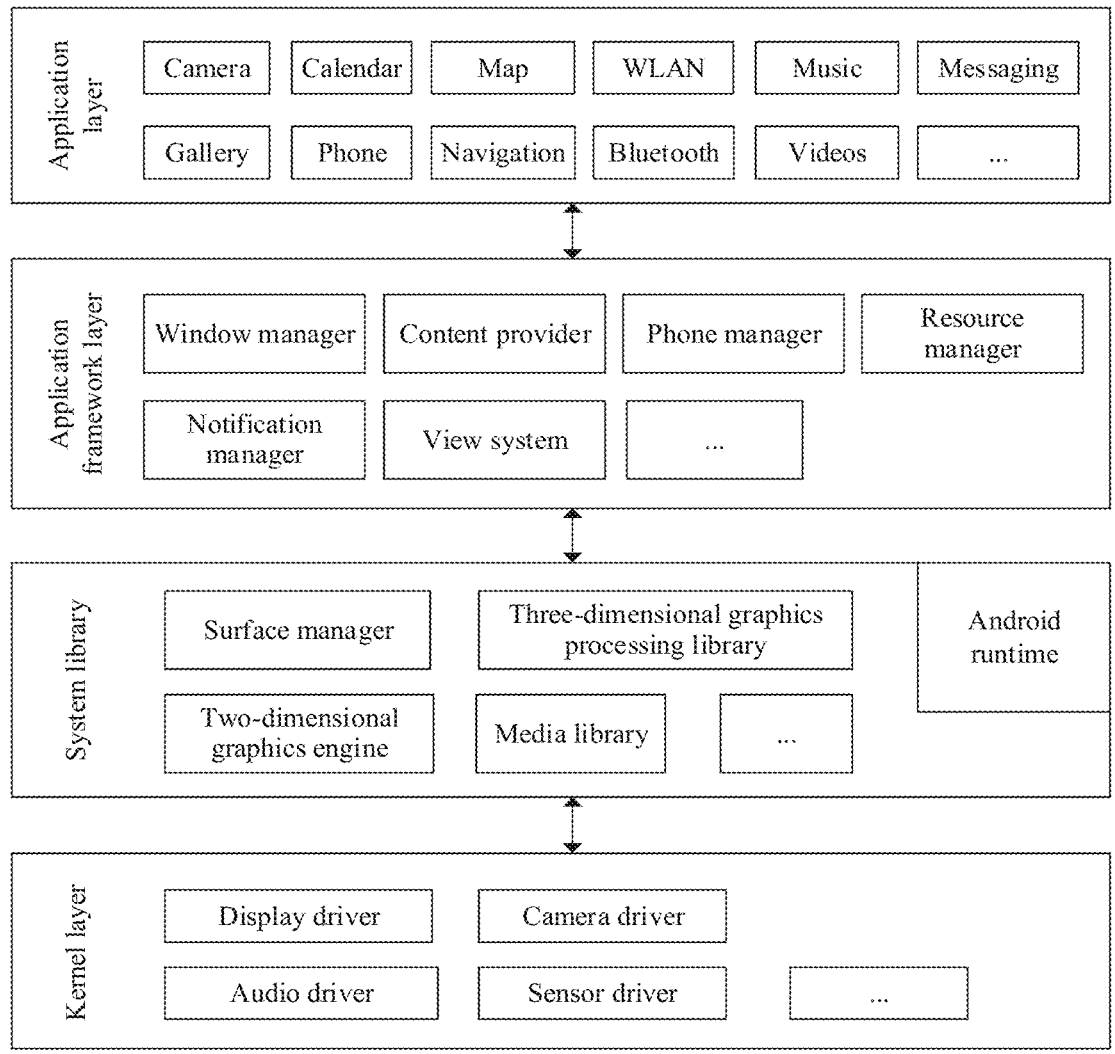
FIG. 3B is a block diagram of a software structure of an electronic device according to an embodiment of the present invention.

FIG. 3B is a block diagram of the software structure of the electronic device 300 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3B, the application packages may include applications such as Camera, Gallery, Calendar, Phone, Map, Navigation, WLAN, Bluetooth, Music, Videos, and Messaging.

The application framework layer provides an application programming interface (application programming interface, API) and a programming framework for an application at the application layer. The application framework layer includes some predefined functions.

As shown in FIG. 3B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying a picture. The view system may be configured to construct an application. A display interface may include one or more views. For example, a display interface including an SMS message notification icon may include a text display view and a picture display view.

The phone manager is configured to provide a communication function of the electronic device 300, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog box. For example, text information is prompted in the status bar, an alert sound is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording in a plurality of commonly used audio and video formats, static image files, and the like. The media library may support a plurality of audio and video coding formats such as MPEG4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 3B relates to an application presentation (such as Gallery or a file manager) that uses a sharing capability, an instant share module that provides the sharing capability, and a print service (print service) and a print spooler (print spooler) that provide a printing capability. In addition, the application framework layer provides a printing framework, a WLAN service, and a Bluetooth service, and the bottom kernel layer provides a WLAN Bluetooth capability and a basic communications protocol.

The following describes an example of a working process of software and hardware of the electronic device 300 with reference to a thumbnail display scenario.

When the touch sensor 380K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a tap operation, and the control corresponding to the tap operation is a control of a Gallery icon. The Gallery invokes an interface of the application framework layer to enable the Gallery and then display a thumbnail by using the display 394.

The following describes an example user interface that is on the electronic device 300 and that is used to display an application menu.

Figure 4:
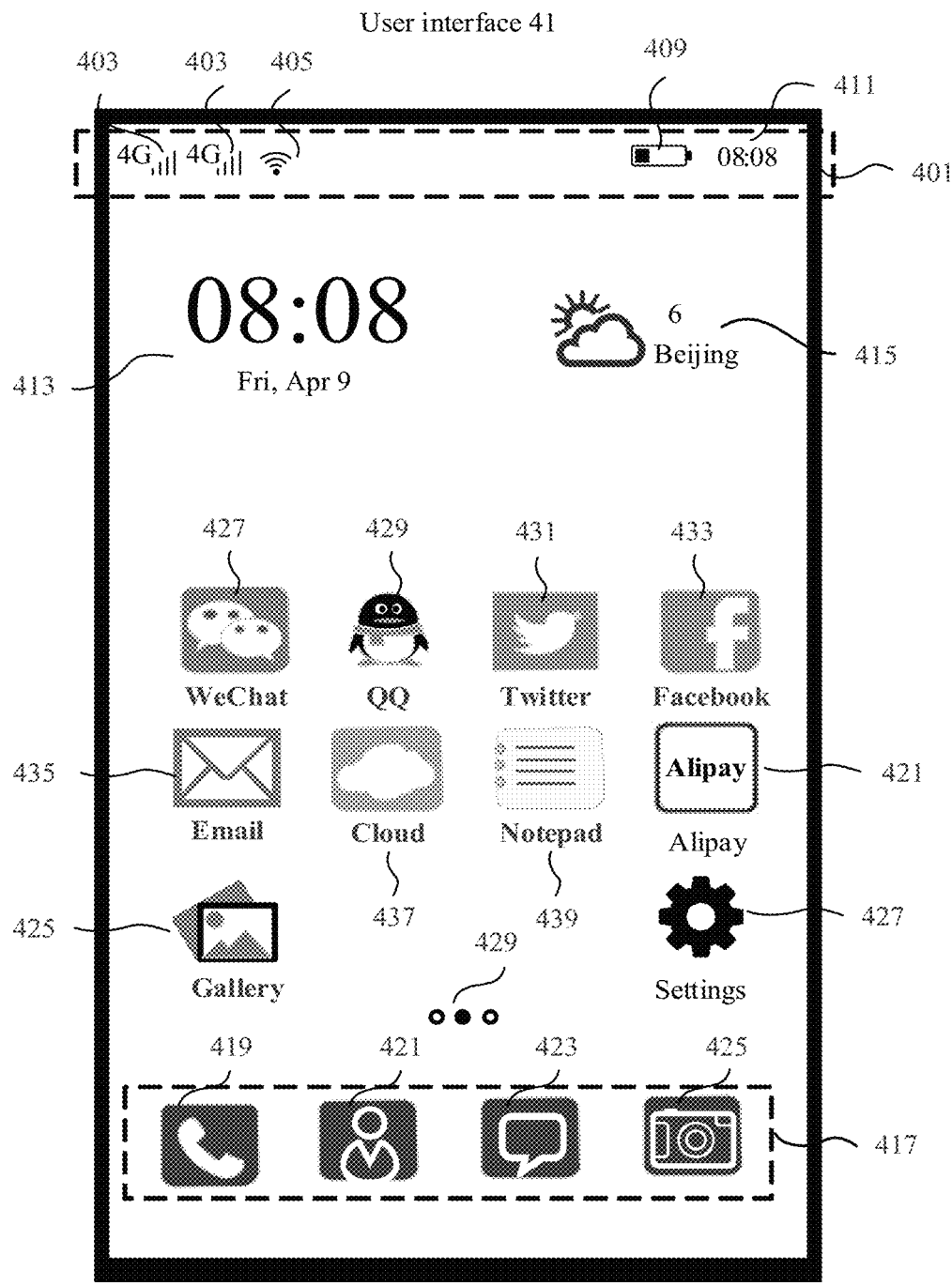
FIG. 4 is a schematic diagram of a user interface used to display an application menu according to an embodiment of this application.

For example, FIG. 4 shows an example user interface 41 that is on the electronic device 300 and that is used for an application menu.

The user interface 41 may include a status bar 401, a tray 417 including icons of commonly used applications, a calendar widget 413, a weather widget 415, and other application icons.

The status bar 401 may include one or more signal strength indicators 403 of one or more mobile communication signals (which may also be referred to as cellular signals), one or more signal strength indicators 405 of one or more wireless fidelity (wireless fidelity, Wi-Fi) signals, a battery status indicator 409, and a time indicator 411.

The calendar widget 413 may be used to indicate a current time, for example, a date, a day of a week, and hour and minute information.

The weather widget 415 may be used to indicate a weather type, for example, clouds early/clearing late or light rain, and may be further used to indicate information such as a temperature.

The tray 417 including the icons of the commonly used applications may display a Phone icon 419, a Contacts icon 421, a Messaging icon 423, and a Camera icon 425.

For example, the other application icons may be a WeChat (Wechat) icon 427, a QQ icon 429, a Twitter (Twitter) icon 431, a Facebook (Facebook) icon 433, an Email icon 435, a Cloud icon 437, a Notepad icon 439, an Alipay icon 421, a Gallery icon 425, and a Settings icon 427. The user interface 41 may further include a page indicator 429. The other application icons may be distributed on another page. The page indicator 429 may be used to indicate a quantity of pages and a specific page currently browsed by a user. For example, the page indicator 429 displays three small dots, the second small dot is black, and the other two small dots are white. This indicates that a mobile phone currently includes three pages and the user currently browses the second page. In addition, the user may swipe leftward or rightward on the current page to browse an application icon on another page.

In some embodiments, the user interface 41 shown as an example in FIG. 4 may be a user interface on a home screen (Home screen).

In some other embodiments, the electronic device 300 may further include a home button. The home button may be a physical button or a virtual button. The home button may be configured to: receive an instruction of the user, and return from a currently displayed UI to the home screen in response to the instruction of the user. This can help the user view the home screen at any time. The instruction may be specifically an operation instruction of pressing/touching the home button once by the user, or may be an operation instruction of consecutively pressing/touching the home button twice by the user within a short time period, or may be an operation instruction of pressing/touching and holding the home button by the user for a predetermined time period. In some other embodiments of this application, a fingerprint sensor may be further integrated into the home button, to collect and recognize a fingerprint when the home button is pressed/touched.

It may be understood that FIG. 4 merely shows the example of the user interface on the electronic device 300, but should not constitute a limitation on the embodiments of this application.

Subsequently, some thumbnail display embodiments provided in the embodiments of this application are described. It should be noted that a thumbnail whose composition ratio is 1:1 is used as an example for description in the following embodiments. In specific implementation, the ratio of the thumbnail may be adjusted as required. This is not limited in the embodiments of this application.

As shown in FIG. 4, the electronic device may detect a touch operation performed on the Gallery icon 425 (for example, a tap operation on the icon 425). In response to the operation, the electronic device may display a user interface 51 shown as an example in FIG. 5A. The user interface 51 may be a user interface of the "Gallery" application and may be used by the user to browse a picture, edit a picture, share a picture, and the like. "Gallery" is a picture management application on an electronic device such as a smartphone or a tablet computer. A name of the application is not limited in this application. For example, the application may alternatively be referred to as "Albums". In other words, the user may tap the icon 425 to open the user interface 51 of "Gallery". Unlimitedly, the user may alternatively open the user interface 51 in another application. For example, the user taps a thumbnail display region in "Camera" to open the user interface 51. "Camera" is a picture shooting application on an electronic device such as a smartphone or a tablet computer, and may be used by the user to perform shooting, for example, photographing and video recording.

Figure 5A:
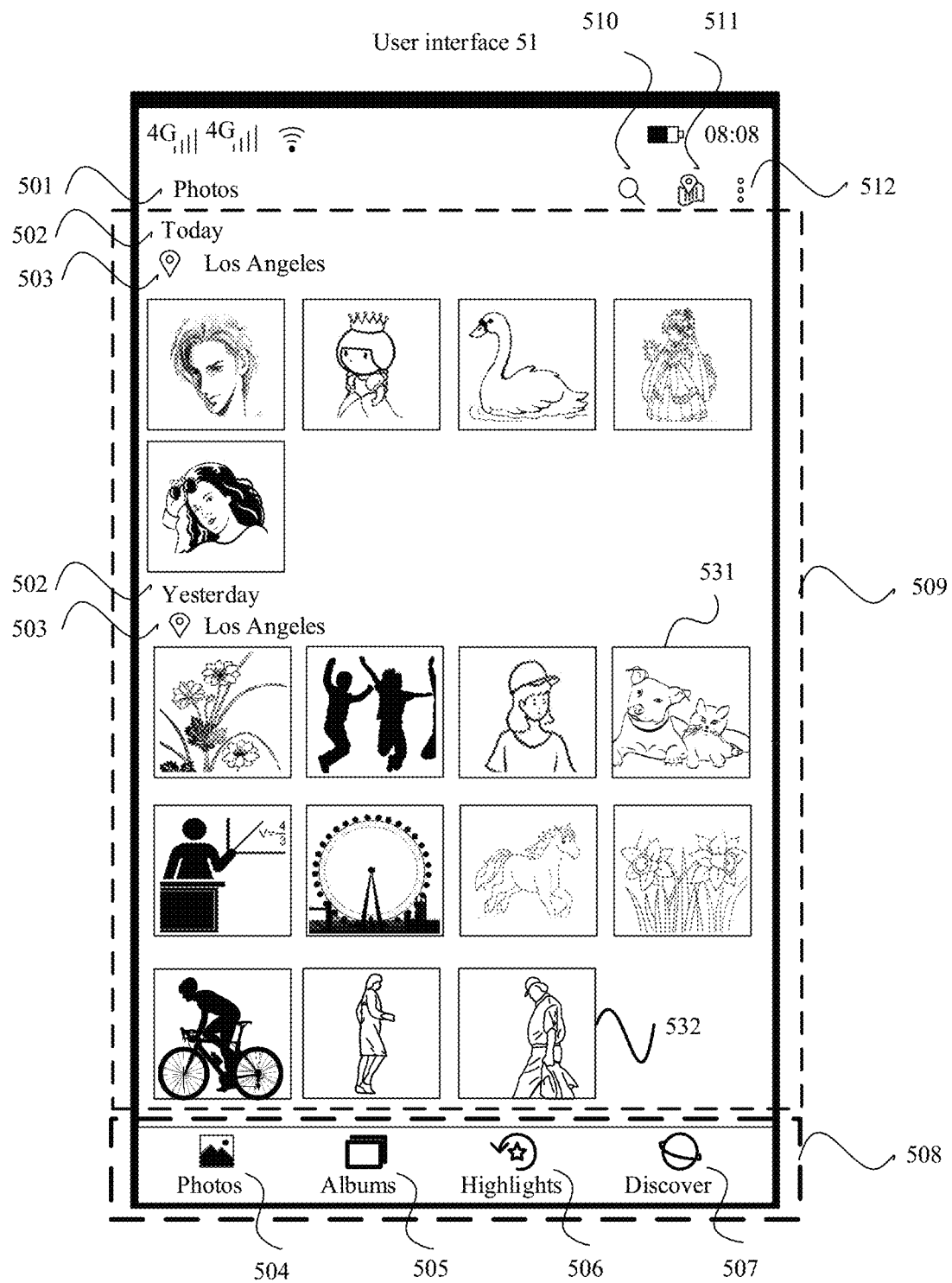
FIG. 5A is a schematic diagram of a user interface used to display a thumbnail according to an embodiment of this application.

For example, FIG. 5A shows the user interface 51 used to display a thumbnail.

The user interface 51 may include a display type indicator 501, a navigation bar 508, a display region 509, a first function icon 510, a second function icon 511, and a third function icon 512.

The display type indicator 501 may be used to indicate a type of content displayed in the current interface. The display type indicator 501 may be Photos, Albums, Highlights, and Discover. Specifically, the user interface 51 displays a "Photos" type, and correspondingly, the display type indicator 501 is "Photos". Display content of the indicator 501 may be refreshed with a status of the navigation bar 508. For example, when the status of the navigation bar 508 is an "Albums" type, the display type indicator 501 is "Albums". When the status of the navigation bar 508 is a "Highlights" type, the display type indicator 501 is "Highlights". When the status of the navigation bar 508 is a "Discover" type, the display type indicator 501 is "Discover".

The display region 509 may include a photo shooting time indicator 502, a photo shooting place indicator 503, and one or more thumbnails, for example, a thumbnail 531 and a thumbnail 532. The electronic device may detect a user operation (for example, a tap operation) performed on a thumbnail, and in response to the user operation, may display a user interface 52 shown as an example in FIG. 5B. The user interface 52 may be used to display an original picture of the thumbnail. The user interface 52 is described below, and details are not first described herein. The photo shooting time indicator 502 may be used to indicate a shooting time of a photo located below the indicator and above a next photo shooting time indicator, for example, today, yesterday, Thursday, April 5, or the like. The photo shooting place indicator 503 may be used to indicate a shooting place of the photo located below the indicator and above the next photo shooting place indicator, for example, Los Angeles, Washington, or the like.

The navigation bar 508 may display a plurality of content types that can be displayed in Gallery. The content types may include a "Photos" type 504, an "Albums" type 505, a "Highlights" type 506, and a "Discover" type 507. Specifically, if the navigation bar 508 indicates that a user interface displays the "Photos" type 504, the user interface displays a plurality of thumbnails (referring to the user interface 51). If the navigation bar 508 indicates that a user interface displays the "Albums" type 504, the user interface displays a plurality of albums, for example, All photos, My favorites, Weibo, and QQ. If the navigation bar 508 indicates that a user interface displays the "Highlights" type 504, the user interface displays a plurality of slide shows arranged in terms of times. If the navigation bar 508 indicates that a user interface displays the "Discover" type 504, the user interface displays a picture obtained from the internet and a plurality of albums locally arranged in terms of photo types (for example, People, Food, and Animals).

The first function icon 510 may be used to receive an instruction of a user, and in response to the instruction of the user, the user interface displays a search bar. This can help the user search for a corresponding photo based on a keyword (for example, a shooting time of the photo, a shooting place of the photo, or people in the photo).

The second function icon 511 may be used to receive an instruction of the user, and in response to the instruction of the user, the user interface displays a map and a picture corresponding to each position on the map. This can help the user view a corresponding picture based on a shooting place.

The third function icon 512 may be used to receive an instruction of the user, and in response to the instruction of the user, the user interface displays more function icons, for example, Play slide shows and Settings.

It may be understood that FIG. 5A merely shows the example of the user interface on the electronic device 300, but should not constitute a limitation on the embodiments of this application.

Figure 5B:
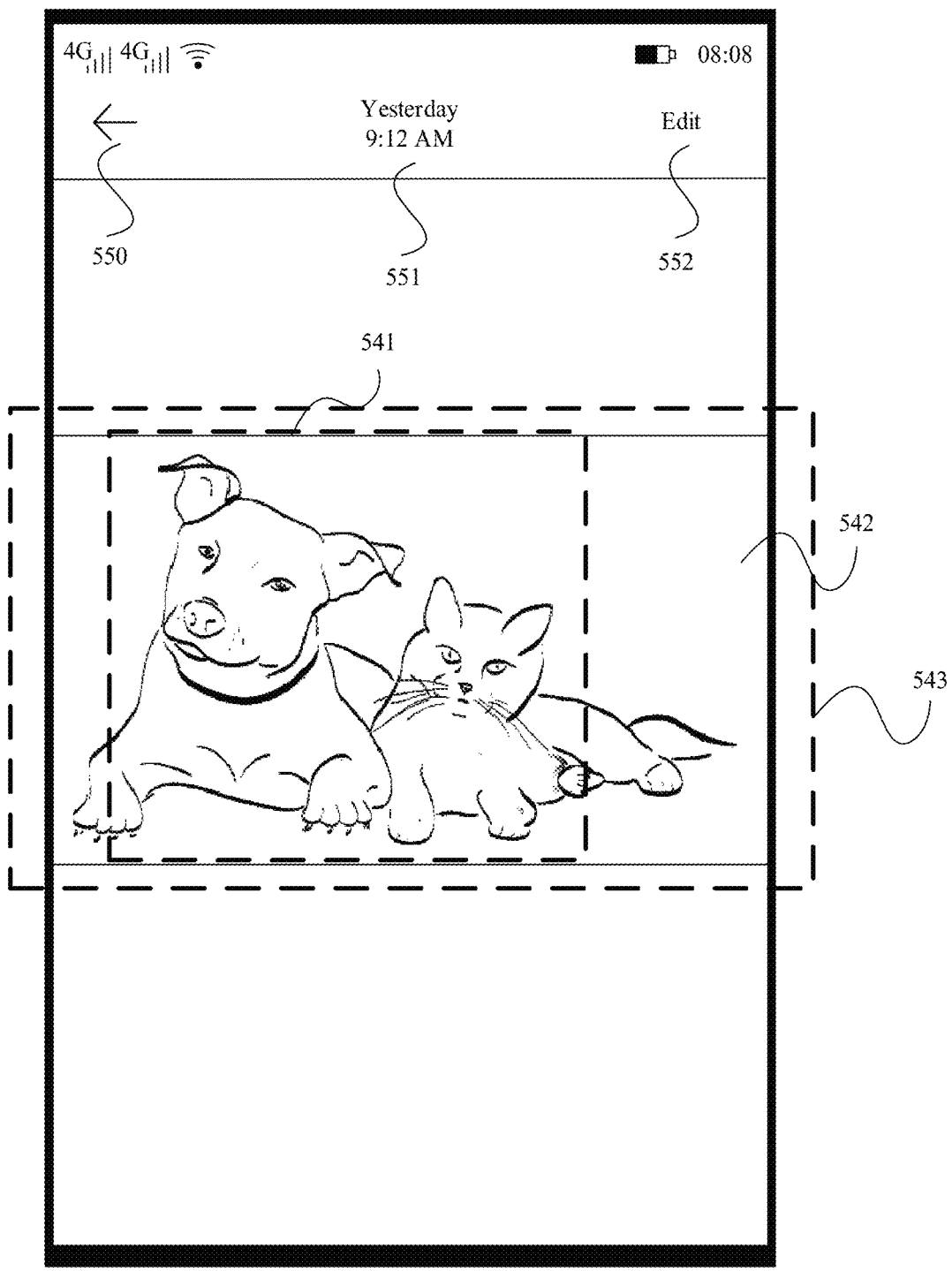
FIG. 5B is a schematic diagram of a user interface used to display an original picture corresponding to a thumbnail according to an embodiment of this application.

For example, FIG. 5B shows the user interface 52 used to display an original picture.

The user interface 52 may include a display region 543, a back button 550, a photo shooting time indicator 551, an edit button 552, and an original picture 542 corresponding to the thumbnail 531.

The display region 543 may be used to display the original picture 542 corresponding to the thumbnail 531. When the electronic device 300 detects a leftward or rightward swipe operation in the display region 543, the electronic device may update, in response to the swipe operation, the picture displayed in the display region 543, to facilitate picture browsing of the user. In other words, the user may swipe leftward or rightward in the display region 543 to browse more pictures. Other than the leftward or rightward swipe operation, the user may alternatively swipe upward or downward in the display region 543 to browse more pictures. It should be noted that the picture may be a picture shot by the user by using the electronic device 300, may be a picture downloaded from the internet, or may be a picture received by the user from another user. This is not limited in the embodiments of this application.

The back button 550 may be used to return to the upper-level user interface 51 of the user interface 52. A person skilled in the art may understand that a logical upper-level page of a page is fixed, and is determined during application design.

The photo shooting time indicator 551 may be used to indicate a shooting time of the picture 542.

The edit button 552 may be used to detect an instruction of the user, and in response to the instruction of the user, the user interface switches to an editing interface for the picture

542, where the editing interface may include icons such as Crop, Filter, White balance, and Contrast, to edit the picture 542.

It should be noted that content included in a dashed-line box 541 is content in the thumbnail 531 in the user interface 51. It can be learned that the thumbnail 531 retains, to a relatively great extent, picture information of a saliency region (that is, a pet dog and a pet cat) included in the original picture. In addition, a composition manner of the saliency region including the pet dog and the pet cat in the thumbnail is the same as a composition manner of the saliency region including the pet dog and the pet cat in the original picture, and both are near-center line composition. For a detailed process of generating the thumbnail corresponding to the picture, refer to a subsequent description of a cropping manner. Details are not described herein. In addition, some thumbnails in the user interface 51 differ from those in the user interface 21 for displaying a thumbnail in the conventional technology. For example, head information of a person is lost in the thumbnail 205 in the user interface 21, while the head information of the person is retained in the thumbnail 532 in the user interface 51. Similarly, the user interface 51 further includes another thumbnail that is different from that in the user interface 21, and the thumbnail is not listed herein. It can be learned through comparison that, in a thumbnail display manner in the embodiments of this application, information about the saliency region in the original picture can be retained to a relatively great extent, so that the user can conveniently view the saliency region in the original picture, and determine, by using the saliency region, whether the original picture corresponding to the thumbnail is a picture required by the user. For example, in a scenario in which the user needs to share a picture, the user may intuitively learn of a relatively large amount of information about a saliency region by viewing a thumbnail. This helps the user locate the picture that needs to be shared. However, in the conventional technology, due to a center cropping manner, information about a saliency region in an original picture is likely to be lost in a thumbnail, and the user cannot determine, by using content of the thumbnail, whether the original picture corresponding to the thumbnail is the picture that needs to be shared. Consequently, the user needs to view the original picture a plurality of times to locate the picture that needs to be shared.

Figure 6A:
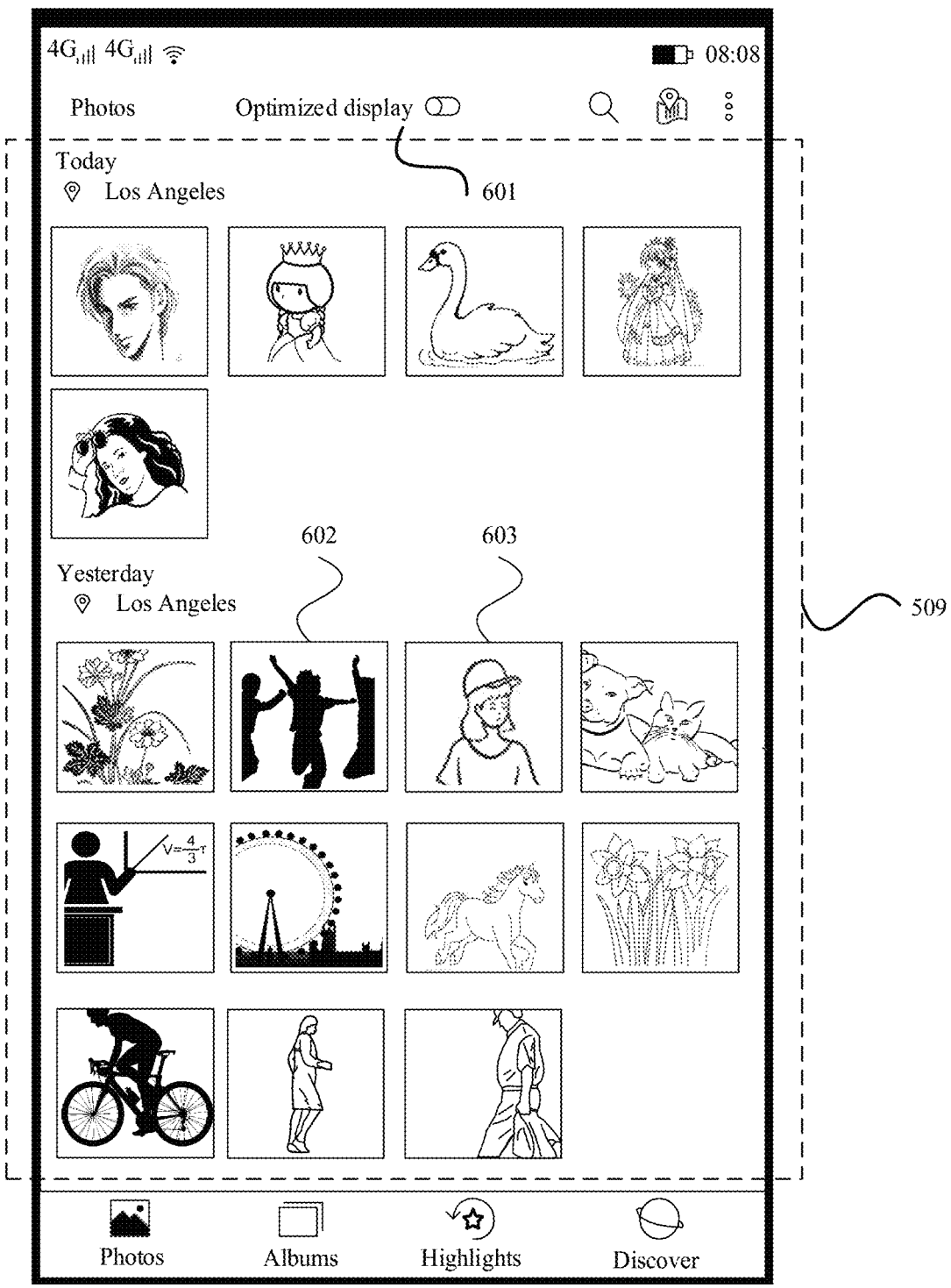
FIG. 6A and FIG. 6B are schematic diagrams of some user interfaces used to display thumbnails according to an embodiment of this application.
Figure 6B:
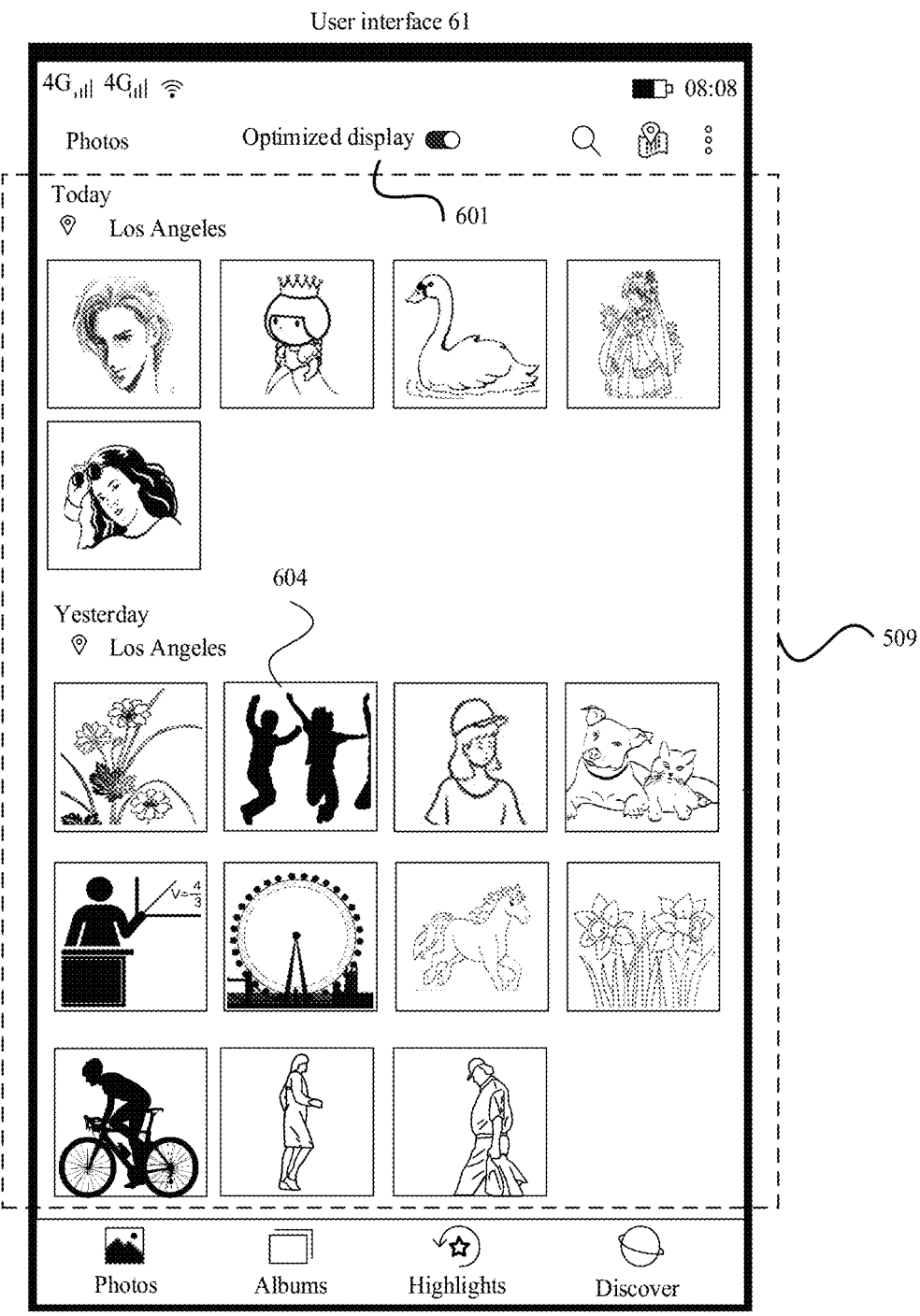

For example, FIG. 6A and FIG. 6B show some other user interfaces 61 used to display thumbnails. As shown in FIG. 6A and FIG. 6B, the user interface 61 may include a display region 509 and a control 601.

The display region 509 may be used to display one or more thumbnails, for example, a thumbnail 602 and a thumbnail 603.

The control 601 ("Optimized display") may have two states: "on (on)" and "off (off)". The control 601 may be a switch control.

A display manner of the thumbnail in the display region 509 may be related to a status of the control 601, and may be selected by using the control 601. Specifically, the electronic device 300 may detect a user operation performed on the control 601, determine a status of the control 301 in response to the user operation, and refresh the thumbnail in the display region 509 based on the status of the control 301. Specifically, if the control 301 is in the off (off) state, the display manner of the thumbnail in the display region 321 is optimized display, referring to FIG. 6A. If the control 301 is in the on (on) state, the display manner of the thumbnail in the display region 321 is original display, referring to FIG. 6B. It should be noted that the original display manner is a manner of displaying a thumbnail through center cropping in the conventional technology, and the optimized display manner is a manner of displaying a thumbnail including a saliency region of an original picture that is provided in the embodiments of this application. It can be learned that, by operating the control 601, the user triggers the electronic device 300 to perform an operation of optimized display on the thumbnail in the user interface, or triggers the electronic device 300 to perform an operation of restoring original display in the user interface. In addition, a name of the control may be adjusted based on a requirement. For example, the control may alternatively be named "Saliency display", "Subject display", or the like. This is not limited in this application.

For example, FIG. 7A to FIG. 7H show an embodiment of user interaction for changing a saliency region displayed by a thumbnail.

Figure 7A:
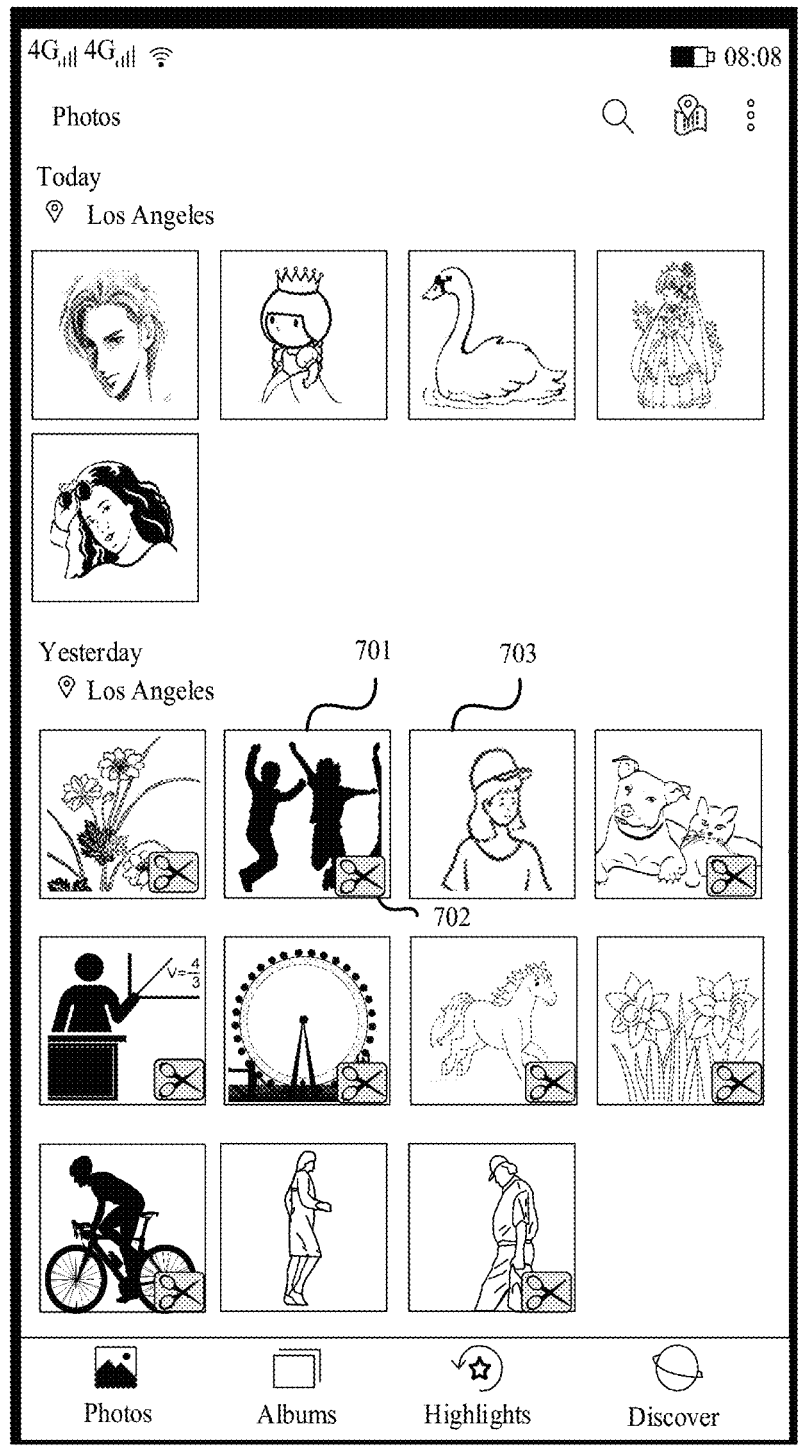
FIG. 7A to FIG. 7H are schematic diagrams of some other user interfaces used to display thumbnails according to an embodiment of this application.

For example, FIG. 7A shows a user interface 71 used to display a thumbnail. The user interface 71 may include a plurality of thumbnail display regions, for example, a display region 701 and a display region 702. The display region is used to display one thumbnail.

If the thumbnail displayed in the display region is generated in the cropping manner provided in the embodiments of this application, a cropping sign 702 is displayed in the thumbnail display region. The cropping sign 702 is used to indicate that the thumbnail is a cropped thumbnail including a saliency region of an original picture.

As shown in FIG. 7A, the display region 701 includes the cropping sign 702. This indicates that a thumbnail displayed in the display region 701 is generated in the cropping manner provided in the embodiments of this application, and the thumbnail includes a saliency region of an original picture. The display region 703 does not include the cropping sign 702. This indicates that a thumbnail displayed in the display region 703 is not cropped in the cropping manner provided in the embodiments of this application. The cropping sign 702 in FIG. 7A is merely an example, and there may alternatively be a cropping sign in another style. This is not limited in the embodiments of this application. Optionally, the cropping manner provided in the embodiments of this application may be performed on all pictures in Gallery to form thumbnails, or the cropping manner provided in the embodiments of this application may be performed on only a picture whose composition ratio is different from a thumbnail ratio to form a thumbnail.

Figure 7B:
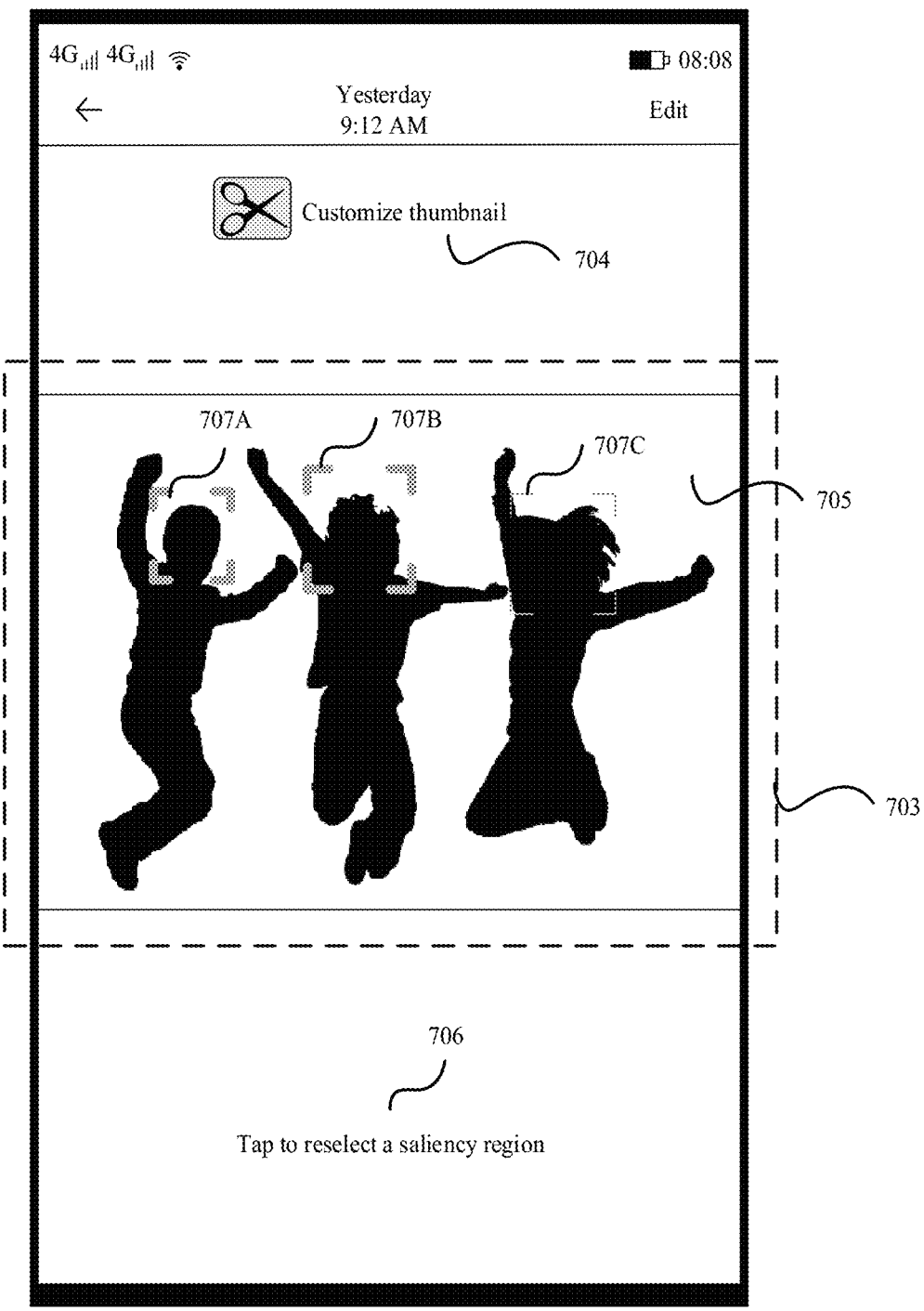
Figure 7C:
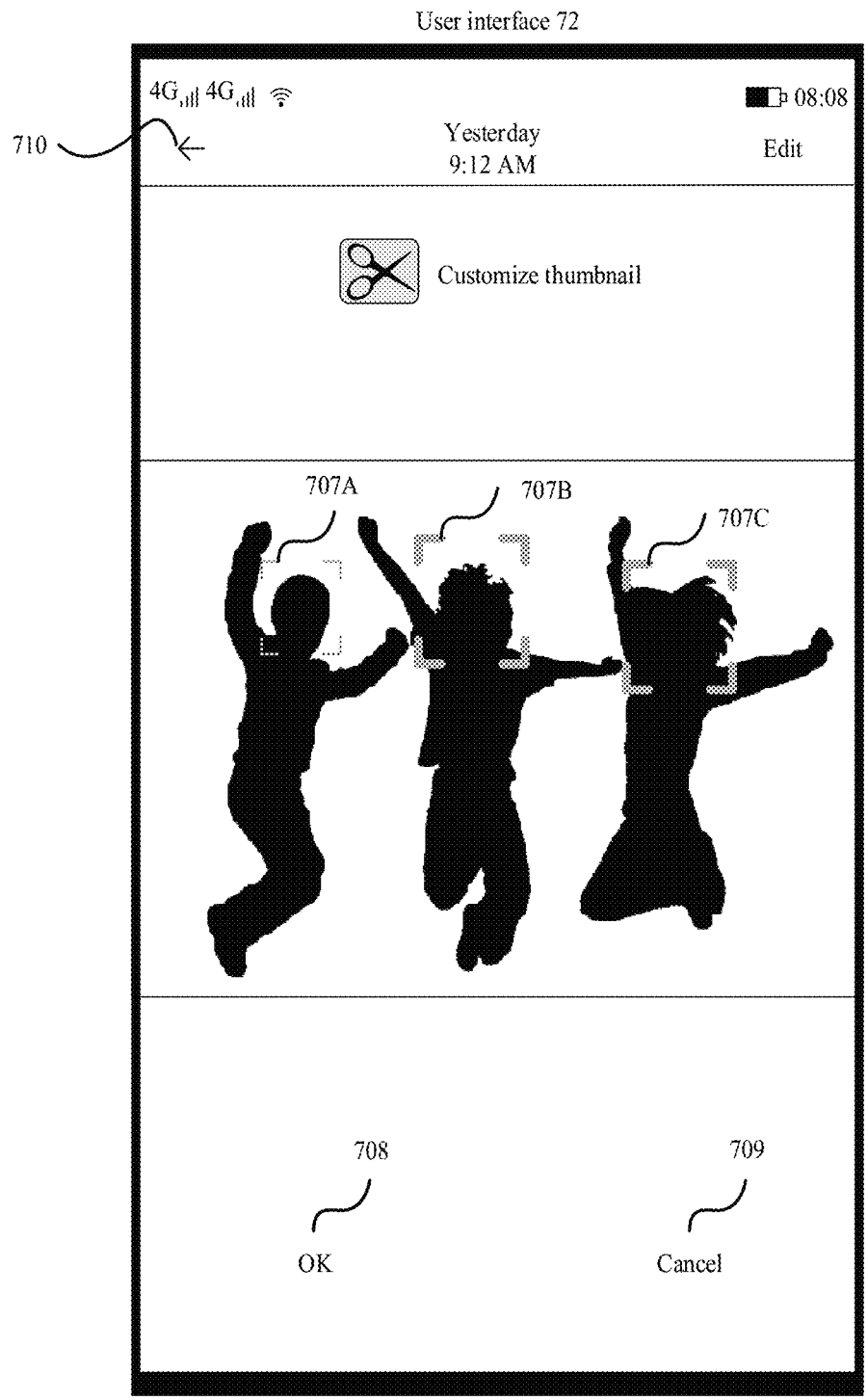

For example, FIG. 7B and FIG. 7C show user interfaces 72 for viewing the original picture of the thumbnail 701. As shown in FIG. 7B, the user interface 72 may include a display region 703 and a control 704.

The display region 703 may display the original picture 705 of the thumbnail 701.

The control 704 ("Customize thumbnail") may be used to receive an operation of a user, and in response to the operation of the user, the electronic device 300 displays one or more prompts in the display region 703, for example, a prompt 707A, a prompt 707B, and a prompt 707C. The prompt is associated with a saliency region of the original picture. A quantity of prompts may be consistent with a quantity of saliency regions. The prompt may be used to prompt the user whether the saliency region associated with the prompt is displayed in the thumbnail 701. Specifically, the prompt 707A and the prompt 707B that are displayed in a bold manner indicate that saliency regions associated with the prompt 707A and the prompt 707B are displayed in the thumbnail 701. The prompt 707C that is normally displayed indicates that a saliency region associated with the prompt 707C is not displayed in the thumbnail 701.

In a possible implementation, in response to the operation performed by the user on the control 704, the electronic device 300 may further display prompt information 706, where the prompt information 706 is used to prompt the user to reselect a saliency region included in the thumbnail. Optionally, the prompt information may disappear after being displayed for a preset time period. In addition, the prompt information 706 may alternatively be displayed in another manner, for example, displayed above the user interface 72 in a form of a pop-up box. This is not limited in the embodiments of this application. For example, FIG. 7B shows a user interface 72 existing after the user changes a saliency region displayed in the thumbnail. The electronic device 300 may detect a user operation performed on a prompt, where the user operation may be used to change a display status of the prompt. In response to the user operation, the electronic device 300 changes the display status of the prompt. A changed display status of the prompt may be used to indicate a saliency region included in an updated thumbnail. For example, if the user taps the prompt 707A once, the prompt 707A may change from a "bold" display state to a "normal" display state. If the user taps the prompt 707C once, the prompt 707C may change from a "normal" display state to a "bold" display state. Changed display statuses of the prompts may indicate that saliency regions included in the updated thumbnail are saliency regions associated with the prompt 707B and the prompt 707C.

It should be noted that there may alternatively be another prompt selection manner, for example, touching and holding a prompt, double-tapping a prompt, or pressing a prompt with specific pressure. This is not limited herein. In addition, the manner of marking a saliency region by using a prompt is merely an example, and there may alternatively be another manner of marking a saliency region. For example, a display color of a saliency region is adjusted to distinguish between different saliency regions by using different colors. Alternatively, a boundary line surrounding a saliency region is displayed, and one closed boundary figure indicates one saliency region. This is not limited in the embodiments of this application. Similarly, the manner in which the electronic device 300 marks a saliency region included in the thumbnail and a saliency region not included in the thumbnail is merely an example, and there may alternatively be another marking manner. For example, a first sign (for example, "√") is displayed in the saliency region included in the thumbnail, and a second sign (for example, "x") is displayed in the saliency region not included in the thumbnail. This is not limited in the embodiments of this application.

In a possible implementation, a quantity of saliency regions that can be selected by the user may be any positive integer, such as one, two, or three, that does not exceed a total quantity of marked saliency regions. Particularly, in an embodiment, the electronic device 300 may set a maximum value of the quantity of saliency regions that can be selected by the user. For example, the maximum value of the quantity of saliency regions that can be selected by the user is not greater than a different between the total quantity of marked saliency regions and 1.

In a possible implementation, in response to the user operation performed on the prompt, the electronic device may further display a control 708 and a control 709. The control 708 is used to confirm a display status of the prompt. After detecting that the user enters an operation on the control 708, the electronic device 300 generates a new thumbnail based on a saliency region associated with a prompt in a bold display state. The control 709 is used to cancel a change of a display status of the prompt. After detecting an operation entered by the user on the control 709, the electronic device 300 cancels the change of the display status of the prompt.

Figure 7D:
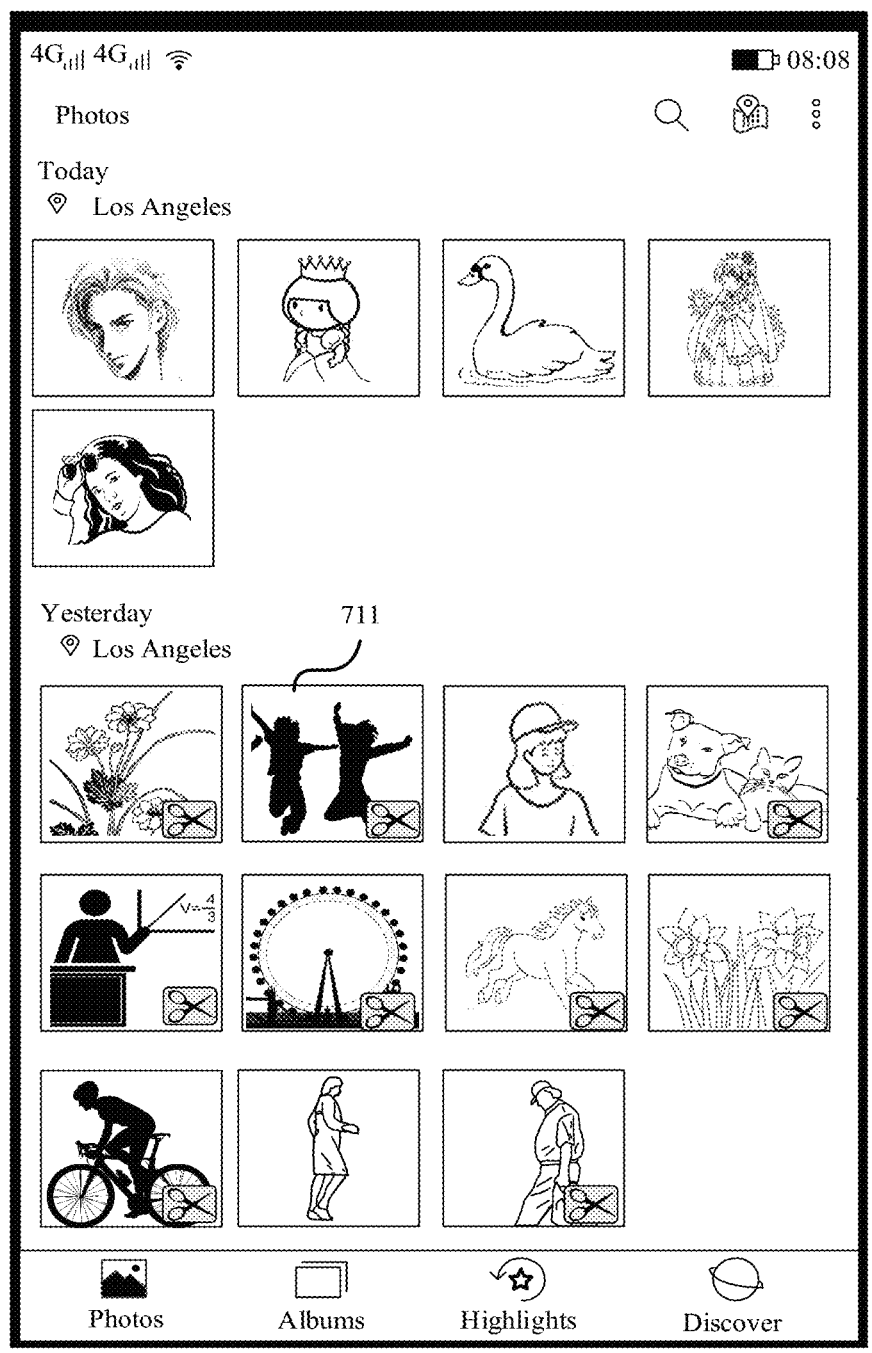

For example, FIG. 7D shows a user interface 71 existing after a saliency region in the thumbnail is changed. As shown in FIG. 7D, after detecting that the user enters the operation on the control 708, the electronic device 300 generates the new thumbnail based on the saliency region associated with the prompt in the bold display state, and jumps to the user interface 71 including the newly generated thumbnail 711. Optionally, the user interface 72 may further include a back button 708, and the back button is used to return to the upper-level user interface 71 of the user interface 72. The back button 708 is used to receive an operation entered by the user, and in response to the operation entered by the user, the electronic device 300 jumps to the user interface 71 including the newly generated thumbnail 711.

Figure 7E:
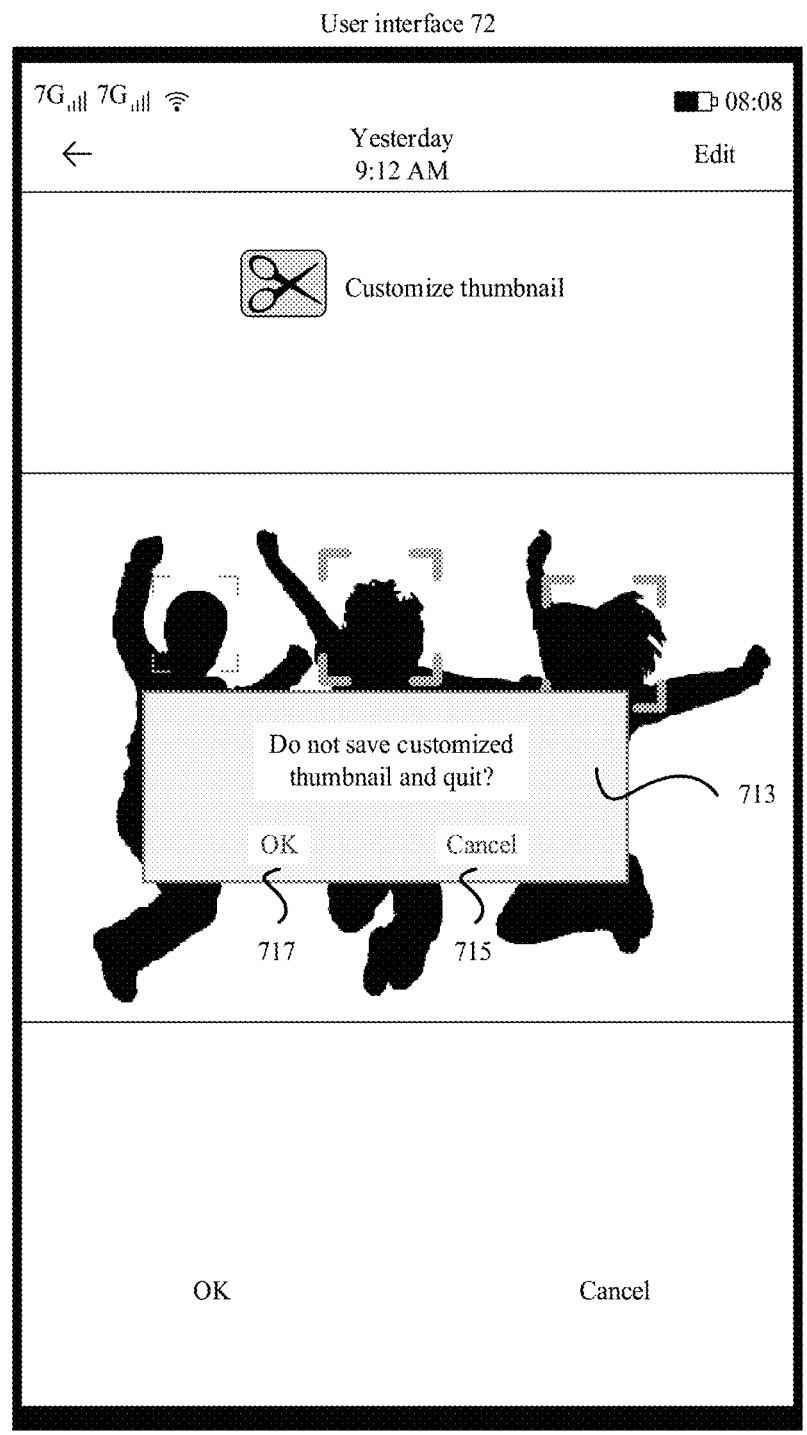

For example, FIG. 7E shows a user interface 72 displaying prompt information 713. In a possible implementation, after detecting the operation entered by the user on the control 709, the electronic device 300 cancels the change of the display status of the prompt, and displays the prompt information 713. The prompt information 713 includes a confirming control 714 and a canceling control 715.

The prompt information 713 is used to prompt the user to confirm a next operation, to avoid a problem that information about a selected prompt is lost due to accidental touch of the user, and a repeated operation needs to be performed. The confirming control 714 is used to receive an operation entered by the user, and the operation entered by the user indicates that the user does not want to adjust the saliency region displayed in the thumbnail. In response to the operation of the user, the electronic device 300 jumps to the user interface 71 including the original thumbnail 701. The canceling control 715 is used to receive an operation entered by the user, and the operation entered by the user indicates that the user wants to continue to adjust the saliency region displayed in the thumbnail. In this case, the electronic device 300 ends displaying the prompt information 713, and receives a prompt selection operation of the user again.

Figure 7F:
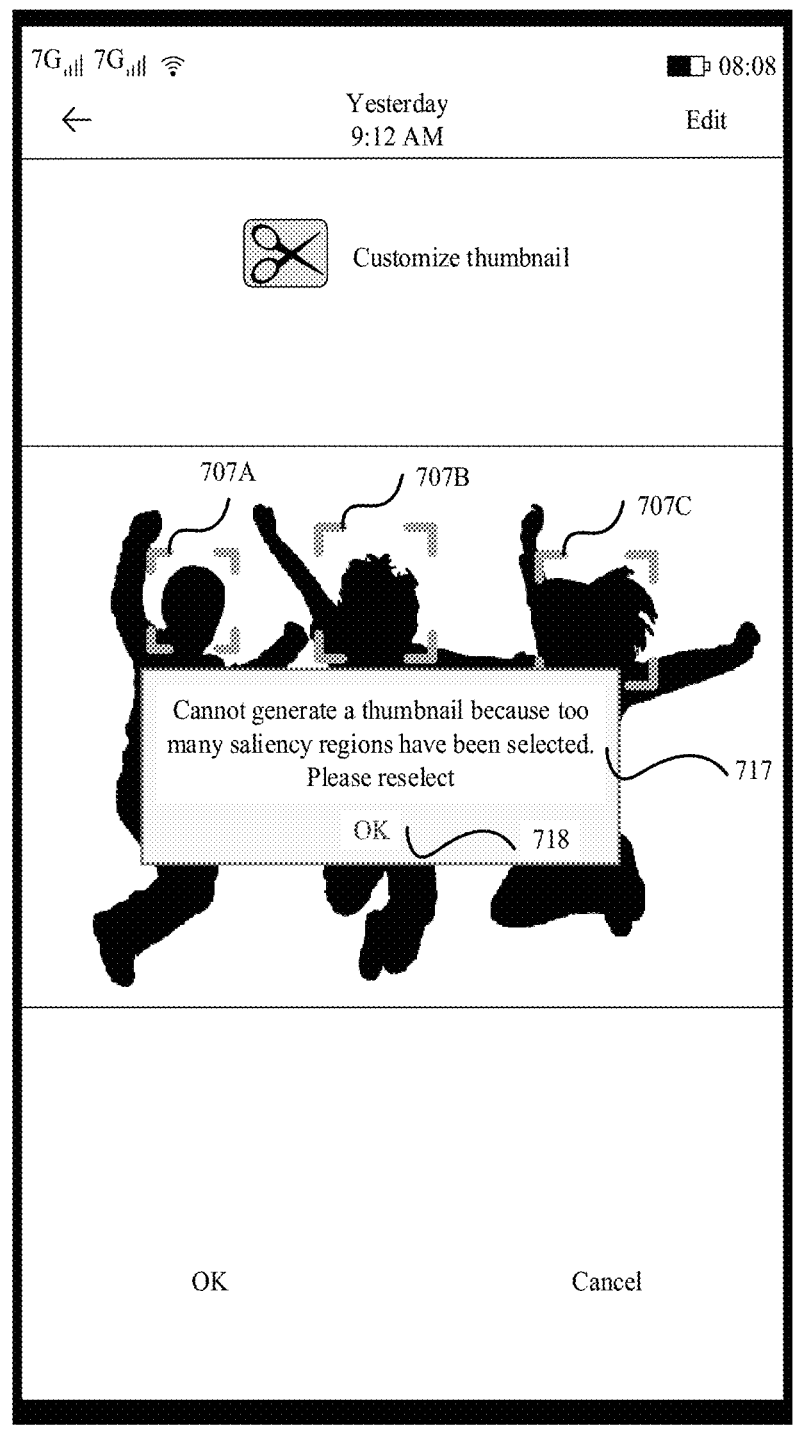

For example, FIG. 7F shows a user interface 72 displaying prompt information 717. In a possible implementation, after receiving an operation of selecting a prompt by the user, the electronic device 300 determines whether an area of the thumbnail can include an area of a saliency region associated with the prompt selected by the user. If the area of the thumbnail cannot include the area of the saliency region associated with the prompt selected by the user, the electronic device 300 displays the prompt information 717 to indicate the user to reselect a prompt. If the area of the thumbnail can include the area of the saliency region associated with the prompt selected by the user, the electronic device 300 generates a new thumbnail based on the saliency region associated with the prompt selected by the user.

Referring to FIG. 7F, it can be learned from display statuses of the prompts 707A, 707B, and 707C that prompts selected by the user are the prompts 707A, 707B, and 707C. If the electronic device 300 determines that the area of the thumbnail cannot include areas of saliency regions associated with the prompts selected by the user, the electronic device 300 displays the prompt information 417, to prompt the user to reselect a saliency region. Optionally, the prompt information 717 may further include a confirming control 718. The confirming control is used to receive an operation of the user. In response to the operation of the user, the electronic device 300 no longer displays the prompt information 717, and receives a prompt selection operation of the user again. In addition, the prompt information 717 may alternatively be displayed in another manner. For example, the prompt information disappears after being displayed for a preset time period. This is not limited in the embodiments of this application.

Figure 7G:
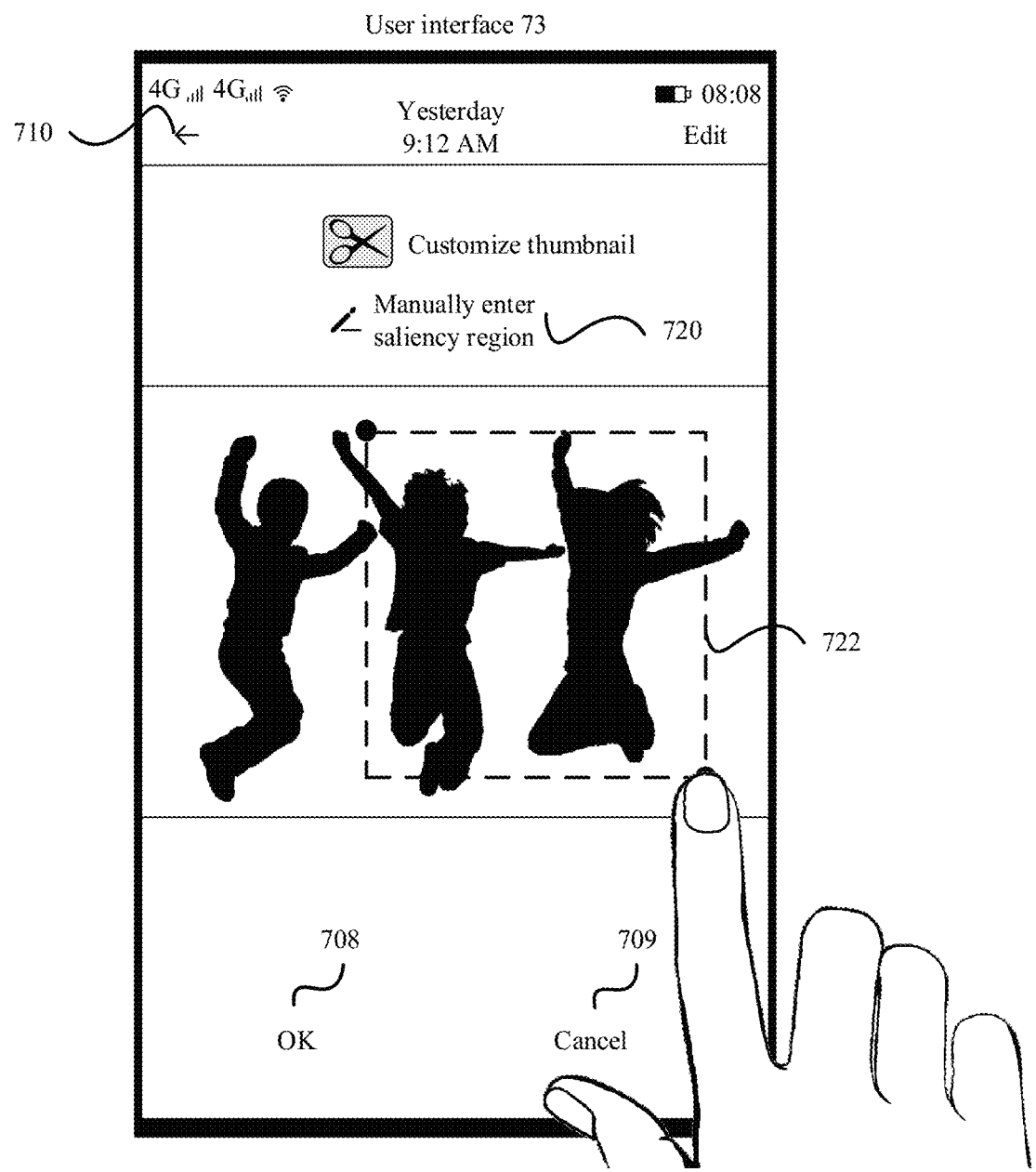
Figure 7H:
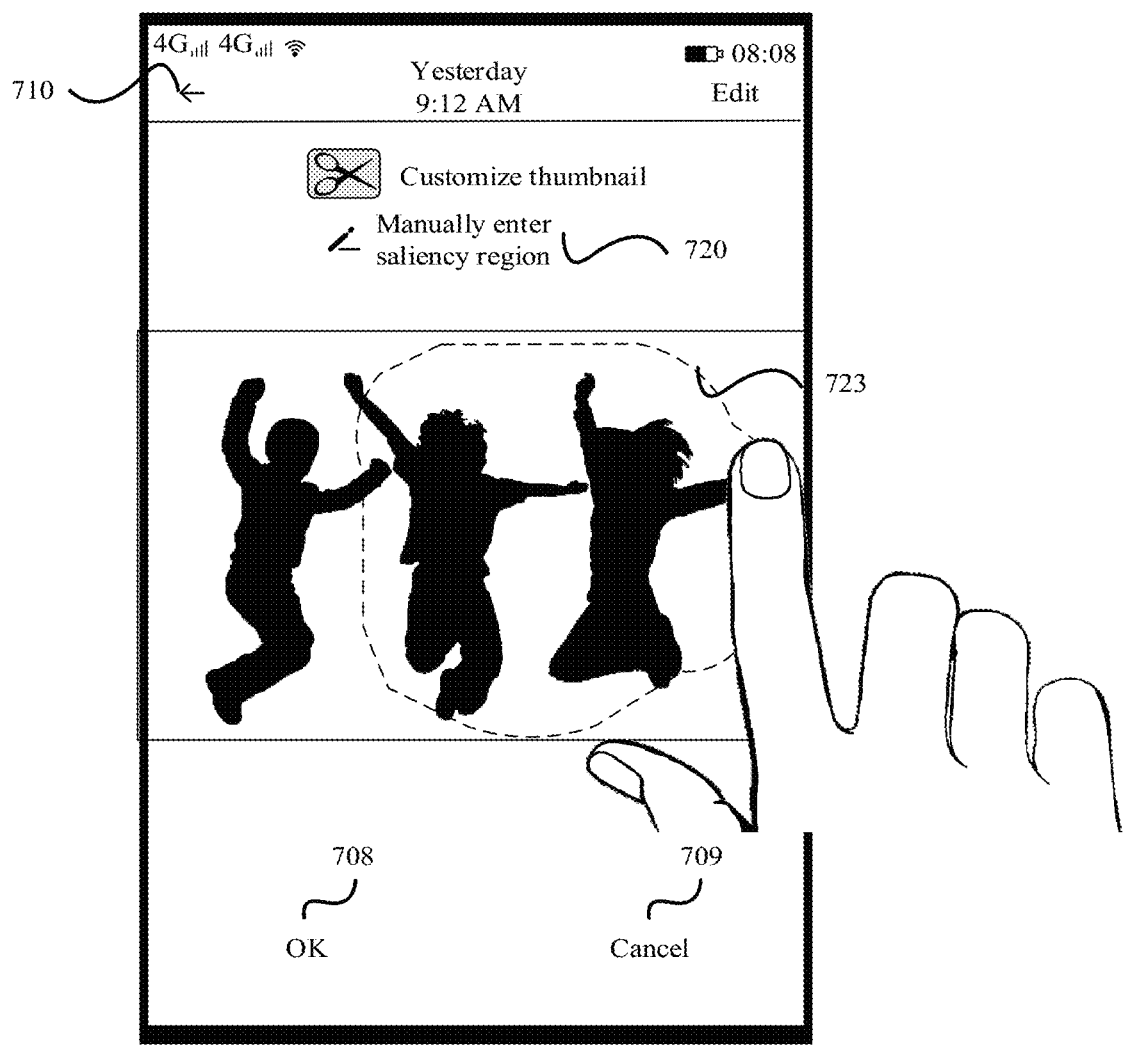

For example, FIG. 7G and FIG. 7H show user interfaces 72 of receiving a saliency region manually entered by the user.

Referring to FIG. 7G and FIG. 7H, the user interface 72 may further include a control 702 ("Manually enter saliency region"). The control 702 is used to receive an operation of the user. In response to the operation of the user, the user interface receives an operation entered by the user for selecting a saliency region. As shown in FIG. 7G, the operation of selecting the saliency region may be an operation of creating a selection box 722 to include the saliency region. Optionally, as shown in FIG. 7H, the operation of selecting the saliency region may be an operation of drawing a closed FIG. 723 to include the saliency region. It should be noted that, similar to that in the foregoing description, the confirming control 708 may receive an operation of the user, and in response to the operation of the user, the electronic device 300 generates a thumbnail including the saliency region included in the selection box 722 (or the saliency region included in the closed FIG. 723).

The foregoing describes the embodiment of displaying a thumbnail in Gallery. The following describes an embodiment of displaying a thumbnail on a viewfinder screen. For example, FIG. 8A and FIG. 8B show user interfaces 81 used to shoot a picture.

Figure 8A:
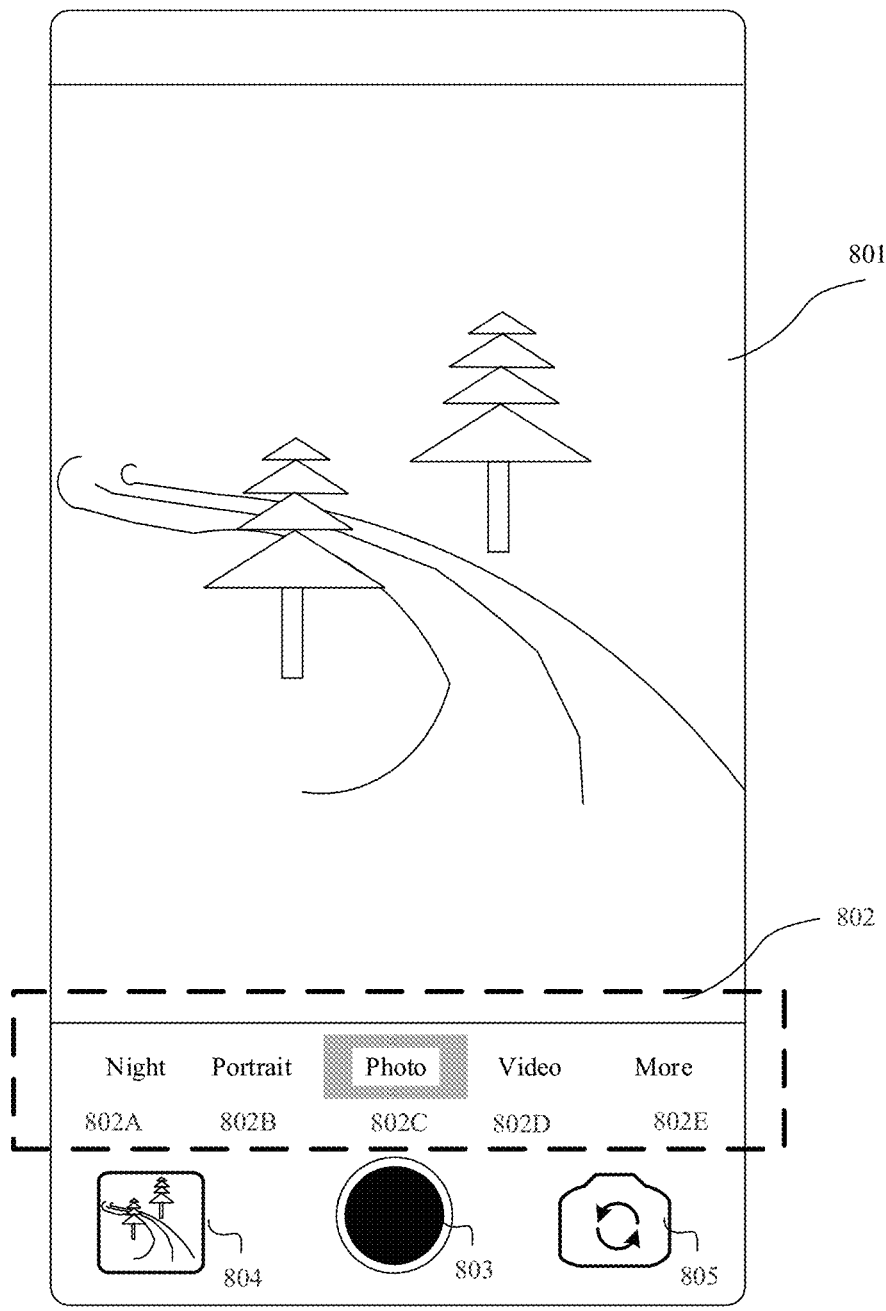
FIG. 8A and FIG. 8B are schematic diagrams of some user interfaces used to shoot pictures according to an embodiment of this application.
Figure 8B:
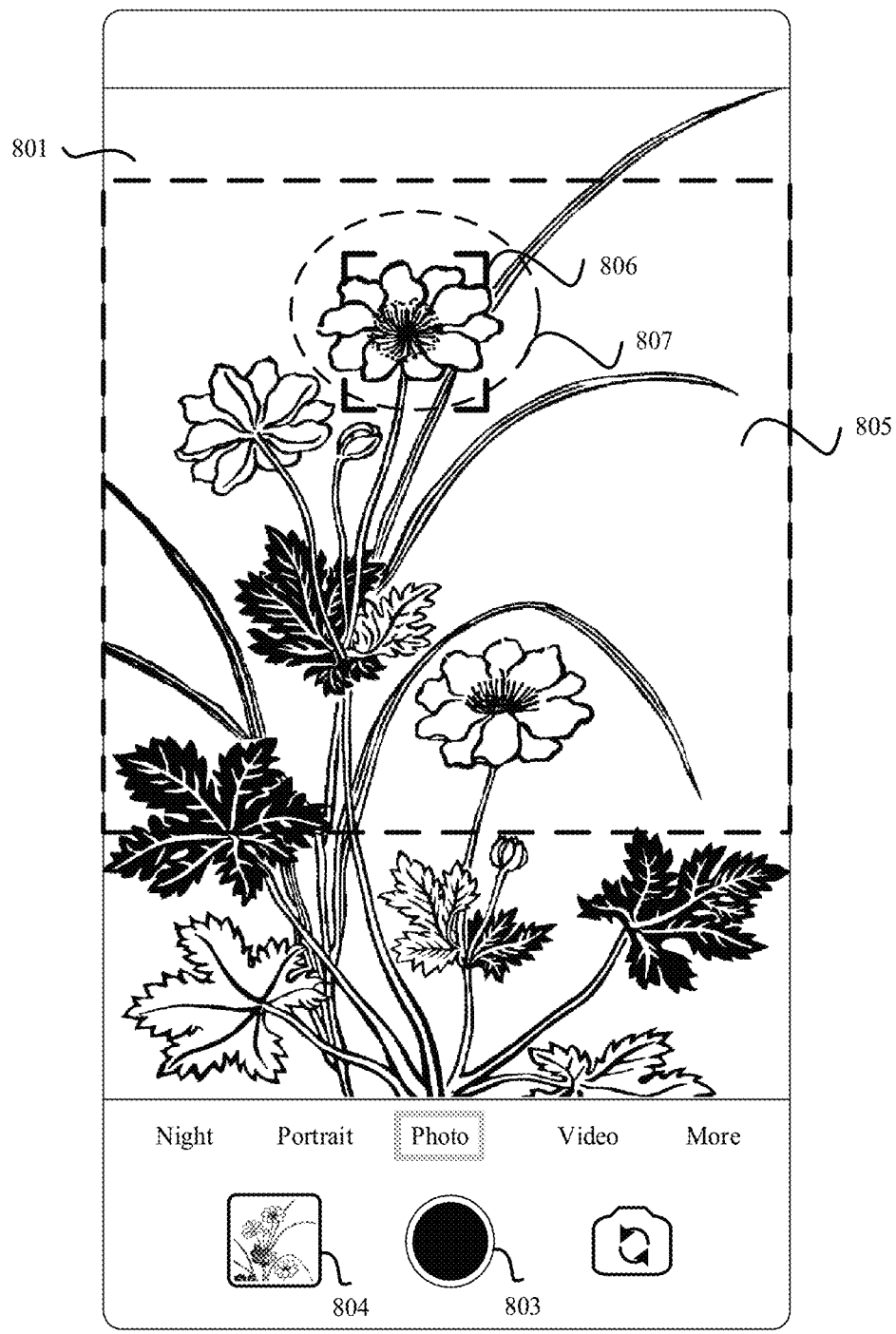

For example, FIG. 8A shows a user interface 81 of a "Camera" application on an electronic device such as a smartphone. As shown in FIG. 8A, the user interface 81 may include a display region 801, a shooting mode list 802, a shooting control 803, a display region 804, and a control 805.

The display region 801 may be used to display a color image captured by a camera module 393 in real time. The electronic device may refresh display content in the display region 801 in real time, so that a user previews a color image currently captured by the camera module 193. Herein, the camera module 193 may be a rear-facing camera or a front-facing camera.

The shooting mode list 802 may display one or more shooting mode options. The one or more shooting options may include a night mode option 802A, a portrait mode option 802B, a photographing mode option 802C, a video recording mode option 802D, and more shooting mode options 802E. The one or more shooting options may be represented as text information in the interface. For example, the night mode option 802A, the portrait mode option 802B, the photographing mode option 802C, the video recording mode option 802D, and the more shooting mode options 802E may respectively correspond to texts "Night", "Portrait", "Photo", "Video", and "More". This is not limited thereto. The one or more shooting options may alternatively be represented as icons or other forms of interactive elements (interactive element, IE) in the interface. In some embodiments, the electronic device 300 may select the photographing mode option 802C by default, and a display status of the photographing mode option 802C (for example, the photographing mode option 802C is highlighted) may indicate that the photographing mode option 802C is selected.

The electronic device 300 may detect a user operation performed on a shooting mode option, and the user operation may be used to select a shooting mode. In response to the operation, the electronic device 300 may enable the shooting mode selected by the user. Particularly, when the user operation is performed on the more shooting mode options 802E, the electronic device 300 may further display more other shooting mode options such as a wide-aperture shooting mode option and a slow-motion shooting mode option, and may present more shooting functions to the user. Not limited to that shown in FIG. 8B, the shooting mode list 802 may not display the more shooting mode options 802E, and the user may browse another shooting mode option by swiping leftward/rightward in the shooting mode list 802.

The shooting control 803 may be used to receive a user operation that triggers shooting (photographing or video recording). The electronic device may detect the user operation performed on the shooting control 803 (for example, a tap operation on the shooting control 803), and in response to the operation, the electronic device 300 may store a shot image. The stored image may be a picture or a video. In addition, the electronic device 300 may further display a thumbnail of the stored image in the display region 804. In other words, the user may tap the shooting control 803 to trigger shooting. The shooting control 803 may be a button or a control in another form.

The control 805 may be used to receive a user operation that triggers camera switching. The electronic device 300 may detect a user operation performed on the control 805 (for example, a tap operation on the display region 804). In response to the operation, the electronic device 300 may switch a camera (for example, switch a rear-facing camera to a front-facing camera, or switch a front-facing camera to a rear-facing camera).

The display region 804 may be used to display the thumbnail of the shot image and receive a user operation that triggers opening of "Gallery". The electronic device 300 may detect the user operation performed on the display region 804 (for example, a tap operation on the display region 804). In response to the operation, the electronic device 300 may display a user interface of "Gallery", and a picture stored by the electronic device 300 may be displayed in the user interface.

Based on the foregoing image shooting scenario, the following describes an embodiment of displaying a thumbnail on a viewfinder screen.

For example, FIG. 8B shows a user interface 81 used to shoot a picture. As shown in FIG. 8B, a thumbnail displayed in the display region 804 in the user interface 81 is a thumbnail generated in the cropping manner provided in the embodiments of this application. The thumbnail includes a saliency region in an original picture of the photo, and a composition manner of the saliency region in the thumbnail complies with a composition manner of the saliency region in the original picture. As shown in FIG. 8B, in a process of shooting a photo, after the user taps the shooting control 803, the electronic device 300 generates an image, and generates a thumbnail of the image. Content of the thumbnail displayed in the display region 804 is photo content included in a dashed-line box 805. Specifically, the thumbnail displayed in the display region 804 includes a saliency region 807 in the original image. A composition manner of the saliency region 807 in the thumbnail is the same as a composition manner of the saliency region 807 in the original image, and both are edge composition. For a detailed process of generating the thumbnail, refer to a subsequent description of a cropping manner. Details are not described herein.

In an embodiment, the display region 801 in the user interface 82 is further used to receive an operation of the user, and in response to the operation of the user, the display region displays a focus frame 806. The electronic device 300 may determine, based on the focus frame 806, a saliency region to be included in a thumbnail. As shown in FIG. 8A, the electronic device 300 may determine, based on the focus frame 806, that the saliency region to be included in the thumbnail is the saliency region 807. Then, the thumbnail generated by the electronic device 300 includes the saliency region 807. Usually, picture content that is included in the focus frame and that is generated based on a user input is picture content in which the user is interested. In this manner, the generated thumbnail can include the picture content in which the user is interested, so that validity of saliency region information provided by the thumbnail is improved.

It should be noted that the cropping manner provided in the embodiments of this application may be further applied to an implementation scenario of cropping a picture. This scenario is described below. In this embodiment, for a manner of generating a crop box, refer to a cropping manner described below. In a specific implementation process, different from those of a crop box of a thumbnail, a length and a width of the crop box for cropping a picture need to be determined with reference to a crop ratio selected by a user. In addition, a generation result of the thumbnail is a specific picture, while a generation result of the crop box is a boundary position of the to-be-cropped picture.

Figure 9A:
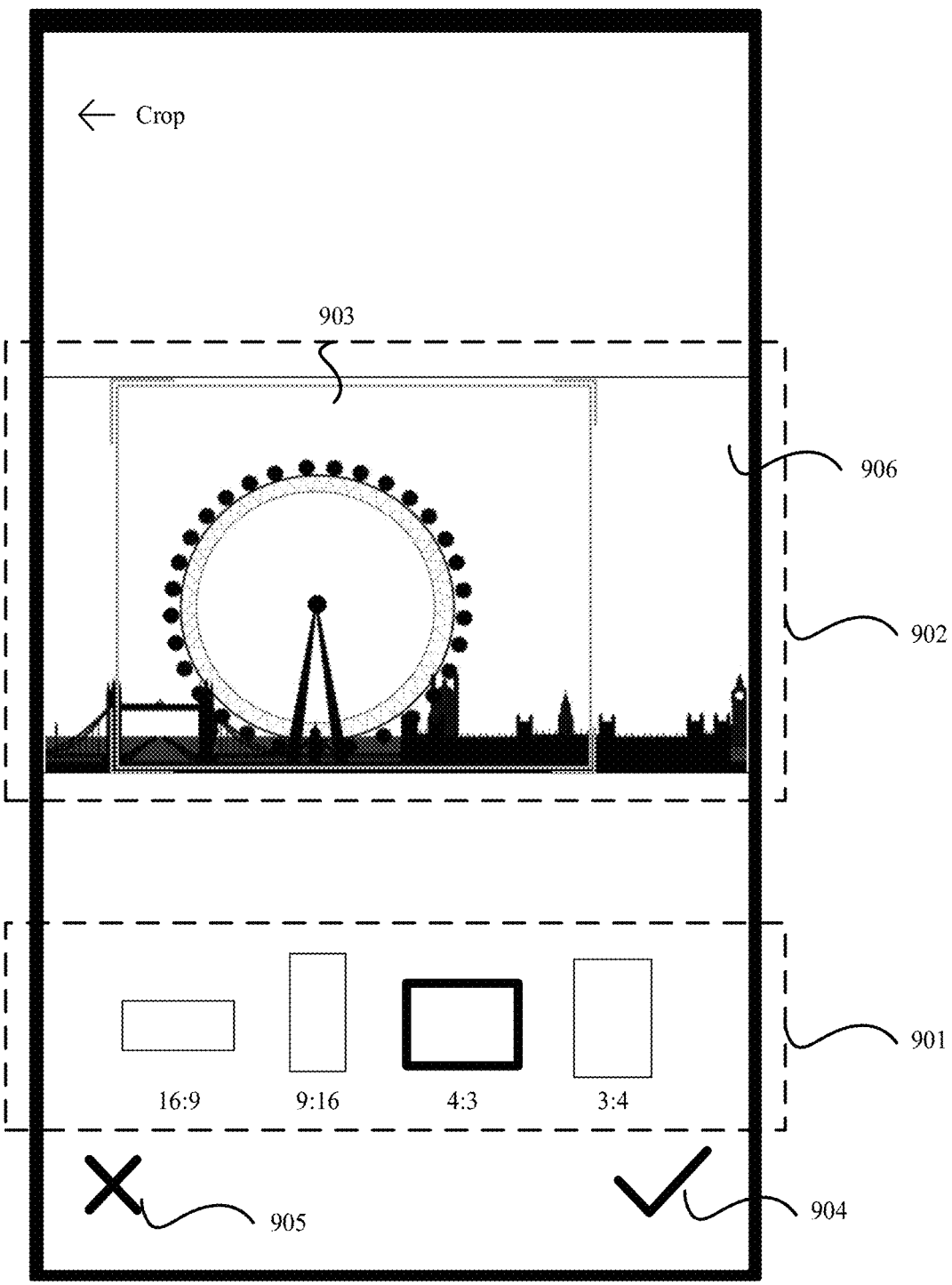
FIG. 9A and FIG. 9B are schematic diagrams of some user interfaces used to crop pictures according to an embodiment of this application.
Figure 9B:
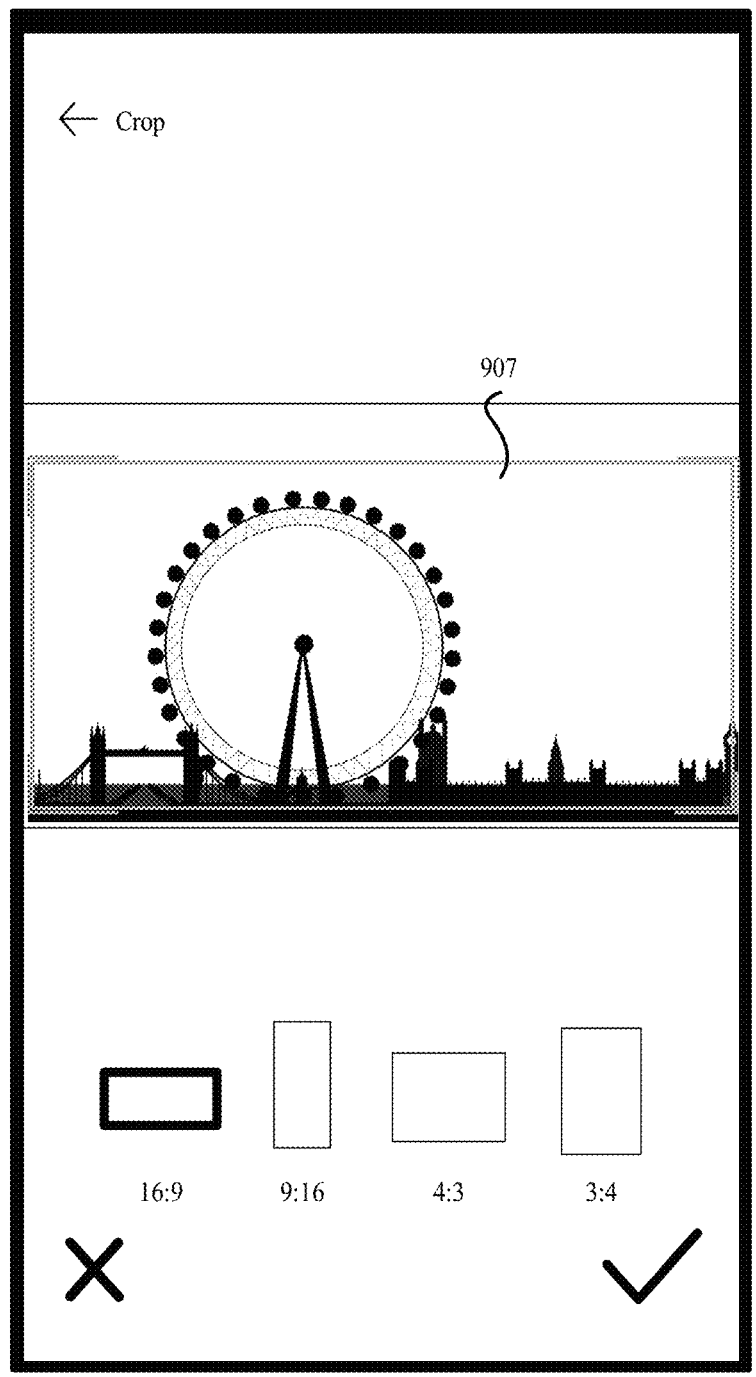

For example, FIG. 9A and FIG. 9B show user interfaces 91 used to crop a picture. As shown in FIG. 9A and FIG. 9B, the user interface 91 may include a display region 901, a display region 902, a control 904, and a control 905.

The display region 901 may display a plurality of cropping options, for example, a 16:9 cropping option, a 9:16 cropping option, a 4:3 cropping option, and a 3:4 cropping option. When the electronic device 300 detects a leftward or rightward swipe operation in the display region 901, the electronic device 300 may update, in response to the swipe operation, a cropping option displayed in the display region 901, to help the user browse more cropping options. In other words, the user may swipe leftward or rightward in the display region 901 to browse more cropping options. The display region 902 may display a selected picture 906 and a crop box 903. A shape and a size of the crop box 903 are determined by a cropping option selected by the user. A length of the crop box is the same as a length of the selected picture 906, or a width of the crop box is the same as a width of the selected picture 906. The crop box includes a saliency region in the selected picture 906. Optionally, a composition manner of the saliency region in the crop box is the same as a composition manner of the saliency region in the original picture.

The control 904 may be used to receive an operation of the user, and in response to the operation of the user, the electronic device 300 generates a new picture based on content included in the crop box 903.

The control 905 may be used to receive an operation of the user, and in response to the operation of the user, the electronic device 300 exits the user interface 91 of cropping the picture, and returns to a previous user interface. In a possible implementation, the display region 6902 may detect a user operation used to select a cropping option, and in response to the user operation, the display region 902 displays the crop box 903. As shown in FIG. 9A, the user selects the 4:3 cropping option. In response to the selection operation of the user, the display region 902 displays a 4:3 crop box 903. A width of the crop box 903 is the same as the width of the selected picture 906. If a composition manner of the saliency region (Ferris wheel) in the selected picture 906 is a near-optimal reference line manner, a composition manner of the saliency region in the crop box is also a near-optimal reference line manner. A method for determining the composition manner has been described in the foregoing content, and details are not described herein. As shown in FIG. 9B, for the same picture, if the user selects the 16:9 cropping option, the display region 902 displays a 16:9 crop box 907. A length of the crop box 907 is the same as the length of the original picture. A position of the crop box 907 may be determined based on the saliency region and the composition manner of the saliency region in the original picture.

Optionally, the electronic device 300 may generate a crop box of the selected picture by default by using a specific cropping option (for example, the 4:3 cropping option).

It should be noted that after the electronic device 300 generates the new picture based on the content included in the crop box 903, the electronic device 300 generates a new thumbnail based on the new picture. For a manner of generating the thumbnail of the new picture, refer to a subsequent description of a cropping manner. Details are not described herein.

According to the method in this embodiment of this application, in a process of cropping the picture by the user, the electronic device 300 recommends the crop box that includes the saliency region and complies with the composition manner of the original picture, so that user operations can be reduced, and efficiency of cropping the picture by the user can be improved.

The cropping manner provided in the embodiments of this application may be further applied to an implementation scenario of generating a profile picture. This scenario is described below. In this embodiment, a manner of generating a profile picture may be based on a cropping manner described below. In a specific implementation process, different from a crop box of a thumbnail, a crop box of the profile picture needs to be determined with reference to a profile picture ratio specified by a system application or a third-party application.

FIG. 10A to FIG. 10E are schematic diagrams of some user interfaces of changing a profile picture according to an embodiment of this application. The profile picture may be a user profile picture in a system application or a third-party application.

Figure 10A:
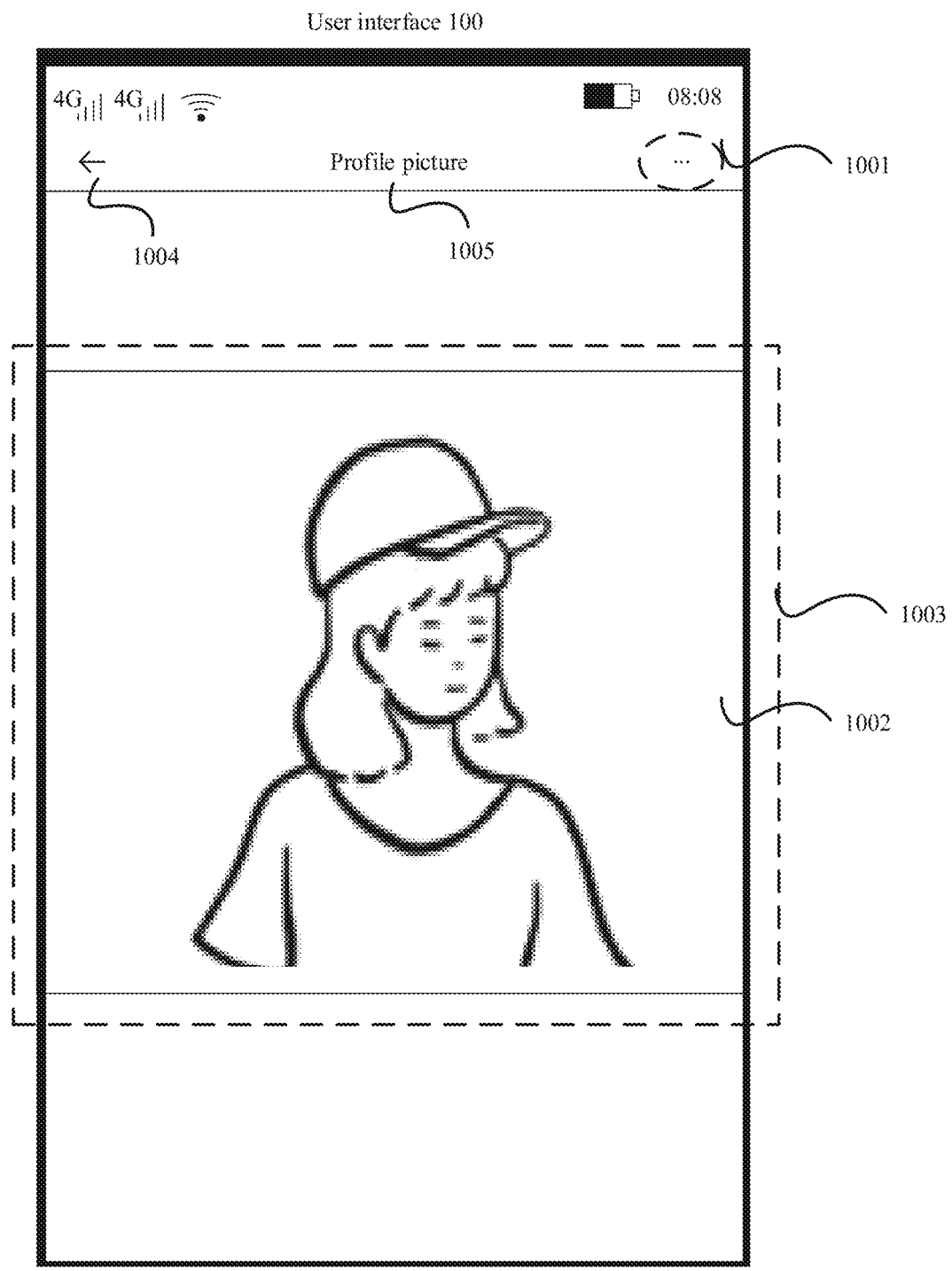
FIG. 10A to FIG. 10E are schematic diagrams of some user interfaces in which a user changes a profile picture according to an embodiment of this application.

For example, FIG. 10A shows a user interface 100 used to display a user profile picture. As shown in FIG. 10A, the user interface 100 may include a back button 1004, a prompt 1005, a control 1001, and a display region 1003.

The back button 1004 may be used to return to an upper-level user interface of the user interface 100. A person skilled in the art may understand that a logical upper-level user interface of a user interface is fixed, and is determined during application design.

The prompt 1005 may be used to indicate which interface in an application is a user interface currently browsed by a user.

The display region 1003 may be used to display a current profile picture 1002 of the user.

Figure 10B:
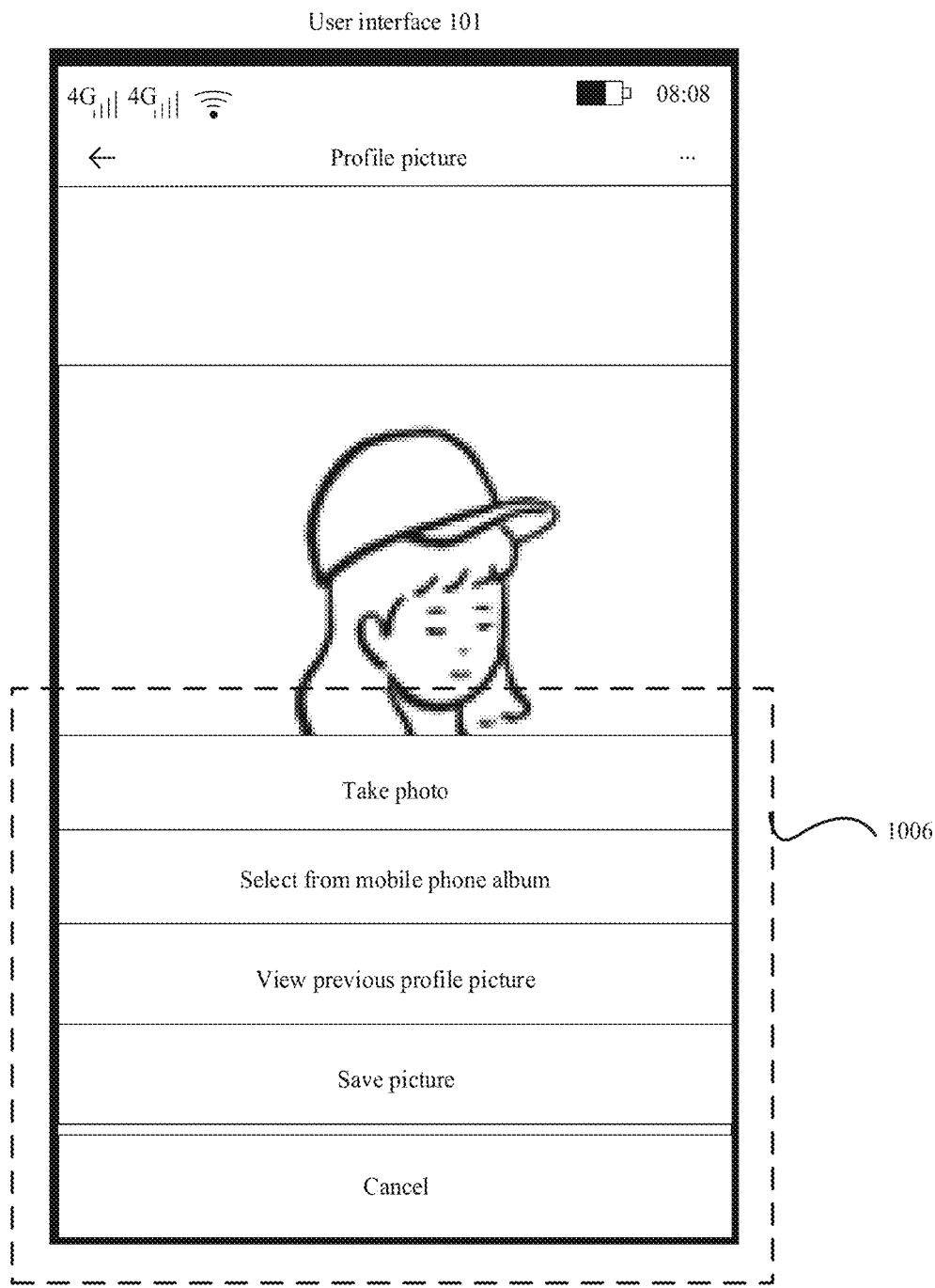

The control 1001 may be used to receive an operation of the user, and in response to the operation of the user, the electronic device 300 displays a selection box 1006 (referring to a user interface 101 shown in FIG. 10B).

For example, FIG. 10B shows the user interface 101 of selecting an operation to be performed on the profile picture. The user interface 101 may include the selection box 1006. The selection box 1006 includes a plurality of operation options that can be selected by the user, for example, "Take photo", "Select from mobile phone album", "View previous profile picture", "Save picture", and "Cancel". Optionally, the operation options in the selection box may be adjusted as required. This is not limited in the embodiments of this application. The selection box 1006 may be used to receive an instruction of the user, and in response to the instruction of the user, the electronic device 300 performs an operation option corresponding to the user instruction. For example, if the instruction of the user is a selection operation for the operation option "Take photo", the electronic device 300 jumps to a viewfinder screen to shoot a profile picture. If the instruction of the user is a selection operation for the operation option "Select from mobile phone album", the electronic device 300 jumps to a Gallery interface (referring to a user interface 102 shown in FIG. 10C).

Figure 10C:

For example, FIG. 10C shows the user interface 102 used to display a thumbnail. The user interface 102 includes a display region 1008. The display region is used to display one or more thumbnails, for example, a thumbnail 1007. The display region 1008 is further used to receive an operation of selecting the thumbnail 1007 by the user, and in response to the operation of selecting the thumbnail 1007 by the user, the electronic device displays an original picture corresponding to the selected thumbnail 1007 (referring to a user interface 103 displayed in FIG. 10D).

Optionally, the plurality of thumbnails may be generated in the cropping manner provided in the embodiments of this application. The plurality of thumbnails include saliency regions in original pictures corresponding to the plurality of thumbnails. In this manner, the user can obtain information about a relatively large quantity of saliency regions, and can determine, based on the information about the saliency regions, whether an original picture corresponding to a thumbnail is a picture required by the user. This facilitates fast locating of the target picture. Optionally, the plurality of thumbnails may alternatively be generated in a center cropping manner in the conventional technology.

Figure 10D:
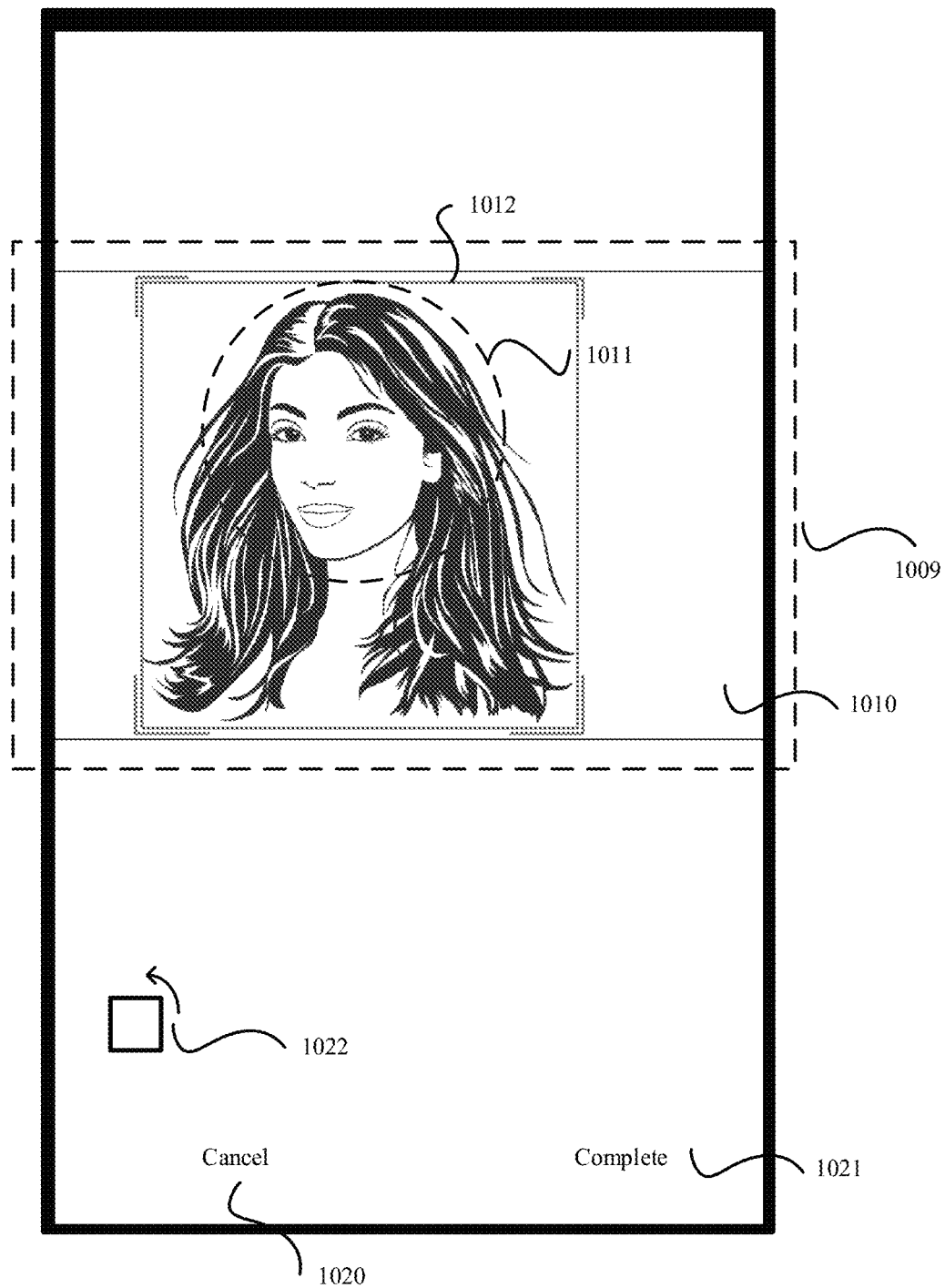

For example, FIG. 10D shows the user interface 103 used to display the original picture corresponding to the thumbnail. The user interface 103 includes a display region 1009, a control 1020, a control 1021, and a control 1022.

The display region 1009 is used to display the original picture 1010 corresponding to the thumbnail 1007. The display region 1009 further includes a crop box 1012. Picture content included in the crop box 1012 is picture content obtained after a cropping operation provided in the embodiments of this application is performed. The crop box 1012 includes a saliency region 1011 in the original picture, and a composition manner of the saliency region in the original picture is near-center line composition. Therefore, a composition manner of the saliency region in the crop box 1012 is the same as the composition manner of the saliency region in the original picture, that is, is also near-center line composition. In this manner, the electronic device 300 can recommend an appropriate crop box to the user, so that efficiency of setting the profile picture by the user is improved. The crop box can enable the profile picture to include the saliency region in the original picture, and information about the saliency region in the original picture is retained to a relatively great extent. In addition, the composition manner of the saliency region in the crop box is the same as the composition manner of the saliency region in the original picture.

It should be noted that, in the embodiments of this application, the saliency region in the profile picture may be a human face, facial information of an animal, facial information of a cartoon character, or the like. Human face information is used as an example in the figure. This is not limited in the embodiments of this application.

The control 1020 is used to receive an operation of the user, and in response to the operation of the user, the electronic device returns to an upper-level interface (the user interface 102), so that the user reselects a picture.

The control 1021 is used to receive an operation of the user, and in response to the operation of the user, the electronic device generates a profile picture of the user based on picture content included in the crop box 1012. Optionally, in response to the operation of the user, the electronic device generates the profile picture of the user based on the picture content included in the crop box 1012, and jumps to a user interface 100 (a user interface 100 displayed in FIG. 10E) that displays the profile picture of the user.

The control 1022 is used to receive an operation of the user, and in response to the operation of the user, the electronic device 300 performs a rotation operation on the picture content in the profile picture region 1012, for example, a 90-degree leftward rotation or a 90-degree rightward rotation.

Figure 10E:
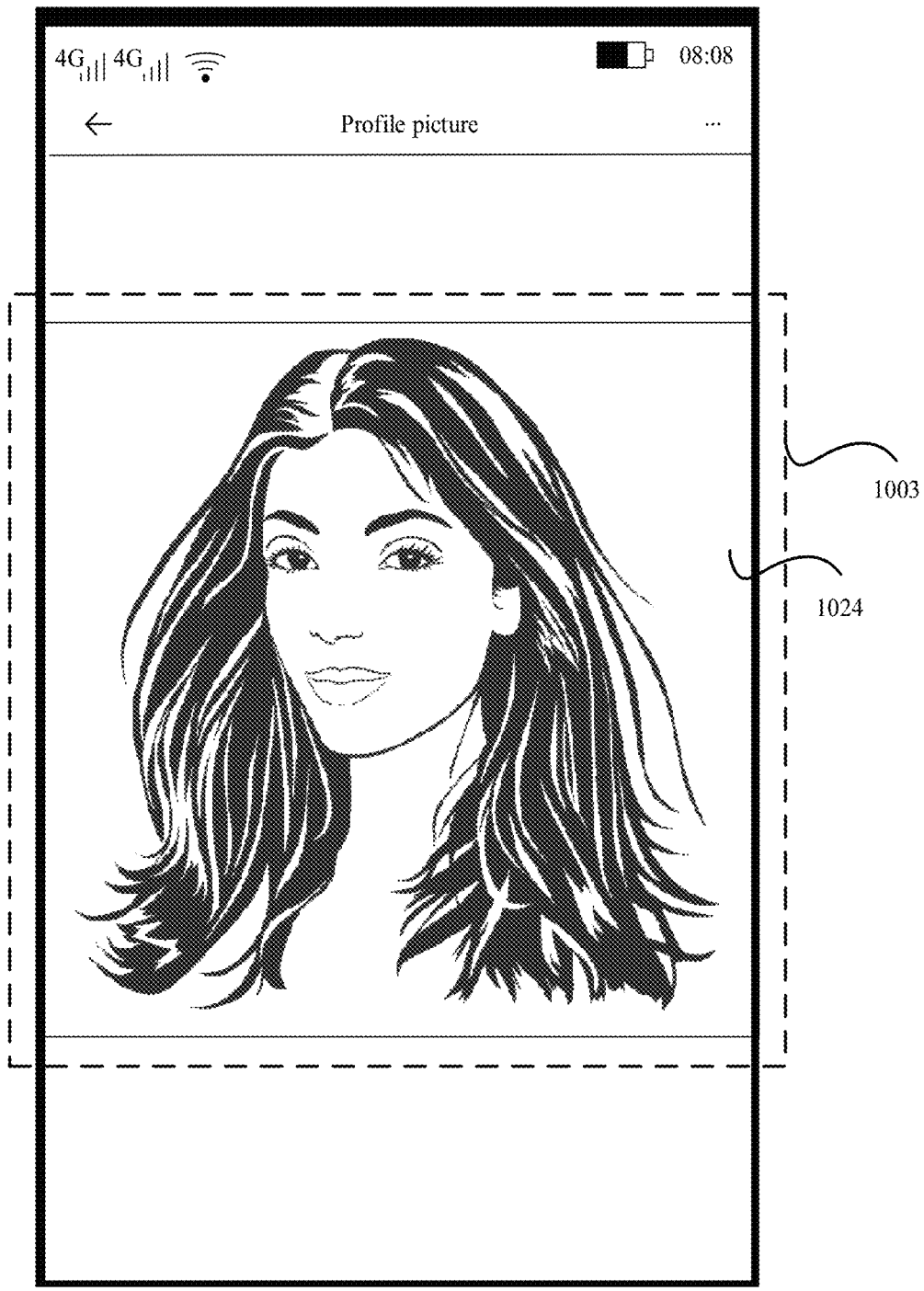

For example, FIG. 10E shows the user interface 100 existing after the profile picture is updated. The display region 1003 is used to display an updated profile picture 1024, and picture content of the profile picture 1024 is the same as picture content in the profile picture region 1012 in the user interface 103.

Figure 11:
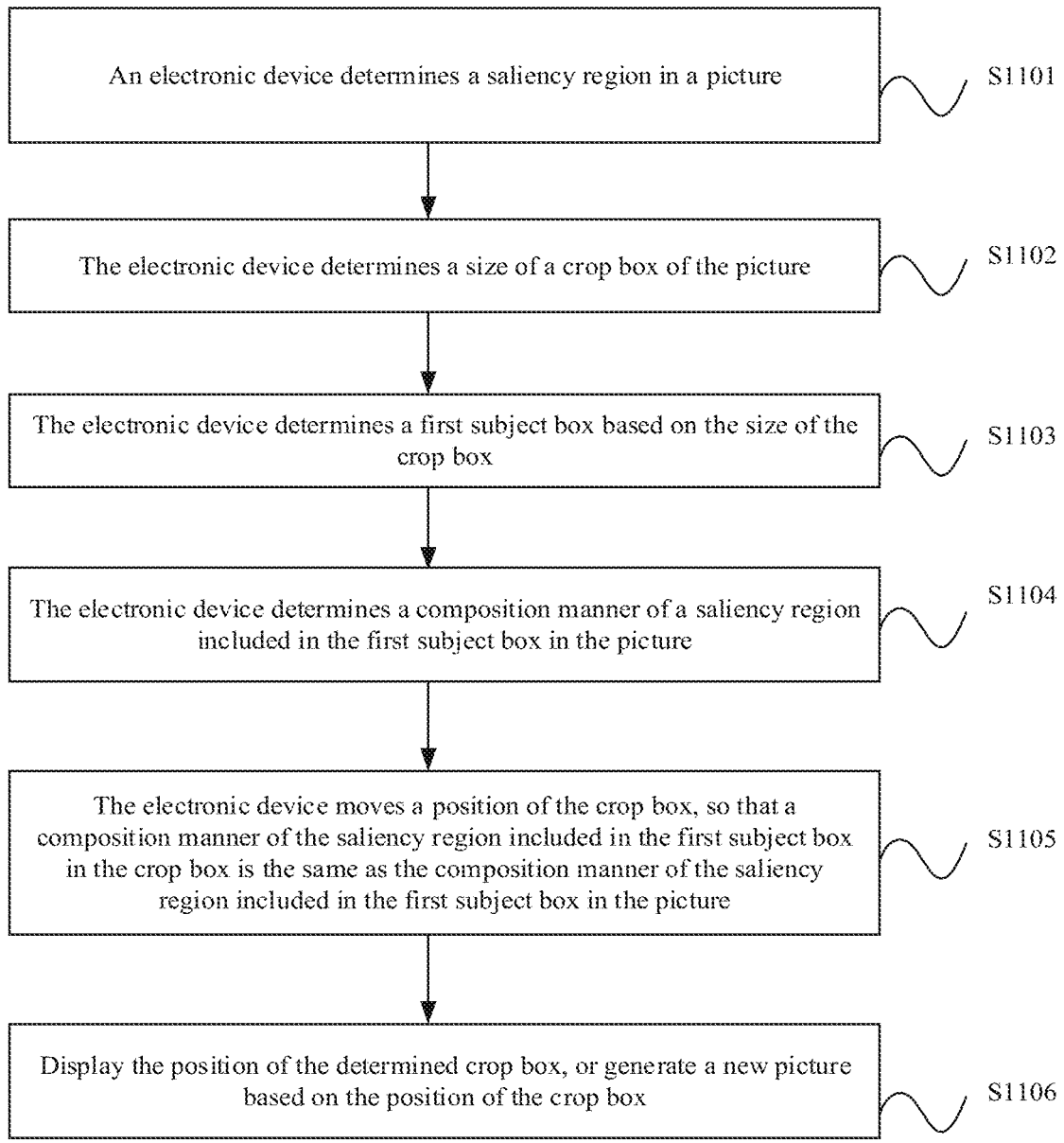
FIG. 11 is a flowchart of a cropping manner according to an embodiment of this application.

Based on the electronic device 300 and the UI embodiments described in the foregoing content, the following embodiment describes a cropping manner provided in this application. As shown in FIG. 11, the cropping manner includes but is not limited to the following steps.

S1101: An electronic device determines a saliency region in a picture.

The picture may be a picture shot by the electronic device by using a camera of the electronic device, a picture downloaded from the internet, a picture received from another electronic device, or the like. This is not limited in this embodiment of this application. There may be one or more saliency regions in the picture. It should be noted that there may be a plurality of manners for determining the saliency region in the picture. The plurality of possible determining manners are further described in subsequent content, and details are not described herein.

S1102: The electronic device determines a size of a crop box of the picture.

Specifically, the electronic device determines the size of the crop box based on a size of the picture and an aspect ratio of the crop box. The size of the picture indicates a length and a width of the picture. In an application scenario of generating a user profile picture or generating a thumbnail, the aspect ratio of the crop box is a preset aspect ratio. In an application scenario of cropping a picture, the aspect ratio of the crop box is an aspect ratio corresponding to a selection operation entered by a user.

Specifically, the crop box is a crop box with a largest area in a plurality of crop boxes that may be included in the picture and that satisfy an aspect ratio requirement. To be specific, a length of the crop box is equal to the length of the picture, or a width of the crop box is equal to the width of the picture. For an example of the crop box, refer to the embodiment corresponding to FIG. 9A and FIG. 9B.

S1103: The electronic device determines a first subject box based on the size of the crop box, where the first subject box is a rectangular box that includes one or more saliency regions and whose area is not greater than an area of the crop box.

A method for determining the first crop box is described in detail in subsequent content, and details are not described herein.

S1104: The electronic device determines a composition manner of the saliency region included in the first subject box in the picture.

In this embodiment of this application, composition manners of the saliency region in the picture in a horizontal direction and a vertical direction may be determined. The composition manner of the saliency region in the picture in the horizontal direction includes near-edge composition, near-center line composition, or near-reference line composition. The composition manner of the saliency region in the picture in the vertical direction includes near-edge composition, near-center line composition, or near-reference line composition. Methods for determining the composition manners of the saliency region in the picture in the horizontal direction and the vertical direction are described in subsequent content, and details are not described herein. If a reference line of the crop box is a trisection line, a reference line of the first picture is a trisection line; or if a reference line of the crop box is a golden section line, a reference line of the first picture is a golden section line; or if a reference line of the crop box is an optimal reference line, a reference line of the first picture is an optimal reference line.

It should be noted that if the width of the crop box is equal to the width of the picture, a horizontal movement of the crop box does not affect a composition manner of the picture in the vertical direction. In this case, the composition manner of the saliency region included in the first subject box in the picture in the horizontal direction is determined. If the length of the crop box is equal to the length of the picture, a vertical movement of the crop box does not affect a composition manner of the picture in the horizontal direction. In this case, the composition manner of the saliency region included in the first subject box in the picture in the vertical direction is determined.

S1105: The electronic device moves a position of the crop box, so that a composition manner of the saliency region included in the first subject box in the crop box is the same as the composition manner of the saliency region included in the first subject box in the picture.

Specifically, if the width of the crop box is equal to the width of the picture, it indicates that the crop box is moved horizontally. The position of the crop box is moved based on the composition manner of the saliency region included in the first subject box in the picture in the horizontal direction. First, a position of a center line of the crop box in the vertical direction and a position of a reference line of the crop box in the vertical direction need to be determined. If near-edge composition is performed, the position of the crop box is moved, so that a center of gravity of the saliency region included in the first subject box falls as much as possible on an edge of the crop box. If near-center line composition is performed, the position of the crop box is moved, so that a center of gravity of the saliency region included in the first subject box falls as much as possible on the center line of the crop box in the vertical direction. If near-reference line composition is performed, the position of the crop box is moved, so that a center of gravity of the saliency region included in the first subject box falls as much as possible on the reference line of the crop box.

Specifically, if the length of the crop box is equal to the length of the picture, it indicates that the crop box is moved vertically. The position of the crop box is moved based on the composition manner of the saliency region included in the first subject box in the picture in the vertical direction. First, a position of a center line of the crop box in the horizontal direction and a position of a reference line of the crop box in the horizontal direction need to be determined. If near-edge composition is performed, the position of the crop box is moved, so that a center of gravity of the saliency region included in the first subject box falls as much as possible on an edge of the crop box. If near-center line composition is performed, the position of the crop box is moved, so that a center of gravity of the saliency region included in the first subject box falls as much as possible on the center line of the crop box in the vertical direction. If near-reference line composition is performed, the position of the crop box is moved, so that a center of gravity of the saliency region included in the first subject box falls as much as possible on the reference line of the crop box. It should be noted that a movement range of the crop box is within the picture, and the crop box cannot cross the edge of the picture. In this manner, the composition manner of the saliency region included in the first subject box in the crop box can be the same as the composition manner of the saliency region included in the first subject box in the picture.

Figure 14A:
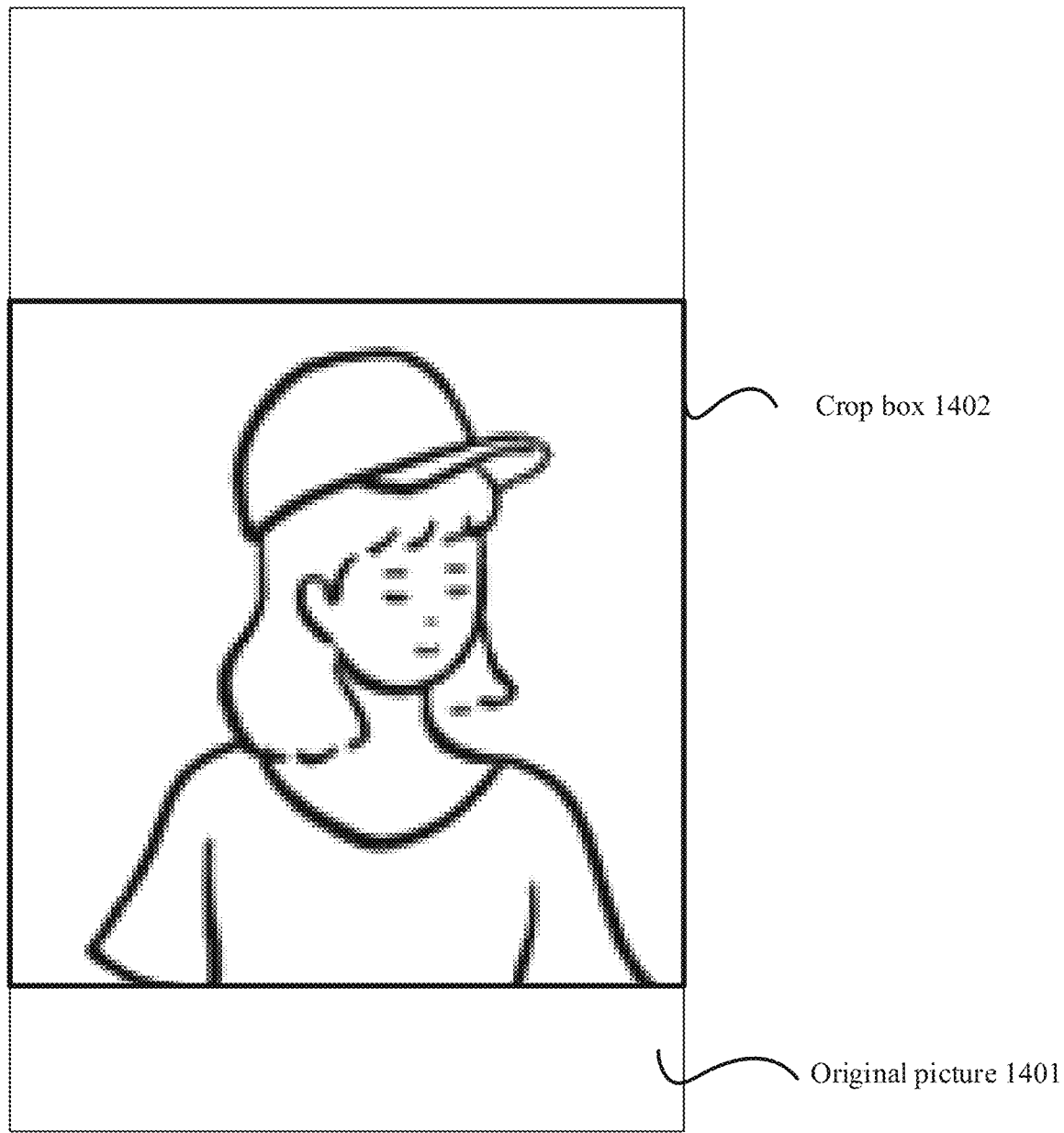
FIG. 14A and FIG. 14B are schematic diagrams of some crop boxes according to an embodiment of this application.
Figure 14B:
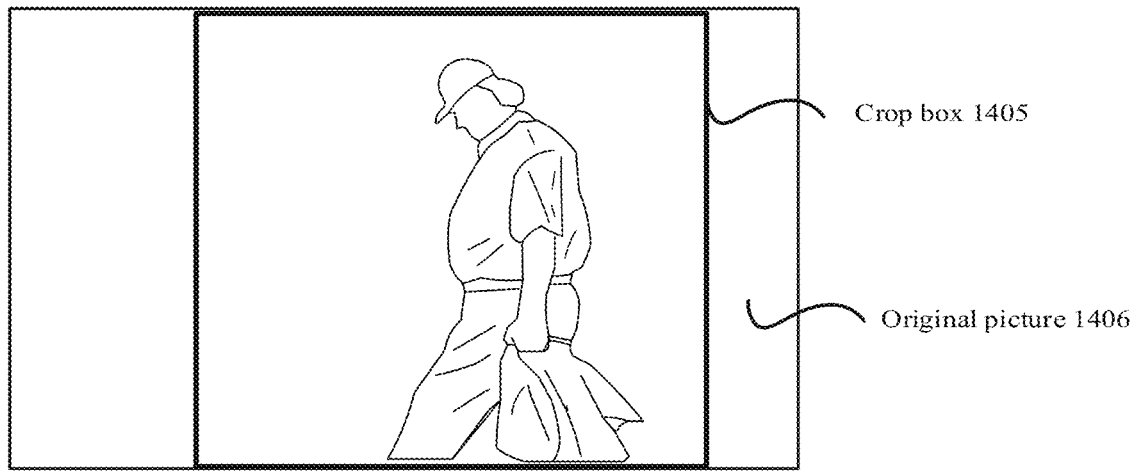

For example, FIG. 14A is a schematic diagram of a crop box in near-center line composition according to an embodiment of this application. If a composition manner of a saliency region in an original picture in the vertical direction is near-center line composition, a position of the crop box is moved, so that a center of gravity of a saliency region in the crop box falls as much as possible on a center line of the crop box. FIG. 14B is a schematic diagram of a crop box in near-reference line composition according to an embodiment of this application. If a composition manner of a saliency region in an original picture in the horizontal direction is near-reference line composition, a position of the crop box is moved, so that a center of gravity of a saliency region in the crop box falls as much as possible on a reference line of the crop box.

S1106: Display the position of the determined crop box, or generate a new picture based on the position of the crop box.

It should be noted that, in an embodiment in which a thumbnail is formed, picture content included in the thumbnail may be determined from the original picture based on the position of the crop box subsequently, and then the picture content is compressed to form the thumbnail. In an embodiment in which a crop box for cropping a picture is formed, the position of the determined crop box may be displayed in the original picture subsequently. In an embodiment in which a user profile picture is formed, picture content included in the user profile picture may be determined from the original picture based on the crop box subsequently, and then the profile picture corresponding to the picture content is generated. In addition, preset adjustment (for example, resolution reduction) may also be performed on the profile picture according to an algorithm specified in an application. This is not limited herein.

The following further provides supplementary descriptions of specific implementations of the steps in the foregoing method.

In step S1101, there may be a plurality of manners for determining the saliency region in the picture. The following further describes some possible determining manners.

In a first manner, saliency detection is performed on the picture, and a saliency detection result is used as the saliency region of the picture. For a saliency detection method, refer to the manner described in FIG. 1A(1) and FIG. 1A(2).

In a second manner, semantic segmentation is performed on the picture to obtain N regions, where N≥2, and the N regions are regions that do not overlap each other. An area of each of the N regions is determined, where one region corresponds to one semantic category, and the electronic device pre-stores a weight corresponding to the semantic category. Then, a score of an $i^{th}$ region is calculated, where the score of the $i^{th}$ region is a product of an area of the $i^{th}$ region and a weight corresponding to a semantic category corresponding to the $i^{th}$ region. A region with a highest score in the N regions is determined as the saliency region. In a possible case, if the electronic device cannot determine the saliency region in the picture through saliency detection, the electronic device may determine the saliency region in a semantic segmentation manner.

For example, the semantic category may include people, building, animal, food, flower, mountain, beach, tree, sky, water, or the like. Optionally, these categories may be classified into three levels. A first level includes people, building, animal, food, and flower, a second level includes mountain, beach, and tree, and a third level includes sky and water. Categories at a same level correspond to a same weight, a weight corresponding to a category at the first level is the largest, a weight corresponding to a category at the second level is the second, and a weight corresponding to a category at the third level is the smallest. For example, the weight corresponding to the category at the first level may be 4, the weight corresponding to the category at the second level may be 2, and the weight corresponding to the category at the third level may be 1. FIG. 1B(1) and FIG. 1B(2) are used as an example. The region 1 is "building", a corresponding area is 3 square centimeters, and a weight corresponding to "building" is 4. In this case, a score corresponding to the region 1 is 12. The region 2 is "sky", a corresponding area is 6 square centimeters, and a weight corresponding to "sky" is 1. In this case, a score corresponding to the region 2 is 6. The region 3 is "plant", a corresponding area is 5 square centimeters, and a weight corresponding to "plant" is 2. In this case, a score corresponding to the region 3 is 10. The region 4 is "water", a corresponding area is 2 square centimeters, and a weight corresponding to "water" is 1. In this case, a score corresponding to the region 4 is 2. The score corresponding to the region 1 is the largest value, and therefore the saliency region is the region 1.

In a third manner, the electronic device receives a selection operation entered by the user for the saliency region, and determines that picture content corresponding to the selection operation is the saliency region. For this manner, refer to the embodiment corresponding to FIG. 7A to FIG. 7F.

In a fourth manner, the electronic device receives a selection box or a closed figure entered by the user for the saliency region, and determines that content included in the selection box or the closed figure is the saliency region. For this manner, refer to the embodiment corresponding to FIG. 7G and FIG. 7H.

In a fifth manner, the electronic device records a position that is of a focus frame and that is entered by the user during shooting of a photo, and determines that picture content included in the focus frame is a saliency region of the photo. For this manner, refer to the embodiment corresponding to FIG. 8B.

It should be noted that there may be one or more saliency regions determined in the first manner or the second manner, and there is only one saliency region determined in each of the third manner to the fifth manner.

In step S1103, a manner of determining the first subject box based on the size of the crop box is as follows:

First, a subject box of each saliency region in the picture is generated. The subject box of the saliency region is a bounding rectangle of the saliency region. Because a saliency detection result is a grayscale picture, an edge is relatively blurred, and a preset distance exists between the saliency region and the bounding rectangle. Optionally, the preset distance is directly proportional to an area of the saliency region. Particularly, in this embodiment of this application, an edge of the subject box is parallel to an edge of the picture.

Then, whether the crop box can include a second subject box of a saliency region with a largest area is determined based on the size of the crop box. If the crop box can include the second subject box, whether another subject box other than the second subject box exists in the picture is determined. If no other subject box exists, it is determined that the first subject box is the second subject box. If another subject box exists, the electronic device expands the second subject box, to sequentially contain the other subject boxes in the subject box in descending order of areas of included saliency regions, until a size of a second subject box obtained after a third subject box is contained exceeds the size of the crop box (to be specific, a length of the second subject box obtained after the third subject box is contained exceeds the length of the crop box, or a width of the second subject box obtained after the third subject box is contained exceeds the width of the crop box). In this case, it is determined that the first subject box is a second subject box existing before the third subject box is contained. For this manner, refer to an embodiment shown in FIG. 16A to FIG. 16C.

Figure 16A:
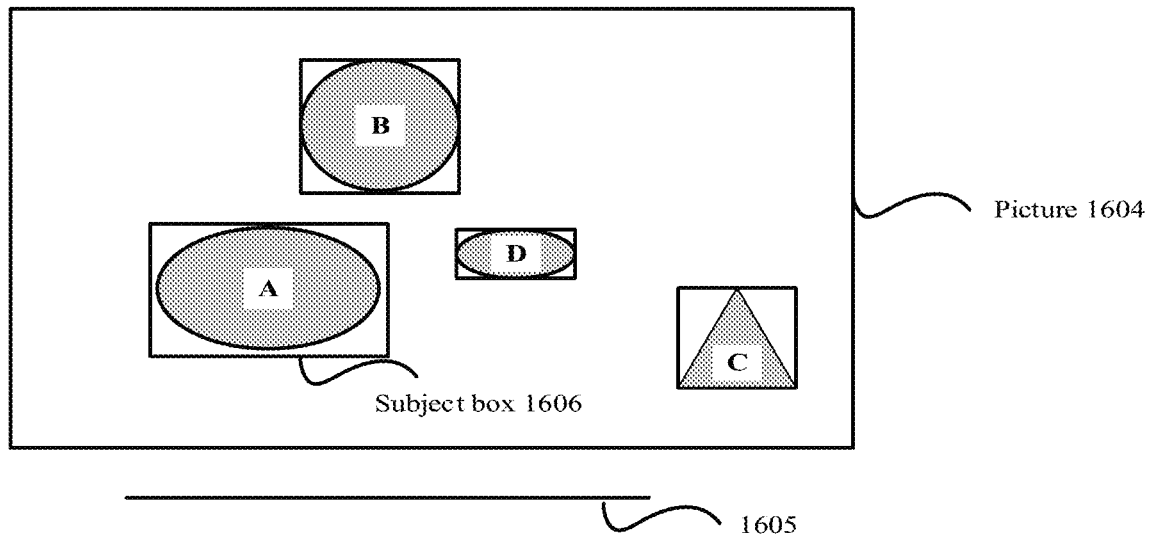
FIG. 16A to FIG. 16D are some schematic flowcharts of determining a first subject box according to an embodiment of this application.
Figure 16B:
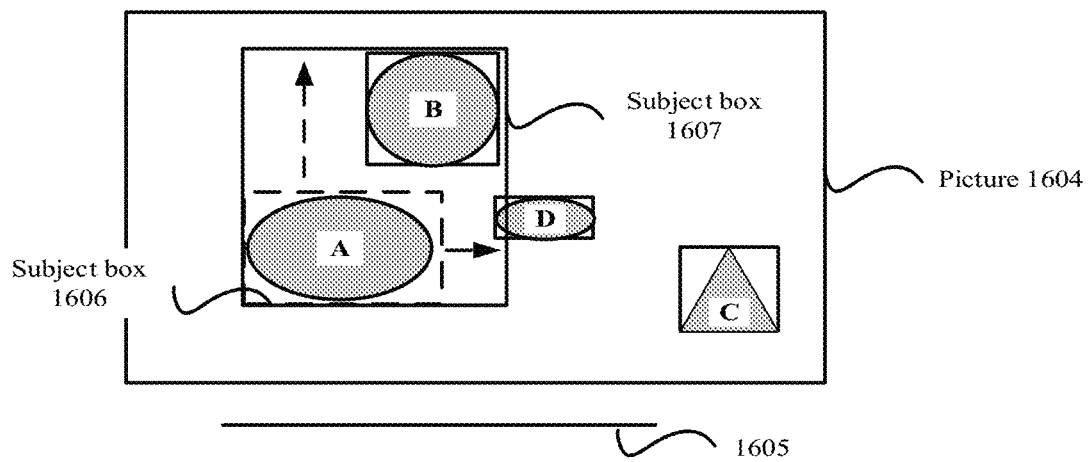
Figure 16C:
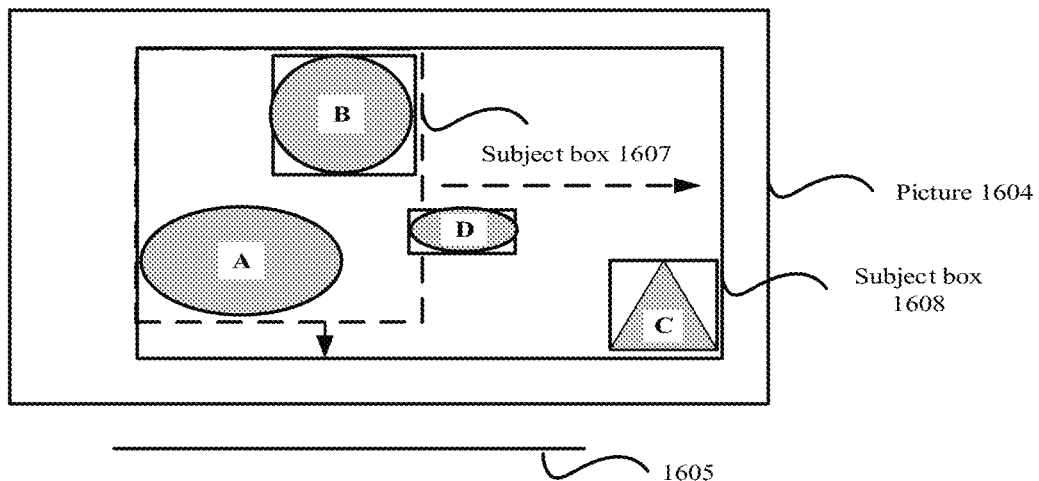
Figure 16D:
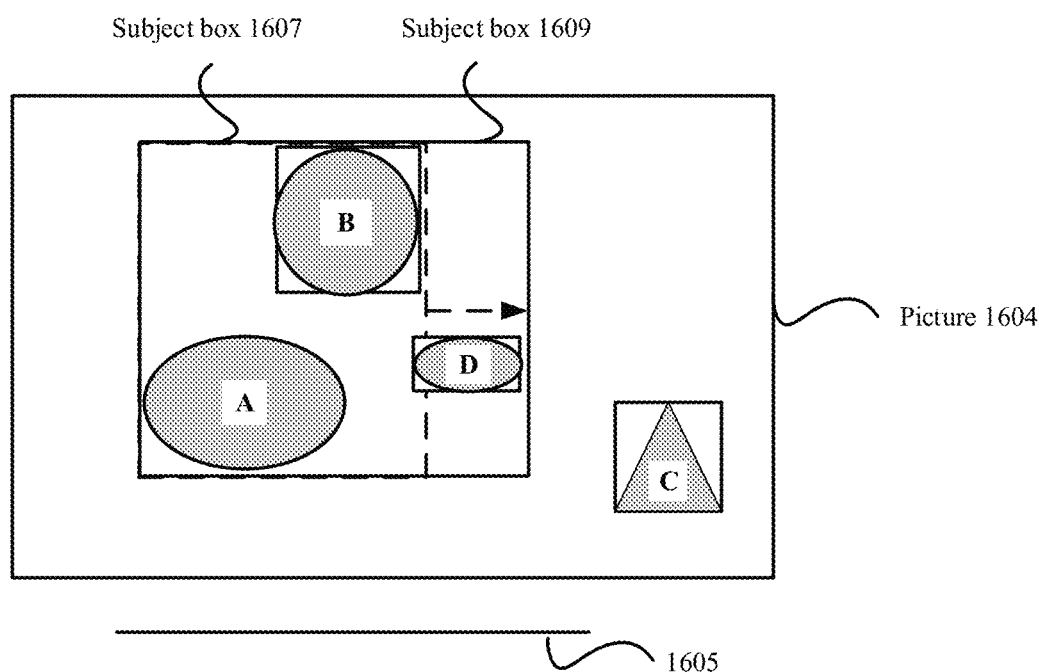

FIG. 16A to FIG. 16C are some schematic flowcharts of determining the first subject box according to an embodiment of this application. A picture 1604 includes a saliency region A, a saliency region B, a saliency region C, and a saliency region D. A descending order of areas of the plurality of saliency regions is: the saliency region A, the saliency region B, the saliency region C, and the saliency region D. A line segment 1605 indicates a length of a crop box. It should be noted that a width of the crop box is a width of the picture 1604. As shown in FIG. 16A, a subject box 1606 is a second subject box including a saliency region with a largest area. Then, the electronic device expands the second subject box to contain a subject box of the saliency region B, and a second subject box in which the subject box of the saliency region B is contained is shown as a subject box 1607. A length of the subject box 1607 does not exceed the length of the crop box, and a width of the subject box 1607 does not exceed the width of the crop box. Therefore, the electronic device continues to expand the second subject box to contain a subject box of the saliency region C. A second subject box in which the subject box of the saliency region C is contained is shown as a subject box 1608. A length of the subject box 1608 exceeds the length of the thumbnail. Therefore, expanding of the subject box is stopped. The finally determined first subject box is the second subject box 1607 existing before the subject box of the saliency region C is contained.

In another possible implementation, the electronic device expands the second subject box, to sequentially contain the other subject boxes in the subject box in descending order of areas of included saliency regions, until the plurality of saliency regions are all traversed. If a size of the second subject box exceeds the size of the crop box after a third subject box is contained, it is determined that the second subject box is a subject box existing before the third subject box is contained. If a size of the second subject box does not exceed the size of the crop box after the third subject box is contained (to be specific, a length of the subject box does not exceed the length of the thumbnail, and a width of the subject box does not exceed the width of the thumbnail), it is determined that the second subject box is a subject box obtained after the third subject box is contained. In this case, the first subject box is a second subject box obtained after all the subject boxes are traversed. For this manner, refer to an embodiment shown in FIG. 16A to FIG. 16D.

FIG. 16A to FIG. 16D are some schematic flowcharts of determining a subject box according to an embodiment of this application. It should be noted that in this implementation procedure, the electronic device sequentially generates the subject box 1606, the subject box 1607, and the subject box 1608 in the same manner in the foregoing content. A second subject box in which the subject box of the saliency region C is contained is shown as the subject box 1608. A length of the subject box 1608 exceeds the length of the thumbnail. Therefore, the electronic device does not place the subject box of the saliency region C into the second subject box. The second subject box is the subject box 1607 existing before the subject box of the saliency region C is contained. Then, the electronic device contains a subject box of the saliency region D in the second subject box. A second subject box in which the subject box of the saliency region D is contained is shown as a subject box 1609. A length of the subject box 1609 does not exceed the length of the thumbnail. The electronic device determines that the second subject box in this case is the subject box 1609. The four saliency regions in the picture 1604 are all traversed, and the first subject box finally determined by the electronic device is the second subject box 1609 formed after the four saliency regions are all traversed.

Figure 15:
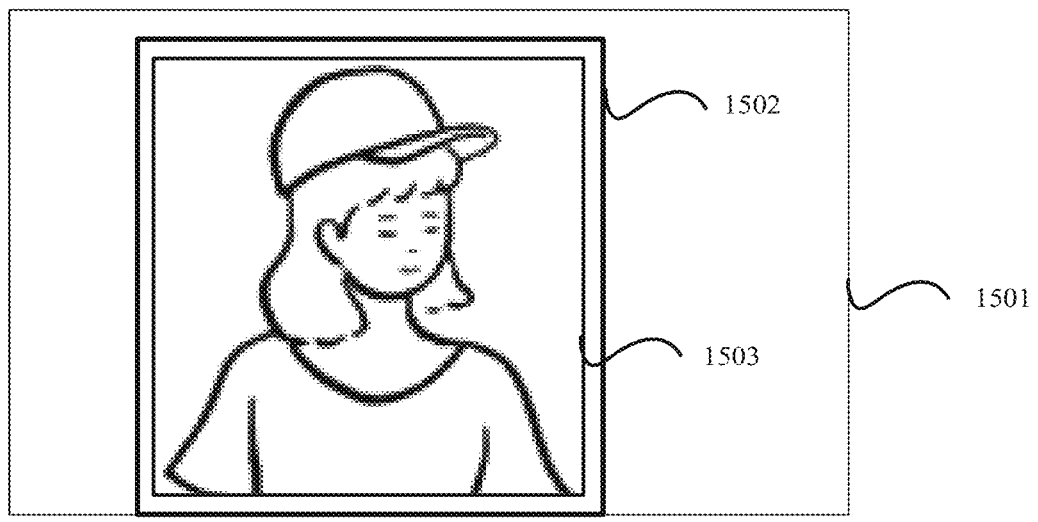
FIG. 15 is a schematic diagram of a position relationship among a saliency region, a subject box, and an optimized subject box according to an embodiment of this application.

If the crop box cannot include the second subject box, an optimized subject box is generated based on the saliency region included in the second subject box. The optimized subject box is a rectangular box including pixels whose grayscale values are greater than a preset value in a plurality of pixels of the saliency region. FIG. 15 is a schematic diagram of a position relationship among a saliency region, a subject box, and an optimized subject box according to an embodiment of this application. 1501 is a picture, 1502 is a subject box, and 1503 is an optimized subject box.

Subsequently, whether the crop box can include the optimized subject box is determined. If the crop box can include the optimized subject box, it is determined that the first subject box is the optimized subject box. If the crop box cannot include the optimized subject box, a semantic segmentation result of a picture part corresponding to the second subject box is obtained. Based on the semantic segmentation result, a region with a largest area is selected from regions corresponding to highest-level semantic categories. It is determined that the first subject box is a subject box that includes the region with the largest area. For a level of the semantic categories, refer to the description in the foregoing content. Optionally, the electronic device may determine whether the crop box can include the subject box of the region with the largest area. If the crop box cannot include the subject box of the region with the largest area, a crop box is formed in a non-constrained cropping manner. The non-constrained cropping manner is described below, and details are not described herein.

In another possible implementation, if the crop box cannot include the optimized subject box, the electronic device may extract a human face region of the saliency region by using a facial recognition technology, and then determine that the first subject box is a rectangular box including the human face region.

Figure 17:
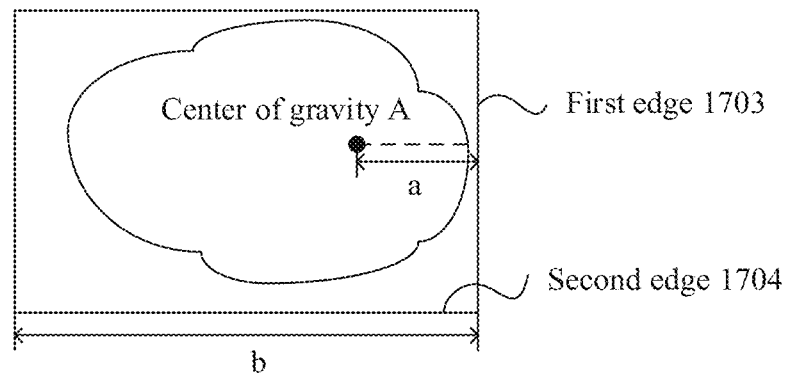
FIG. 17(1) and FIG. 17(2) are a schematic diagram of a crop box formed through non-constrained cropping according to an embodiment of this application.
Figure 17:
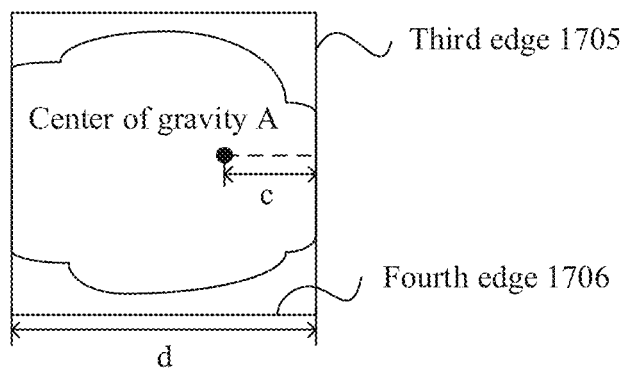

In another possible implementation, if the crop box cannot include the optimized subject box, the electronic device may directly form a crop box in the non-constrained cropping manner. The following describes the non-constrained cropping manner. It is assumed that the composition manner of the saliency region in the original picture is near-edge composition, where an edge close to the saliency region is a first edge, an edge perpendicular to the first edge is a second edge, an edge that is in a same position as the first edge in the thumbnail is a third edge, and an edge perpendicular to the third edge is a fourth edge. In this case, the electronic device determines that a ratio of a distance between a center of gravity of the saliency region in the thumbnail and the third edge to a length of the fourth edge is equal to a ratio of a distance between the center of gravity of the saliency region in the original picture and the first edge to a length of the second edge. If the composition manner of the saliency region in the original picture is not near-edge composition, the electronic device determines that a geometric center of the thumbnail coincides with a geometric center of the original picture. FIG. 17(1) and FIG. 17(2) are a schematic diagram of a crop box formed through non-constrained cropping according to an embodiment of this application. FIG. 17(1) is a schematic diagram of an original picture, and FIG. 17(2) is a schematic diagram of a thumbnail. A ratio c/d of a distance c between a center of gravity A of a saliency region in a crop box 1702 and a third edge 1705 to a length d of a fourth edge 1706 is equal to a ratio a/b of a distance a between the center of gravity A of the saliency region in the original picture and a first edge 1703 to a length b of a second edge 1704, that is, c/d=a/b.

Subsequently, the method for determining the composition manner of the saliency region in the picture in the horizontal direction in step S1104 is described.

If a reference line of the crop box is a trisection line, a reference line of the first picture is a trisection line; or if a reference line of the crop box is a golden section line, a reference line of the first picture is a golden section line; or if a reference line of the crop box is an optimal reference line, a reference line of the first picture is an optimal reference line. The following uses the optimal reference line as an example for description. For a manner in which the reference line is the trisection line or the golden section line, refer to a similar determining manner. Details are not described herein. It should be noted that trisection lines are connection lines of trisection points on edges of the picture in the horizontal direction and connection lines of trisection points on edges of the picture in the vertical direction, and one picture has four trisection lines.

First, a position of a center line, of the picture, perpendicular to the horizontal direction is calculated, and a position of an optimal reference line, of the picture, in the vertical direction is calculated based on the first subject box. The center line of the picture is a line segment that passes through a center of the picture and that is perpendicular to the horizontal direction. A ratio of a distance between the optimal reference line in the vertical direction and a left edge of the picture to the length of the picture has a correspondence with a ratio of a length of the first subject box to the length of the picture. In the correspondence, as the ratio of the length of the subject box to the length of the picture increases (this may be understood as that an area of the saliency region increases), the ratio of the distance between the optimal reference line and the left edge of the picture to the length of the picture increases. It should be noted that the correspondence indicates that as a proportion of the first subject box to the picture increases, the optimal reference line gradually approaches the center line from a trisection line of the picture.

For example, a manner of determining the optimal reference line may be determined according to the following formula:

$$k=-0.568 \cdot \delta^3 + 0.9598 \cdot \delta^2 - 0.2453 \cdot \delta + 0.3522.$$

Herein, δ represents the ratio of the length of the first subject box to the length of the picture, and k represents the ratio of the distance between the optimal reference line and the left edge of the picture to the length of the picture. A value of k ranges from ⅓ to ½. A position of the optimal reference line may be determined based on the value of k. Correspondingly, a ratio of a distance between another optimal reference line in the vertical direction and the left edge of the picture to the length of the picture is 1-k.

A rule for determining the composition manner in the horizontal direction is as follows: Distances between the center of gravity of the saliency region and two vertical edges of the picture, a distance between the center of gravity and the center line, and a distance between the center of gravity and the optimal reference line are compared, and the composition manner of the saliency region in the picture in the vertical direction is determined based on a line with a shortest distance from the center of gravity. Specifically, if a distance between the center of gravity of the saliency region and a vertical edge of the picture is the shortest, the composition manner of the saliency region in the picture in the horizontal direction is near-edge composition. If the distance between the center of gravity and the center line is the shortest, the composition manner of the saliency region in the picture in the horizontal direction is near-center line composition. If a distance between the center of gravity and an optimal reference line of the picture in the vertical direction is the shortest, the composition manner of the saliency region in the picture in the horizontal direction is near-reference line composition.

Figure 13A:
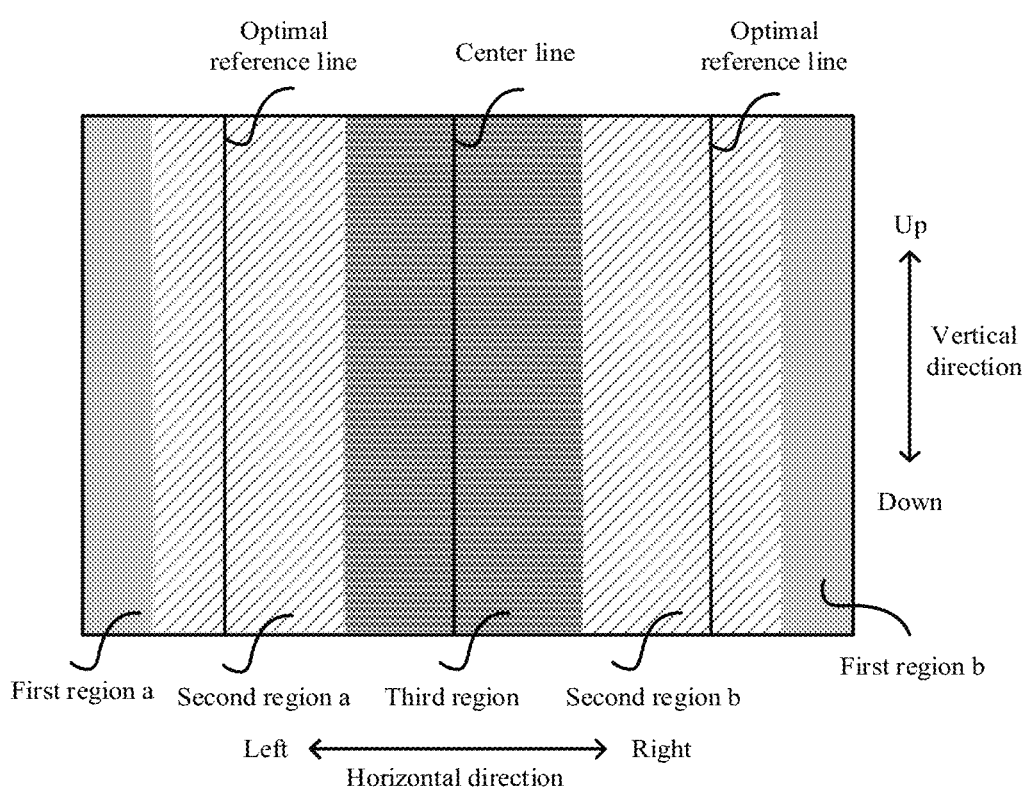
FIG. 13A and FIG. 13B are schematic diagrams of some correspondences between a position of a center of gravity of a saliency region and a composition manner according to an embodiment of this application.

In another possible implementation, a correspondence between a position of the center of gravity of the saliency region and a composition manner may be obtained according to the determining rule. The correspondence may be shown in FIG. 13A. If the center of gravity of the saliency region falls within a first region (including a first region a and a first region b), a distance between the center of gravity of the saliency region and a vertical edge of the picture is the shortest, and this indicates that the composition manner of the saliency region in the picture in the horizontal direction is near-edge composition. If the center of gravity of the saliency region falls within a second region (including a second region a and a second region b), a distance between the center of gravity and an optimal reference line of the picture in the vertical direction is the shortest, and this indicates that the composition manner of the saliency region in the picture in the horizontal direction is near-reference line composition. If the center of gravity of the saliency region falls within a third region, the distance between the center of gravity and the center line is the shortest, and this indicates that the composition manner of the saliency region in the horizontal direction is near-center line composition.

Subsequently, the method for determining the composition manner of the saliency region in the picture in the vertical direction in step S1104 is described.

First, a position of a center line, of the picture, parallel to the horizontal direction is calculated, and a position of an optimal reference line, of the picture, in the horizontal direction is calculated based on the first subject box. The center line of the picture is a line segment that passes through a center of the picture and that is parallel to the horizontal direction. A ratio of a distance between the optimal reference line in the horizontal direction and an upper edge of the picture to the length of the picture has a correspondence with a ratio of a width of the first subject box to the width of the picture. In the correspondence, as the ratio of the width of the subject box to the width of the picture increases (this may be understood as that an area of the saliency region increases), the ratio of the distance between the optimal reference line and the upper edge of the picture to the width of the picture increases. It should be noted that the correspondence indicates that as a proportion of the first subject box to the picture increases, the optimal reference line gradually approaches the center line from a trisection line of the picture.

For example, a manner of determining the optimal reference line may be determined according to the following formula:

$$k=-0.568 \cdot \delta^3 + 0.9598 \cdot \delta^2 - 0.2453 \cdot \delta + 0.3522.$$

Herein, δ represents the ratio of the width of the subject box to the width of the original picture, and k represents the ratio of the distance between the optimal reference line and the upper edge of the original picture to the width of the original picture. A value of k ranges from ⅓ to ½. A position of the optimal reference line may be determined based on the value of k. Correspondingly, a ratio of a distance between another optimal reference line in the vertical direction and the upper edge of the picture to the width of the picture is 1-k.

A rule for determining the composition manner in the vertical direction is as follows: Distances between the center of gravity of the saliency region and two horizontal edges of the picture, a distance between the center of gravity and the center line in the horizontal direction, and a distance between the center of gravity and the optimal reference line in the horizontal direction are compared, and the composition manner of the saliency region in the picture in the vertical direction is determined based on a line with a shortest distance from the center of gravity. Specifically, if a distance between the center of gravity of the saliency region and a horizontal edge of the picture is the shortest, the composition manner of the saliency region in the picture in the vertical direction is near-edge composition. If the distance between the center of gravity and the center line is the shortest, the composition manner of the saliency region in the picture in the vertical direction is near-center line composition. If a distance between the center of gravity and an optimal reference line of the picture in the horizontal direction is the shortest, the composition manner of the saliency region in the picture in the vertical direction is near-reference line composition.

Figure 13B:
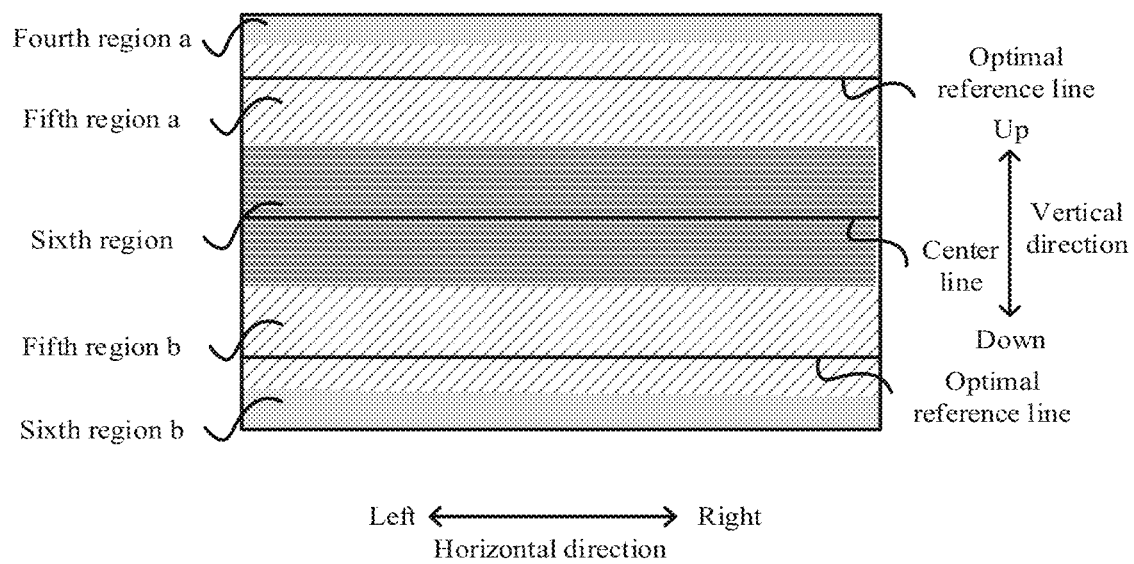

In another possible implementation, a correspondence between a position of the center of gravity of the saliency region and a composition manner may be obtained according to the determining rule. The correspondence may be shown in FIG. 13B. If the center of gravity of the saliency region falls within a fourth region (including a fourth region a and a fourth region b), a distance between the center of gravity of the saliency region and a horizontal edge of the picture is the shortest, and this indicates that the composition manner of the saliency region in the picture in the vertical direction is near-edge composition. If the center of gravity of the saliency region falls within a fifth region (including a fifth region a and a fifth region b), a distance between the center of gravity and an optimal reference line of the picture in the horizontal direction is the shortest, and this indicates that the composition manner of the saliency region in the picture in the vertical direction is near-reference line composition. If the center of gravity of the saliency region falls within a sixth region, the distance between the center of gravity and the center line is the shortest, and this indicates that the composition manner of the saliency region in the vertical direction is near-center line composition.

The following describes some other possible implementations of the foregoing method.

In an embodiment, if the saliency region cannot be determined through saliency detection or semantic segmentation, line detection may be performed on the picture. In a process of determining the position of the crop box based on a line detection result, on the premise of ensuring that the crop box does not cross a range of the picture, a detected straight line is placed as much as possible on the reference line of the crop box. The reference line may be a trisection line, a golden section line, or an optimal reference line.

In another embodiment, if the calculated width of the crop box is equal to the width of the picture, the crop box needs to be moved in the horizontal direction. Line detection may be further performed on the picture, to determine whether a straight line (for example, a straight line such as a sea horizon or a horizon) exists in the picture. If a straight line exists in the picture, whether the straight line is located in a nearby region of a golden section line of the picture in the horizontal direction is determined. The golden section line of the picture divides the picture into two parts, and a ratio of an area of a smaller part in the two parts to an area of a larger part in the two parts is equal to a ratio of the area of the larger part to an area of the entire picture. Specifically, if the straight line in the picture is located in the nearby region of the golden section line of the picture, a scaled crop box that can include the first subject box and that makes a center of gravity of the first subject box located on the golden section line is calculated based on a position of the golden section line of the picture. A size relationship between the scaled crop box and the initially calculated crop box is obtained through comparison. If the scaled crop box is larger than the initially calculated crop box, the initially calculated crop box is used to determine the composition manner in a subsequent process. If the scaled crop box is smaller than the originally calculated crop box, the scaled crop box is used to determine the composition manner in a subsequent process. To be specific, in step S1105, a position of the scaled crop box is moved, so that a composition manner of the saliency region included in the first subject box in the scaled crop box is the same as the composition manner of the saliency region included in the first subject box in the picture. It should be noted that, because it has been determined that a composition manner in the scaled crop box in the vertical direction is near-golden section line composition, the scaled crop box is moved in only the horizontal direction subsequently. In this manner, a position of a straight line in the crop box can comply with a golden section rule, so that a thumbnail is more aesthetic.

Figure 12:
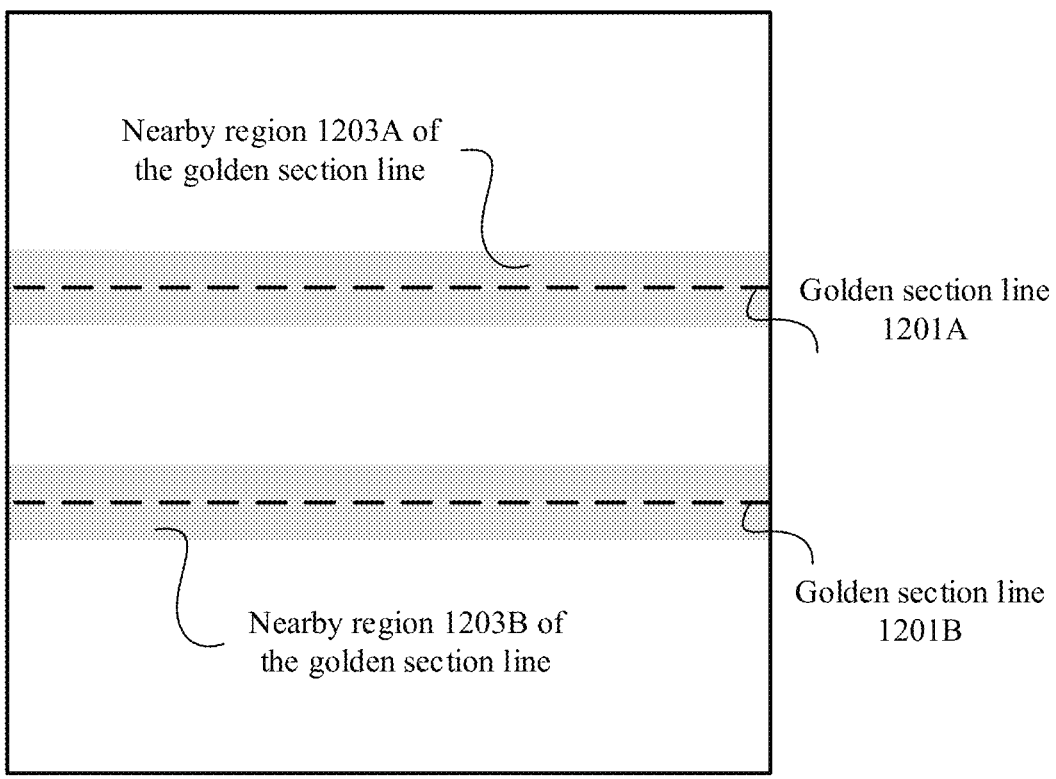
FIG. 12 is a schematic diagram of a nearby region of a golden section line according to an embodiment of this application.

FIG. 12 is a schematic diagram of a nearby region of a golden section line according to an embodiment of this application. As shown in FIG. 12, there are two golden section lines 1201A and 1201B in the horizontal direction, and gray regions are nearby regions 1203A and 1203B of the golden section lines. The nearby region of the golden section line is a region including points whose distances from the golden section line do not exceed a first preset value. It should be noted that there may be four golden section lines in one picture. In addition to the golden section lines in the horizontal direction that are shown in FIG. 12, there are also two golden section lines in the vertical direction.

Optionally, the scaled crop box may alternatively be calculated by using the optimal reference line. Specifically, if a straight line exists in the picture, whether the straight line is located in a nearby region of an optimal reference line of the picture in the horizontal direction is determined. For a manner of calculating the optimal reference line, refer to the foregoing description. Specifically, if the straight line in the picture is located in the nearby region of the optimal reference line of the picture, a scaled crop box that can include the first subject box and that makes a center of gravity of the first subject box located on the optimal reference line is calculated based on a position of the optimal reference line. The nearby region of the optimal reference line is a region including points whose distances from the optimal reference line do not exceed a first preset value. Similarly, the scaled crop box may alternatively be calculated by using the trisection line. This manner is similar to the foregoing manner, and details are not described herein.

Figure 18:
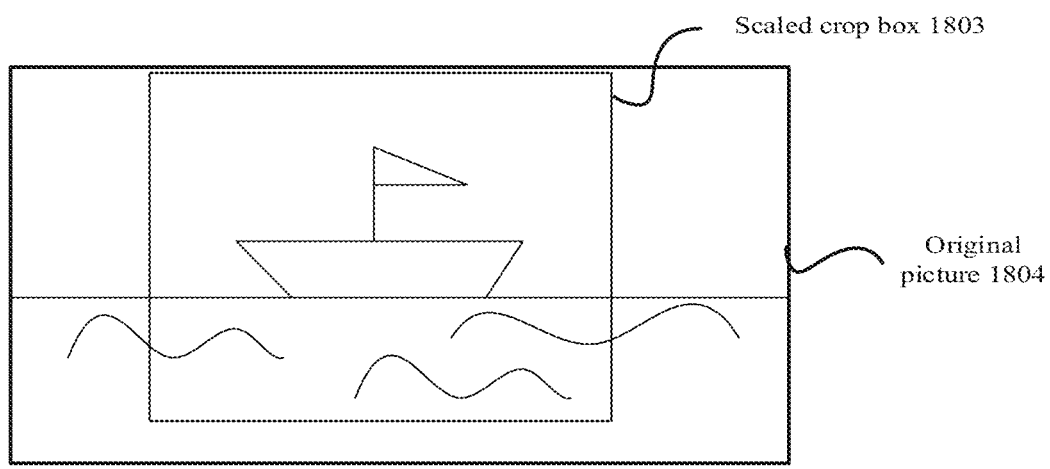
FIG. 18 is a schematic diagram of a scaled crop box according to an embodiment of this application.

FIG. 18 is a schematic diagram of a scaled crop box according to an embodiment of this application. A straight line exists in the original picture, and the straight line is located near an optimal reference line of the original picture. In this case, the scaled crop box is used in a thumbnail, and the straight line in the picture is located on an optimal reference line of the scaled crop box. In addition, because the composition manner of the saliency region in the original picture in the horizontal direction is near-center line composition, a position of the scaled crop box is moved horizontally, so that the center of gravity of the saliency region falls as much as possible on a center line of the scaled crop box. To be specific, the composition manner of the saliency region in the scaled crop box is the same as the composition manner of the saliency region included in the first subject box in the picture.

It may be understood that for specific implementations of the steps of the method in FIG. 11, refer to the foregoing embodiments in FIG. 1A(1) and FIG. 1A(2) to FIG. 10E. Details are not described herein again.

Figure 19:
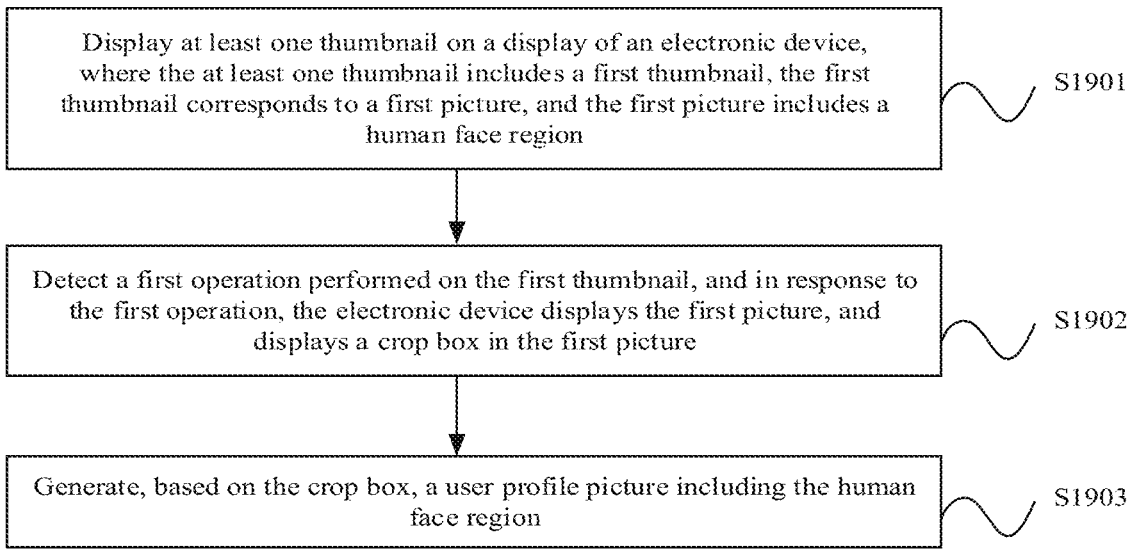
FIG. 19 is a schematic flowchart of a user profile picture generation method according to an embodiment of this application.

FIG. 19 is a schematic flowchart of a user profile picture generation method according to an embodiment of this application. The method includes the following steps.

S1901: Display at least one thumbnail on a display of an electronic device, where the at least one thumbnail includes a first thumbnail, the first thumbnail corresponds to a first picture, and the first picture includes a human face region.

For example, for a user interface that is displayed on the display of the electronic device and that includes the at least one thumbnail, refer to the user interface 102 shown in FIG. 10C. The first thumbnail is the thumbnail 1007. For the first picture, refer to the original picture 1010 shown in FIG. 10D. For the human face region, refer to the saliency region 1011 shown in FIG. 10D.

S1902: Detect a first operation performed on the first thumbnail, and in response to the first operation, the electronic device displays the first picture, and displays a crop box in the first picture.

The first picture corresponds to the first thumbnail, the crop box includes the human face region, and a composition manner of the human face region in the crop box is the same as a composition manner of the human face region in the first picture. For example, for this display manner, refer to the embodiment shown in FIG. 10D. For the crop box, refer to the crop box 1012.

The composition manner of the human face region in the crop box is determined by a shortest distance in a distance between a center of gravity of the human face region and a center line of the crop box, a distance between the center of gravity and an edge of the crop box, and a distance between the center of gravity and a reference line of the crop box, and the composition manner of the human face region in the first picture is determined by a shortest distance in a distance between the center of gravity of the human face region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line. It should be noted that, for a method for determining the composition manner, refer to the description in step S1104 in FIG. 11. Details are not described herein again.

S1903: Generate, based on the crop box, a user profile picture including the human face region.

For example, for the generated user profile picture, refer to the profile picture 1024 shown in FIG. 10E.

In a possible implementation, the first picture is a picture shot by using a camera of the electronic device, and the method further includes: recording a position of a focus frame of a viewfinder screen of the camera in a process of shooting the first picture, where picture content included in the focus frame is the human face region. For example, reference may be made to the embodiment corresponding to FIG. 8B. The first picture is a picture generated based on the image included in the display region 801, and the focus frame is the focus frame 806. It should be noted that, only flower photographing is used as an example in FIG. 8B, and such a manner is also applicable to determining of the human face region.

In a possible implementation, the first picture includes one human face, and the displaying a crop box in the first picture includes: determining a length and a width of the crop box based on a length and a width of the first picture and an aspect ratio of the crop box; generating a first subject box based on the human face, where the first subject box is a bounding rectangle of the human face; if a length of the first subject box is not greater than the length of the crop box, and a width of the first subject box is not greater than the width of the crop box, determining that the human face is the human face region; calculating a position of the crop box, so that the composition manner of the human face region in the crop box is the same as the composition manner of the human face region in the first picture; and displaying the crop box in the first picture based on the determined position of the crop box.

In a possible implementation, the method further includes: generating an optimized human face based on the human face if the length of the first subject box is greater than the length of the crop box or the width of the first subject box is greater than the width of the crop box, where the optimized human face is a picture region including pixels whose grayscale values are greater than a preset value in a plurality of pixels of the human face; generating a second subject box based on the optimized human face, where the second subject box is a bounding rectangle of the optimized human face; and if a length of the second subject box is not greater than the length of the crop box, and a width of the second subject box is not greater than the width of the crop box, determining that the optimized human face is the human face region.

In a possible implementation, the first picture includes two human faces, and the displaying a crop box in the first picture includes: determining a length and a width of the crop box based on a length and a width of the first picture and an aspect ratio of the crop box; generating a third subject box and a fourth subject box based on the two human faces, where the third subject box is a bounding rectangle of a human face with a larger area in the two human faces, and the fourth subject box is a bounding rectangle of a human face with a smaller area in the two human faces; if a length of the third subject box is not greater than the length of the crop box, a width of the third subject box is not greater than the width of the crop box, a length of a fifth subject box is not greater than the length of the crop box, and a width of the fifth subject box is not greater than the width of the crop box, determining that a minimum picture region that includes the two human faces is the human face region, where the fifth subject box is a minimum bounding rectangle that includes the fourth subject box and the fifth subject box; or if a length of the third subject box is not greater than the length of the crop box, a width of the third subject box is not greater than the width of the crop box, and a length of a fifth subject box is greater than the length of the crop box, or a width of the fifth subject box is greater than the width of the crop box, determining that the human face with the larger area in the two human faces is the human face region; calculating a position of the crop box, so that the composition manner of the human face region in the crop box is the same as the composition manner of the human face region in the first picture; and displaying the crop box in the first picture based on the determined position of the crop box.

In a possible implementation, the first picture includes three or more human faces, and the displaying a crop box in the first picture includes: determining a length and a width of the crop box based on a length and a width of the first picture and an aspect ratio of the crop box; generating three or more sixth subject boxes based on the three or more human faces, where one sixth subject box is a bounding rectangle of one of the three or more human faces, each sixth subject box corresponds to a different human face, and a subject box with a largest area in the three or more sixth subject boxes is a seventh subject box; if a length of the seventh subject box is not greater than the length of the crop box, and a width of the seventh subject box is not greater than the width of the crop box, expanding the seventh subject box, to sequentially contain other subject boxes in the seventh subject box in descending order of areas, until a length of a seventh subject box obtained after an eighth subject box is contained is greater than the length of the crop box, or a width of the seventh subject box obtained after the eighth subject box is contained is greater than the width of the crop box, and determining that the human face region is a human face included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the crop box, and a width of the seventh subject box is not greater than the width of the crop box, expanding the seventh subject box, to sequentially contain other subject boxes in the seventh subject box in descending order of areas, until the other subject boxes are all traversed, and determining that the human face region is a human face included in a seventh subject box obtained after the other subject boxes are all traversed, where after a ninth subject box is contained, if a length of the seventh subject box is greater than the length of the crop box or a width of the seventh subject box is greater than the width of the crop box, it is determined that the seventh subject box is a seventh subject box existing before the third subject box is contained, or after the ninth subject box is contained, if a length of the seventh subject box is not greater than the length of the crop box or a width of the seventh subject box is not greater than the width of the crop box, it is determined that the seventh subject box is a seventh subject box obtained after the ninth subject box is contained, and it is determined that the human face included in the seventh subject box obtained after the other subject boxes are all traversed is the human face region; calculating a position of the crop box, so that the composition manner of the human face region in the crop box is the same as the composition manner of the human face region in the first picture; and displaying the crop box in the first picture based on the determined position of the crop box. It should be noted that, for a specific implementation of determining the position of the crop box, refer to the cropping manner described in the embodiment corresponding to FIG. 11.

Figure 20:
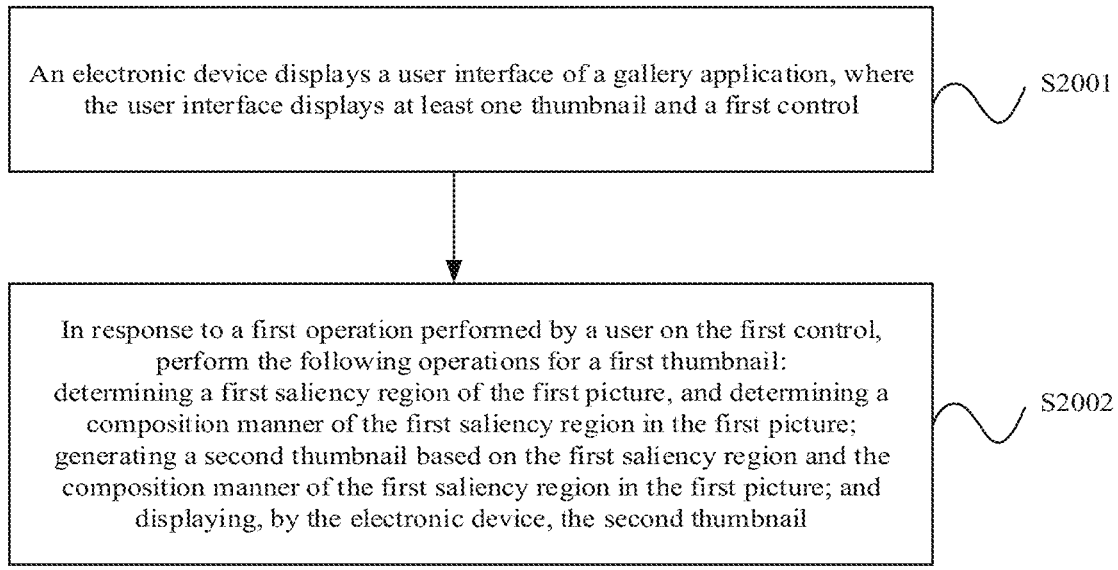
FIG. 20 is a schematic flowchart of a thumbnail generation method according to an embodiment of this application.

FIG. 20 is a schematic flowchart of a thumbnail generation method according to an embodiment of this application. The method includes the following steps.

S2001: An electronic device displays a user interface of a gallery application, where the user interface displays at least one thumbnail and a first control, and each of the at least one thumbnail corresponds to one picture.

For example, for the user interface of the gallery application, refer to the user interface 61 shown in FIG. 6A or FIG. 6B. For the first control, refer to the control 601 shown in FIG. 6A or FIG. 6B. The at least one thumbnail may include the thumbnail 602 and the thumbnail 603.

S2002: In response to a first operation performed by a user on the first control, perform the following operations for a first thumbnail:

determining a first saliency region of the first picture, and determining a composition manner of the first saliency region in the first picture; generating a second thumbnail based on the first saliency region and the composition manner of the first saliency region in the first picture; and displaying, by the electronic device, the second thumbnail.

The first thumbnail is any one of the at least one thumbnail. The composition manner of the first saliency region in the first picture is the same as a composition manner of the first saliency region in the second thumbnail, and the second thumbnail corresponds to the first picture. For example, the first thumbnail may be the thumbnail 602 in FIG. 6A. The second thumbnail may be the thumbnail 602 in FIG. 6B.

In a possible implementation, the composition manner of the first saliency region in the second thumbnail is determined by a shortest distance in a distance between a center of gravity of the first saliency region and a center line of the second thumbnail, a distance between the center of gravity and an edge of the second thumbnail, and a distance between the center of gravity and a reference line of the second thumbnail, and the composition manner of the first saliency region in the first picture is determined by a shortest distance in a distance between the center of gravity of the first saliency region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line. It should be noted that, for a method for determining the composition manner, refer to the description in step S1104 in FIG. 11. Details are not described herein again.

In a possible implementation, before the first operation is received, the first control is in a first state, and the first state is used to indicate that the first thumbnail is allowed to be adjusted; and after the second operation is received, the first control is in a second state, and the second state is used to indicate that the second thumbnail is adjusted. For example, for the first state, refer to the state of the control 601 shown in FIG. 6A, and for the second state, refer to the state of the control 601 shown in FIG. 6B.

In a possible implementation, the first picture is a picture shot by using a camera of the electronic device, and the method further includes: recording a position of a focus frame of a viewfinder screen of the camera in a process of shooting the first picture, where picture content included in the focus frame is the first saliency region. For example, reference may be made to the embodiment corresponding to FIG. 8B. The first picture is a picture generated based on the image included in the display region 801, and the focus frame is the focus frame 806.

In a possible implementation, the first picture includes one saliency region, and the determining a first saliency region of a first picture includes: determining a length and a width of the second thumbnail based on a length and a width of the first picture and an aspect ratio of the thumbnail; generating a first subject box based on the saliency region, where the first subject box is a bounding rectangle of the saliency region; and if a length of the first subject box is not greater than the length of the second thumbnail, and a width of the first subject box is not greater than the width of the second thumbnail, determining that the saliency region is the first saliency region.

In a possible implementation, the method further includes: if the length of the first subject box is greater than the length of the second thumbnail, or the width of the first subject box is greater than the width of the second thumbnail, performing semantic segmentation on a picture region corresponding to the saliency region with a largest area, to obtain N semantic categories, where N≥2, one semantic category corresponds to one or more regions, and the regions are regions that do not overlap each other; determining an area of a region corresponding to each of the N semantic categories; calculating a score of an $i^{th}$ semantic category, where the score of the $i^{th}$ semantic category is a product of an area of a region corresponding to the $i^{th}$ semantic category and a weight corresponding to the $i^{th}$ semantic category, and the electronic device pre-stores the weight corresponding to the semantic category; and determining that a picture region including one or more regions corresponding to a semantic category with a highest score in the N semantic categories is the first saliency region.

In a possible implementation, the method further includes: generating an optimized saliency region based on the saliency region if the length of the first subject box is greater than the length of the second thumbnail or the width of the first subject box is greater than the width of the second thumbnail, where the optimized saliency region is a picture region including pixels whose grayscale values are greater than a preset value in a plurality of pixels of the saliency region; generating a second subject box based on the optimized saliency region, where the second subject box is a bounding rectangle of the optimized saliency region; and if a length of the second subject box is not greater than the length of the second thumbnail, and a width of the second subject box is not greater than the width of the second thumbnail, determining that the optimized saliency region is the first saliency region.

In a possible implementation, the first picture includes two saliency regions, and the determining a first saliency region of a first picture includes: determining a length and a width of the second thumbnail based on a length and a width of the first picture and an aspect ratio of the thumbnail; generating a third subject box and a fourth subject box based on the two saliency regions, where the third subject box is a bounding rectangle of a saliency region with a larger area in the two saliency regions, and the fourth subject box is a bounding rectangle of a saliency region with a smaller area in the two saliency regions; and if a length of the third subject box is not greater than the length of the second thumbnail, a width of the third subject box is not greater than the width of the second thumbnail, a length of a fifth subject box is not greater than the length of the second thumbnail, and a width of the fifth subject box is not greater than the width of the second thumbnail, determining that a minimum picture region that includes the two saliency regions is the first saliency region, where the fifth subject box is a minimum bounding rectangle that includes the fourth subject box and the fifth subject box; or if a length of the third subject box is not greater than the length of the second thumbnail, a width of the third subject box is not greater than the width of the second thumbnail, and a length of a fifth subject box is greater than the length of the second thumbnail, or a width of the fifth subject box is greater than the width of the second thumbnail, determining that the saliency region with the larger area in the two saliency regions is the first saliency region.

In a possible implementation, the first picture includes three or more saliency regions, and the determining a first saliency region of a first picture includes: determining a length and a width of the second thumbnail based on a length and a width of the first picture and an aspect ratio of the thumbnail; generating three or more sixth subject boxes based on the three or more saliency regions, where one sixth subject box is a bounding rectangle of one of the three or more saliency regions, each sixth subject box corresponds to a different saliency region, and a subject box with a largest area in the three or more sixth subject boxes is a seventh subject box; and if a length of the seventh subject box is not greater than the length of the second thumbnail, and a width of the seventh subject box is not greater than the width of the second thumbnail, expanding the seventh subject box, to sequentially contain other subject boxes in the seventh subject box in descending order of areas, until a length of a seventh subject box obtained after an eighth subject box is contained is greater than the length of the second thumbnail, or a width of the seventh subject box obtained after the eighth subject box is contained is greater than the width of the second thumbnail, and determining that the first saliency region is a saliency region included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the second thumbnail, and a width of the seventh subject box is not greater than the width of the second thumbnail, expanding the seventh subject box, to sequentially contain other subject boxes in the seventh subject box in descending order of areas, until the other subject boxes are all traversed, and determining that the first saliency region is a saliency region included in a seventh subject box obtained after the other subject boxes are all traversed, where after a ninth subject box is contained, if a length of the seventh subject box is greater than the length of the second thumbnail or a width of the seventh subject box is greater than the width of the second thumbnail, it is determined that the seventh subject box is a seventh subject box existing before the third subject box is contained, or after the ninth subject box is contained, if a length of the seventh subject box is not greater than the length of the second thumbnail or a width of the seventh subject box is not greater than the width of the second thumbnail, it is determined that the seventh subject box is a seventh subject box obtained after the ninth subject box is contained, and it is determined that the saliency region included in the seventh subject box obtained after the other subject boxes are all traversed is the first saliency region. It should be noted that for each specific implementation of determining the first saliency region, refer to the manner for determining the first subject box that is described in the embodiment corresponding to FIG. 11. A saliency region included in the first subject box is the first saliency region.

In a possible implementation, the method further includes: detecting a second operation performed by the user on a third thumbnail, and in response to the second operation, displaying, by the electronic device, a second picture, and displaying two or more prompts in the second picture, where each of the two or more prompts corresponds to one saliency region in the second picture, different prompts correspond to different saliency regions, the third thumbnail is one of adjusted thumbnails, and the third thumbnail corresponds to the second picture; detecting a third operation performed by the user on at least one prompt, where the third operation is used to select the at least one prompt; and in response to the third operation, generating, by the electronic device, a fourth thumbnail based on a saliency region corresponding to the at least one prompt and a composition manner of the saliency region corresponding to the at least one prompt in the second picture, where the fourth thumbnail includes the saliency region corresponding to the at least one prompt, and a composition manner of the saliency region corresponding to the at least one prompt in the fourth thumbnail is the same as the composition manner of the saliency region corresponding to the at least one prompt in the second picture. For example, for this manner, refer to the embodiment corresponding to FIG. 7A to FIG. 7F. The third thumbnail may be the thumbnail 701, the second picture may be the original picture 705, the two or more prompts may be the prompt 707A, the prompt 707B, and the prompt 707C, the third operation may be the operation entered by the user on the control 708, and the fourth thumbnail is the generated thumbnail 711.

In a possible implementation, the generating, by the electronic device, a fourth thumbnail based on a saliency region corresponding to the at least one prompt and a composition manner of the saliency region corresponding to the at least one prompt in the second picture includes:

determining a length and a width of the fourth thumbnail based on a length and a width of the second picture and the aspect ratio of the thumbnail; generating a tenth subject box based on the saliency region corresponding to the at least one prompt, where the tenth subject box is a bounding rectangle of the saliency region corresponding to the at least one prompt; and if the length of the fourth thumbnail is not less than a length of the tenth subject box, and the width of the fourth thumbnail is not less than a width of the tenth subject box, generating, by the electronic device, the fourth thumbnail based on the saliency region corresponding to the at least one prompt and the composition manner of the saliency region corresponding to the at least one prompt in the second picture; or the method further includes: if the length of the fourth thumbnail is less than a length of the tenth subject box, or the width of the fourth thumbnail is less than a width of the tenth subject box, displaying, by the electronic device, prompt information, where the prompt information is used to prompt the user to reselect a saliency region. For example, for the prompt message, refer to the prompt message 717 in FIG. 7F.

In a possible implementation, the method further includes: detecting a second operation performed by the user on a third thumbnail, and in response to the second operation, displaying, by the electronic device, a second picture, where the third thumbnail is one of adjusted thumbnails, and the third thumbnail corresponds to the second picture; detecting a fourth operation performed by the user on the second picture, where the fourth operation is an operation of entering a selection box or a closed figure and confirming the selection box or the closed figure; and in response to the fourth operation, determining, by the electronic device, that a picture region included in the selection box or the closed figure is a second saliency region, and generating a fifth thumbnail based on the second saliency region and a composition manner of the second saliency region in the second picture, where the fifth thumbnail includes the second saliency region, and a composition manner of the second saliency region in the fifth thumbnail is the same as the composition manner of the second saliency region in the second picture. For example, for this manner, refer to the embodiment corresponding to FIG. 7G and FIG. 7H. The third thumbnail may be the thumbnail 701, the second picture may be the original picture 705, the selection box may be the selection box 722, the closed figure may be the closed FIG. 723, and the fourth operation may be the operation of entering the selection box or the closed figure and operating the control 708 by the user. The selection box or the closed figure entered by the user may be determined based on a slide operation that is of a user finger and that is received on a touchscreen.

Figure 21:
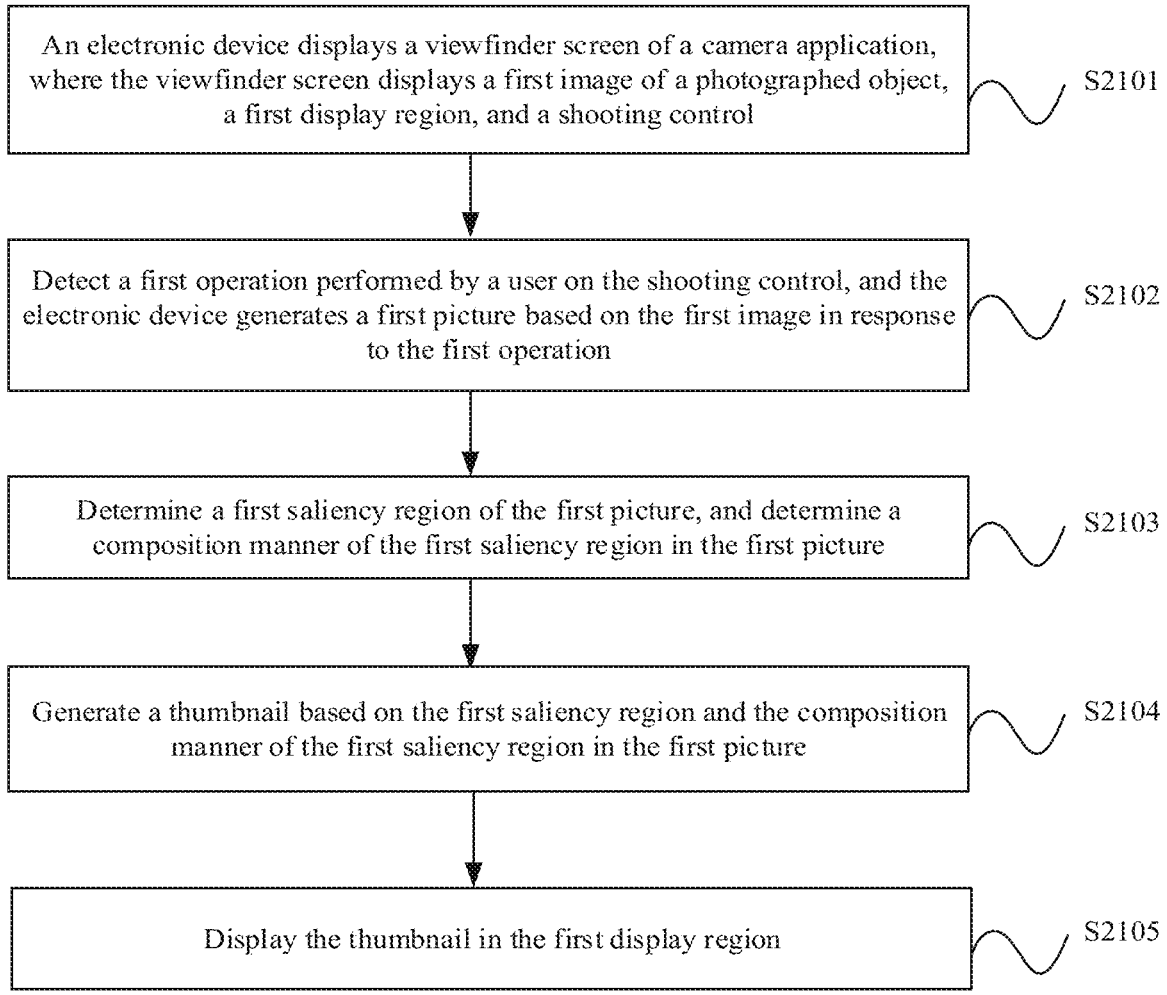
FIG. 21 is a schematic flowchart of another thumbnail generation method according to an embodiment of this application.

FIG. 21 is a schematic flowchart of another thumbnail generation method according to an embodiment of this application. The method includes the following steps.

S2101: An electronic device displays a viewfinder screen of a camera application, where the viewfinder screen displays a first image of a photographed object, a first display region, and a shooting control.

For example, for this manner, refer to the embodiment corresponding to FIG. 8B. For the viewfinder screen, refer to the user interface 82 shown in FIG. 8B. The first image is an image included in the display region 801.

S2102: Detect a first operation performed by a user on the shooting control, and the electronic device generates a first picture based on the first image in response to the first operation.

For example, the shooting control may be the shooting control 803 shown in FIG. 8B, and the first operation may be a tap operation on the shooting control 803.

S2103: Determine a first saliency region of the first picture, and determine a composition manner of the first saliency region in the first picture.

S2104: Generate a thumbnail based on the first saliency region and the composition manner of the first saliency region in the first picture, where the composition manner of the first saliency region in the first picture is the same as a composition manner of the first saliency region in the thumbnail.

S2105: Display the thumbnail in the first display region.

For example, the first display region may be the display region 804 shown in FIG. 8B. The thumbnail may be a picture displayed in the display region 804.

In a possible implementation, the composition manner of the first saliency region in the thumbnail is determined by a shortest distance in a distance between a center of gravity of the first saliency region and a center line of the thumbnail, a distance between the center of gravity and an edge of the thumbnail, and a distance between the center of gravity and a reference line of the thumbnail, and the composition manner of the first saliency region in the first picture is determined by a shortest distance in a distance between the center of gravity of the first saliency region and a center line of the first picture, a distance between the center of gravity and an edge of the first picture, and a distance between the center of gravity and a reference line of the first picture, where the reference line of the crop box is a trisection line, and the reference line of the first picture is a trisection line, or the reference line of the crop box is a golden section line, and the reference line of the first picture is a golden section line. It should be noted that, for a method for determining the composition manner, refer to the description in step S1104 in FIG. 11. Details are not described herein again.

In a possible implementation, the determining a first saliency region of the first picture includes: detecting a second operation performed by the user on the viewfinder screen, and in response to the second operation, displaying, by the electronic device, a focus frame in the first image, and recording a position of the focus frame; determining, based on the position of the focus frame, picture content included in the focus frame; and determining that the first saliency region of the first picture is the picture content included in the focus frame. For example, the second operation may be an operation of the user that is received in the display region 801, and the focus frame is the focus frame 806.

In a possible implementation, the first picture includes one saliency region, and the determining a first saliency region of a first picture includes: determining a length and a width of the second thumbnail based on a length and a width of the first picture and an aspect ratio of the thumbnail; generating a first subject box based on the saliency region, where the first subject box is a bounding rectangle of the saliency region; and if a length of the first subject box is not greater than the length of the second thumbnail, and a width of the first subject box is not greater than the width of the second thumbnail, determining that the saliency region is the first saliency region.

In a possible implementation, the method further includes: if the length of the first subject box is greater than the length of the thumbnail, or the width of the first subject box is greater than the width of the thumbnail, performing semantic segmentation on a picture region corresponding to the saliency region with a largest area, to obtain N semantic categories, where N≥2, one semantic category corresponds to one or more regions, and the regions are regions that do not overlap each other; determining an area of a region corresponding to each of the N semantic categories; calculating a score of an $i^{th}$ semantic category, where the score of the $i^{th}$ semantic category is a product of an area of a region corresponding to the $i^{th}$ semantic category and a weight corresponding to the $i^{th}$ semantic category, and the electronic device pre-stores the weight corresponding to the semantic category; and determining that a picture region including one or more regions corresponding to a semantic category with a highest score in the N semantic categories is the first saliency region.

In a possible implementation, the method further includes: generating an optimized saliency region based on the saliency region if the length of the first subject box is greater than the length of the thumbnail or the width of the first subject box is greater than the width of the thumbnail, where the optimized saliency region is a picture region including pixels whose grayscale values are greater than a preset value in a plurality of pixels of the saliency region; generating a second subject box based on the optimized saliency region, where the second subject box is a bounding rectangle of the optimized saliency region; and if a length of the second subject box is not greater than the length of the thumbnail, and a width of the second subject box is not greater than the width of the thumbnail, determining that the optimized saliency region is the first saliency region.

In a possible implementation, the first picture includes two saliency regions, and the determining a first saliency region of the first picture includes: determining a length and a width of the thumbnail based on a length and a width of the first picture and an aspect ratio of the thumbnail; generating a third subject box and a fourth subject box based on the two saliency regions, where the third subject box is a bounding rectangle of a saliency region with a larger area in the two saliency regions, and the fourth subject box is a bounding rectangle of a saliency region with a smaller area in the two saliency regions; and if a length of the third subject box is not greater than the length of the thumbnail, a width of the third subject box is not greater than the width of the thumbnail, a length of a fifth subject box is not greater than the length of the thumbnail, and a width of the fifth subject box is not greater than the width of the thumbnail, determining that a minimum picture region that includes the two saliency regions is the first saliency region, where the fifth subject box is a minimum bounding rectangle that includes the fourth subject box and the fifth subject box; or if a length of the third subject box is not greater than the length of the thumbnail, a width of the third subject box is not greater than the width of the thumbnail, and a length of a fifth subject box is greater than the length of the thumbnail, or a width of the fifth subject box is greater than the width of the thumbnail, determining that the saliency region with the larger area in the two saliency regions is the first saliency region.

In a possible implementation, the first picture includes three or more saliency regions, and the determining a first saliency region of the first picture includes: determining a length and a width of the thumbnail based on a length and a width of the first picture and an aspect ratio of the thumbnail; generating three or more sixth subject boxes based on the three or more saliency regions, where one sixth subject box is a bounding rectangle of one of the three or more saliency regions, each sixth subject box corresponds to a different saliency region, and a subject box with a largest area in the three or more sixth subject boxes is a seventh subject box; and if a length of the seventh subject box is not greater than the length of the thumbnail, and a width of the seventh subject box is not greater than the width of the thumbnail, expanding the seventh subject box, to sequentially contain other subject boxes in the seventh subject box in descending order of areas, until a length of a seventh subject box obtained after an eighth subject box is contained is greater than the length of the thumbnail, or a width of the seventh subject box obtained after the eighth subject box is contained is greater than the width of the thumbnail, and determining that the first saliency region is a saliency region included in a seventh subject box existing before the eighth subject box is contained, where the eighth subject box is one of the other subject boxes, and the other subject boxes are sixth subject boxes other than the seventh subject box in the three or more sixth subject boxes; or if a length of the seventh subject box is not greater than the length of the thumbnail, and a width of the seventh subject box is not greater than the width of the thumbnail, expanding the seventh subject box, to sequentially contain other subject boxes in the seventh subject box in descending order of areas, until the other subject boxes are all traversed, and determining that the first saliency region is a saliency region included in a seventh subject box obtained after the other subject boxes are all traversed, where after a ninth subject box is contained, if a length of the seventh subject box is greater than the length of the thumbnail or a width of the seventh subject box is greater than the width of the thumbnail, it is determined that the seventh subject box is a seventh subject box existing before the third subject box is contained, or after the ninth subject box is contained, if a length of the seventh subject box is not greater than the length of the thumbnail or a width of the seventh subject box is not greater than the width of the thumbnail, it is determined that the seventh subject box is a seventh subject box obtained after the ninth subject box is contained, and it is determined that the saliency region included in the seventh subject box obtained after the other subject boxes are all traversed is the first saliency region. It should be noted that for each specific implementation of determining the first saliency region, refer to the manner for determining the first subject box that is described in the embodiment corresponding to FIG. 11. A saliency region included in the first subject box is the first saliency region.

It should be noted that the implementations of this application may be randomly combined to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk)), or the like.

In summary, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. An electronic device comprising:
a display;
a memory coupled to the display and configured to store a computer program code comprising computer instructions; and
one or more processors coupled to the display and the memory, wherein when executed by the one or more processors, the computer instructions cause the electronic device to:
  display at least one thumbnail on the display, wherein the at least one thumbnail comprises a first thumbnail that corresponds to a first picture, and wherein the first picture comprises a human face region;
  detect a first operation on the first thumbnail;
  display, in response to the first operation, the first picture and a crop box in the first picture, wherein the crop box comprises the human face region, and wherein a first composition manner of the human face region in the crop box is the same as a second composition manner of the human face region in the first picture; and
  generate, based on the crop box, a user profile picture comprising the human face region,
  wherein the first composition manner is based on a first shortest distance from among a first distance between a center of gravity of the human face region and a first center line of the crop box, a second distance between the center of gravity and a first edge of the crop box, and a third distance between the center of gravity and a first reference line of the crop box,
  wherein the first reference line is a first trisection line or a first golden section line,
  wherein the second composition manner is based on a second shortest distance from among a fourth distance between the center of gravity and a second center line of the first picture, a fifth distance between the center of gravity and a second edge of the first picture, and a sixth distance between the center of gravity and a second reference line of the first picture, and
  wherein the second reference line is a second trisection line or a second golden section line.

2. The electronic device of claim 1, further comprising a camera coupled to the memory and configured to capture the first picture, wherein when executed by the one or more processors, the computer instructions further cause the electronic device to record a position of a focus frame of a viewfinder screen of the camera while capturing the first picture, and wherein a picture content in the focus frame is the human face region.

3. The electronic device of claim 1, wherein the first picture comprises a human face, and wherein when executed by the one or more processors, the computer instructions further cause the electronic device to:
  determine a first length of the crop box and a first width of the crop box based on a second length of the first picture and a second width of the first picture and an aspect ratio of the crop box;
  generate a first subject box based on the human face, wherein the first subject box is a first bounding rectangle of the human face;
  determine that the human face is the human face region when a third length of the first subject box is not greater than the first length and when a third width of the first subject box is not greater than the first width of the crop box;
  calculate a position of the crop box to make the first composition manner the same as the second composition manner; and
  further display the crop box in the first picture based on the position.

4. The electronic device of claim 3, wherein when executed by the one or more processors, the computer instructions further cause the electronic device to:
  generate an optimized human face based on the human face when the third length is greater than the first length or when the third width is greater than the first width, wherein the optimized human face is a picture region comprising first pixels with grayscale values greater than a preset value in a plurality of second pixels of the human face;
  generate a second subject box based on the optimized human face, wherein the second subject box is a second bounding rectangle of the optimized human face; and
  determine that the optimized human face is the human face region when a fourth length of the second subject box is not greater than the first length and when a fourth width of the second subject box is not greater than the first width.

5. The electronic device of claim 1, wherein the first picture comprises two human faces, and wherein when executed by the one or more processors, the computer instructions further cause the electronic device to:
  determine a first length of the crop box and a first width of the crop box based on a second length of the first picture and a second width of the first picture and an aspect ratio of the crop box;
  generate a third subject box and a fourth subject box based on the two human faces, wherein the third subject box is a third bounding rectangle of a first human face with a larger area in the two human faces, and wherein the fourth subject box is a fourth bounding rectangle of a second human face with a smaller area in the two human faces;
  determine that a minimum picture region that comprises the two human faces is the human face region when a third length of the third subject box is not greater than the first length, a third width of the third subject box is not greater than the first width, a fourth length of a fifth subject box is not greater than the first length, and a fourth width of the fifth subject box is not greater than the first width of the crop box, wherein the fifth subject box is a minimum bounding rectangle that comprises the fourth subject box and the third subject box;
  determine that the first human face is the human face region when the third length is not greater than the first length, the third width is not greater than the first width, and the fourth length is greater than the first length or the fourth width is greater than the first width;

calculate a position of the crop box to make the first composition manner the same as the second composition manner; and further display the crop box in the first picture based on the position.

6. The electronic device of claim 1, wherein the first picture comprises three or more human faces, and wherein when executed by the one or more processors, the computer instructions further cause the electronic device to:

determine first dimensions of the crop box;

generate three or more sixth subject boxes based on the three or more human faces, wherein a seventh subject box comprises a largest area in the three or more sixth subject boxes;

when second dimensions of the seventh subject box are not greater than the first dimensions, perform on of:

expand the seventh subject box until third dimensions of an expanded seventh subject box is greater than the first dimensions and determine that the human face region is a first human face in a first existing seventh subject box; or expand the seventh subject box until other subject boxes are all traversed and determine that the human face region is a second human face in a first updated seventh subject box, wherein the other subject boxes are sixth subject boxes other than the seventh subject box in the three or more sixth subject boxes;

calculate a position of the crop box to make the first composition manner the same as the second composition manner; and further display the crop box in the first picture based on the position.

7. An electronic device comprising:

a display;

a memory coupled to the display and configured to store a computer program code comprising computer instructions; and one or more processors coupled to the display and the memory, wherein when executed by the one or more processors, the computer instructions cause the electronic device to:

display, on the display, a first thumbnail corresponding to a first picture, wherein the first picture comprises a first saliency region, and wherein a first composition manner of the first saliency region in the first picture is the same as a second composition manner of the first saliency region in the first thumbnail;

detect a first operation;

display, on the display and in response to the first operation, the first picture;

determine the second composition manner based on a first shortest distance from among a first distance between a center of gravity of the first saliency region and a first center line of the first thumbnail, a second distance between the center of gravity and a first edge of the first thumbnail, and a third distance between the center of gravity and a first reference line of the first thumbnail, wherein the first reference line is a first trisection line or a first golden section line; and determine the first composition manner based on a second shortest distance from among a fourth distance between the center of gravity and a second center line of the first picture, a fifth distance between the center of gravity and a second edge of the first picture, and a sixth distance between the center of gravity and a second reference line of the first picture, wherein the second reference line is a second trisection line or a second golden section line.

8. The electronic device of claim 7, further comprising a camera coupled to the processor and configured to capture the first picture, and wherein when executed by the one or more processors, the computer instructions further cause the electronic device to record a position of a focus frame of a viewfinder screen of the camera while capturing the first picture, and wherein a picture content in the focus frame is the first saliency region.

9. The electronic device of claim 7, wherein the first picture comprises a second saliency region, and wherein when executed by the one or more processors, the computer instructions further cause the electronic device to:

determine a first length of a second thumbnail and a first width of the second thumbnail based on a second length of the first picture and a second width of the first picture and an aspect ratio of the thumbnail;

generate a first subject box based on the second saliency region, wherein the first subject box is a first bounding rectangle of the second saliency region; and determine that the second saliency region is the first saliency region when a third length of the first subject box is not greater than the first length and a third width of the first subject box is not greater than the first width.

10. The electronic device of claim 9, wherein when executed by the one or more processors, the computer instructions further cause the electronic device to:

perform, when the third length is greater than the first length or the third width is greater than the first width, semantic segmentation on a picture region corresponding to the second saliency region to obtain N semantic categories, wherein N≥2, wherein one semantic category corresponds to one or more regions, and wherein the one or more regions do not overlap with each other;

determine an area of a region corresponding to each of the N semantic categories;

calculate a score of an $i^{th}$ semantic category, wherein the score is a product of an area of a region corresponding to the $i^{th}$ semantic category and a weight corresponding to the $i^{th}$ semantic category, and wherein the weight is pre-stored; and determine a picture region comprising one or more regions corresponding to a semantic category with a highest score in the N semantic categories as the first saliency region.

11. The electronic device of claim 9, wherein when executed by the one or more processors, the computer instructions further cause the electronic device to:

generate an optimized saliency region based on the second saliency region when the third length is greater than the first length or the third width is greater than the first width, wherein the optimized saliency region is a picture region comprising first pixels with grayscale values greater than a preset value in a plurality of second pixels of the second saliency region;

generate a second subject box based on the optimized saliency region, wherein the second subject box is a second bounding rectangle of the optimized saliency region; and determine that the optimized saliency region is the first saliency region when a fourth length of the second subject box is not greater than the first length and a fourth width of the second subject box is not greater than the first width.

12. The electronic device of claim 9, wherein the first saliency region comprises a human face region.

\* \* \* \* \*